US009264757B2

(12) United States Patent
Harada et al.

(10) Patent No.: US 9,264,757 B2
(45) Date of Patent: *Feb. 16, 2016

(54) SERVICE EXECUTING APPARATUS

(71) Applicant: PANASONIC CORPORATION, Osaka (JP)

(72) Inventors: Makoto Harada, Osaka (JP); Yoshio Kawakami, Osaka (JP); Takakazu Shiomi, Osaka (JP); Takaaki Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 381 days.

This patent is subject to a terminal disclaimer.

(21) Appl. No.: 13/738,037

(22) Filed: Jan. 10, 2013

(65) Prior Publication Data
US 2013/0145417 A1 Jun. 6, 2013

Related U.S. Application Data

(63) Continuation of application No. 12/788,644, filed on May 27, 2010, now Pat. No. 8,379,667, which is a continuation of application No. 10/910,748, filed on Aug. 4, 2004, now Pat. No. 7,760,757.

(60) Provisional application No. 60/547,767, filed on Feb. 27, 2004.

(30) Foreign Application Priority Data

Aug. 6, 2003 (JP) ................................. 2003-287625

(51) Int. Cl.
H04N 21/433 (2011.01)
H04N 5/445 (2011.01)
(Continued)

(52) U.S. Cl.
CPC ......... *H04N 21/433* (2013.01); *H04N 5/44543* (2013.01); *H04N 5/45* (2013.01);
(Continued)

(58) Field of Classification Search
None
See application file for complete search history.

(56) References Cited

U.S. PATENT DOCUMENTS 5,557,338 A * 9/1996 Maze et al. ..................... 725/38
6,430,526 B1 8/2002 Toll
(Continued)

FOREIGN PATENT DOCUMENTS

EP 1008933 6/2000
JP 8-289220 11/1996
(Continued)

*Primary Examiner* — Brian T Pendleton
*Assistant Examiner* — Dika Okeke
(74) *Attorney, Agent, or Firm* — Greenblum & Bernstein, P.L.C.

(57) ABSTRACT

A broadcast receiving terminal, which implements a service executing method, includes a receiver operable to receive a service that uses a plurality of resources, a recording medium, and a service executor operable to execute a service that uses the plurality of resources in a service execution environment intended for the service. The terminal also includes an associater operable to associate the service execution environment with resource set information indicating the plurality of resources used by the service, when an application requests the service executor to execute the service, and a storager operable to store a plurality of service execution environments together with the associated resource set information. The terminal further includes a resource manager operable to provide, to a selected service, the plurality of resources indicated in the resource set information in the associated service execution environment.

2 Claims, 61 Drawing Sheets

(51) Int. Cl.
*H04N 5/45* (2011.01)
*H04N 7/16* (2011.01)
*H04N 21/236* (2011.01)
*H04N 21/426* (2011.01)
*H04N 21/431* (2011.01)
*H04N 21/442* (2011.01)
*H04N 21/443* (2011.01)
*H04N 21/482* (2011.01)
*H04N 21/81* (2011.01)
*H04N 21/434* (2011.01)
*H04N 21/462* (2011.01)
*H04N 21/6433* (2011.01)
*H04N 5/44* (2011.01)

(52) U.S. Cl.
CPC .......... *H04N 7/16* (2013.01); *H04N 21/23617* (2013.01); *H04N 21/4263* (2013.01); *H04N 21/42615* (2013.01); *H04N 21/42623* (2013.01); *H04N 21/42661* (2013.01); *H04N 21/4316* (2013.01); *H04N 21/4345* (2013.01); *H04N 21/442* (2013.01); *H04N 21/443* (2013.01); *H04N 21/4431* (2013.01); *H04N 21/4622* (2013.01); *H04N 21/4821* (2013.01); *H04N 21/6433* (2013.01); *H04N 21/8166* (2013.01); *H04N 5/4401* (2013.01)

(56) References Cited

U.S. PATENT DOCUMENTS

| | | | |
|---|---|---|---|
| 6,493,038 | B1 | 12/2002 | Singh et al. |
| 2002/0143848 | A1* | 10/2002 | Matena ............... G06F 9/5088 718/104 |
| 2002/0143907 | A1 | 10/2002 | Tsurubayashi |
| 2003/0056215 | A1 | 3/2003 | Kanungo |
| 2004/0030705 | A1* | 2/2004 | Bowman-Amuah ... G06Q 30/02 |

FOREIGN PATENT DOCUMENTS

| | | |
|---|---|---|
| WO | 00/30346 | 5/2000 |
| WO | 00/72586 | 11/2000 |

* cited by examiner

FIG. 2

| Frequency band | Usage | Modulation technique |
|---|---|---|
| 5~130MHz | Out Of Band (OOB) Data exchange between head end and terminals | QPSK |
| 130~864MHz | In-band Ordinary television broadcasting including video and audio | QAM |

FIG. 3

| Frequency band | Usage |
|---|---|
| 70~74MHz | Data transmission from head end 101 to terminal apparatuses |
| 10.0~10.1MHz | Data transmission from terminal apparatus A111 to head end 101 |
| 10.1~10.2MHz | Data transmission from terminal apparatus B112 to head end 101 |
| 10.2~10.3MHz | Data transmission from terminal apparatus C113 to head end 101 |

FIG. 4

| Frequency band | Usage |
|---|---|
| 150~156MHz | Television Channel 1 |
| 156~162MHz | Television Channel 2 |
| ⋮ | ⋮ |
| 310~311MHz | Radio Channel 1 |
| ⋮ | ⋮ |

2302 Set of resources
2301 Resource set identifier

| Java program identifier 3101 | Control information 3102 | DSMCC identifier 3103 | Program name 3104 |
|---|---|---|---|
| 301 | autostart | 1 | /a/TopXlet |
| 302 | present | 1 | /b/GameXlet |

| Abstract service identifier 4101 | Service Control information 4102 | DSMCC identifier 4103 | Program name 4104 | Priority 4105 | Control information 4106 |
|---|---|---|---|---|---|
| 701 | true | 7011 | /a/EPGXlet | 200 | autostart |
| 702 | false | 7021 | /b/TOP2Xlet | 205 | autostart |
| 702 | false | 7022 | /b/PPV2Xlet | 201 | present |

4111, 4112, 4113

4107 Java program identifier

FIG. 54

```
                        ┌─5401
┌─────────────────────────────────────────────────┐
│              ServiceContextMap                   │
├─────────────────────────────────────────────────┤
│ private Hashtable serviceContextMap ─── 5411    │
├─────────────────────────────────────────────────┤
│ public ServiceContext                            │
│ getServiceContext(AbstractServiceContext) ─ 5412│
│ public void setServiceContext(AbstractServiceContext,│
│ ServiceContext)                                  │
└─────────────────────────────────────────────────┘
                              └─ 5413
```

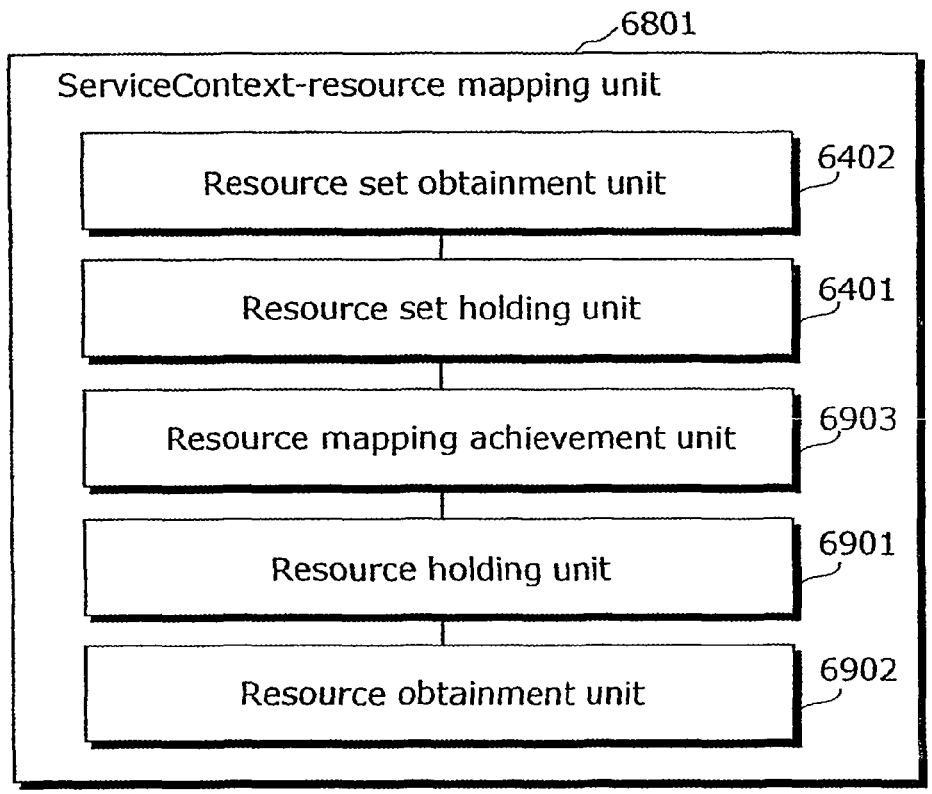

SERVICE EXECUTING APPARATUS

CROSS-REFERENCE TO RELATED APPLICATIONS

This is a continuation application of pending U.S. patent application Ser. No. 12/788,644, filed May 27, 2010, which is a continuation application of U.S. patent application Ser. No. 10/910,748, filed Aug. 4, 2004, and issued as U.S. Pat. No. 7,760,757 on Jul. 20, 2010, which claims the benefit of 60/547,767, filed Feb. 27, 2004, which claims priority of Japanese Application No. 2003-287626, filed Aug. 6, 2003, the contents of which are expressly incorporated by reference herein in their entireties.

BACKGROUND OF THE INVENTION (1) Field of the Invention

The present invention relates to a digital television, and particularly to a terminal that is equipped with a plurality of processing devices such as video recorder.

(2) Description of the Related Art

On the hardware of a broadcasting receiving apparatus represented by a television and a STB, a plurality of devices with different functions are interconnected so that an output from one device serves as an input to another device. By forming a series of flows in the above manner, a plurality of devices provide a great functionality on the hardware. For example, when video and audio are outputted to the screen of a digital broadcasting receiving apparatus, the following devices are connected on the hardware in order of mention, so that video and the like is displayed on the screen and audio is outputted by such devices performing the respective functions: a "tuner" that receives an broadcast signal as an input, performs filtering on such broadcast signal using the frequency as a key, and outputs an MPEG2 (Motion Picture Expert Group-2) transport stream; a "TS decoder" that receives the MPEG2 transport stream as an input, selects desired video/audio and data from it, and outputs video/audio data or data to be carried by TS packets corresponding to the selected video/audio data or data; an "audio decoder" and a "video decoder" that decode the video/audio data transmitted from the TS decoder and output it in a form that can be displayed on the screen; and a "display device" that synthesizes video and others indicated by the "video decoder" or the CPU.

In some cases, a broadcasting receiving apparatus such as above is equipped with more than one device of the same type. For example, when there are a plurality of "tuners" and "video decoders", it is possible to decode more than one piece of video data concurrently and therefore to achieve a function, known as "Picture In Picture (hereinafter referred to as PinP)", for displaying two types of video data concurrently, for example. In the case such as above where a plurality of devices of the same type exist, which "tuner" and which "video decoder" are to be interconnected cannot be determined freely. Therefore, it is usually determined beforehand that a specified "tuner" and a specified "video decoder" should be interconnected, and a series of devices are handled in "sets". As a representative example method of using each device in such a case, a technique disclosed in "Japanese Laid-Open Patent application No. 8-289220" is introduced here. In this invention, two sets of a "main tuner", a "main video decoder", an "insertion tuner" and an "insertion decoder" are used, and in the case of PinP display, the use of the "insertion tuner" makes it possible for the video and audio of a candidate selection to be displayed on a specified area on the screen, with an already-selected video and audio remaining displayed on the screen in full size.

In Europe, a specification known as "DVB-MHP (Digital Video Broadcasting-Multimedia Home Platform ETSI TS 101 812 V1.2.1 (2002-06))" for executing services on broadcasting receiving apparatus is defined and in operation. Meanwhile, in the United Sates, a specification called "OCAP (OpenCable Application Protocol OCAP1.0 Profile OC-SP-OCAP1.0-107-030522) is under development on the basis of the DVB-MHP specification and scheduled to be brought into operation within the year 2005. Furthermore, similar specifications are under development or in operation in various countries. Broadcasting receiving apparatuses compliant with these specifications on service execution are capable of executing programs that are obtained from broadcast signals by means of download and the like. Representative examples of the programs include game and EPG (Electronic Program Guide) application.

As a service to be executed on a broadcasting receiving apparatus, it is natural to conceive an application for displaying more than one piece of audio and video data concurrently on one screen such as the aforementioned PinP and enhanced EPG. In order to output plural pieces of video and audio data concurrently on one screen, it is necessary to control sets of plural devices, as represented by the above-described patent. However, the DVB-MHP/OCAP specifications do not provide descriptions about the configuration for controlling sets of plural devices.

SUMMARY OF THE INVENTION

In view of the above, the present invention aims at providing a service executing apparatus that controls a "set" of plural devices, by employing a concept of identifying a "set" of plural devices by a ServiceContext class, and also providing a mechanism for using a "set" of devices that is identified by another ServiceContext class.

In order to achieve the above object, the service executing apparatus according to the present invention is a service executing apparatus comprising: a service executing unit operable to execute a service that uses one or more resources in a service execution environment intended for said service; an associating unit operable to associate the service execution environment with resource set information indicating said one or more resources used by the service, when an application requests the service executing unit to execute the service; a holding unit operable to hold the service execution environment and the resource set information that are associated by the associating unit; and a resource managing unit operable to provide, to the service, the resource set information held by the holding unit in the service execution environment held by the holding unit.

Accordingly, since a ServiceContext that is a service execution environment is associated with resource set information indicating one or more resources used by the service, it is possible to control one or more resources as a "set" of resources at the time of service execution.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 2 is a diagram showing an example of using frequency bands to be used for communications between a head end and terminal apparatuses in the cable television system according to the present invention;

FIG. 3 is a diagram showing an example of using frequency bands to be used for communications between the head end and the terminal apparatuses in the cable television system according to the present invention;

FIG. 4 is a diagram showing an example of using frequency bands to be used for communications between the head end and the terminal apparatuses in the cable television system according to the present invention;

FIG. 41 is a schematic diagram showing the contents of XAIT according to the present invention;

FIG. 54 is a diagram showing a Java class according to the present invention;

FIG. 69 is a diagram showing a configuration of a ServiceContext-resource mapping unit according to the present invention;

FIG. 70 is a diagram showing an example of a resource holding unit according to the present invention;

DESCRIPTION OF THE PREFERRED EMBODIMENTS

The following describes the preferred embodiments of the present invention with reference to the drawings.

First Embodiment

Figure 1:
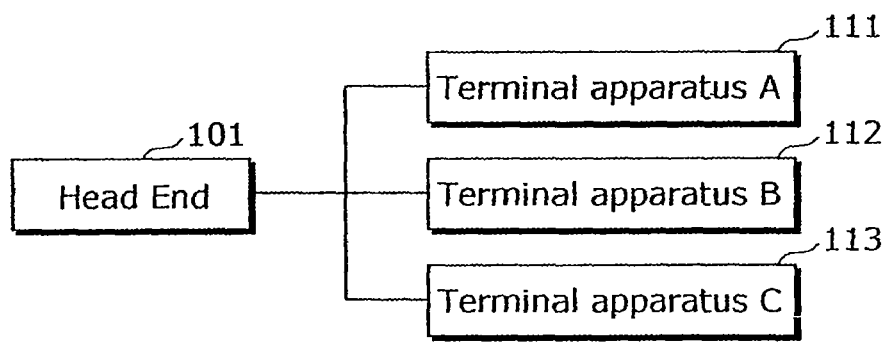
FIG. 1 is a diagram showing a structure of a cable television system according to a first embodiment of the present invention.

A preferred embodiment of the cable television system according to the present invention is described with reference to the drawings. FIG. 1 is a block diagram showing the relationship among apparatuses composing the cable system, which are a head end 101 and three terminal apparatuses: a terminal apparatus A111, a terminal apparatus B112, and a terminal apparatus C113. In the present embodiment, three terminal apparatuses are connected to one head end, but it is possible to carry out the present invention if an arbitrary number of terminal apparatuses are connected to the head end.

The head end 101 transmits, to plural terminal apparatuses, broadcast signals such as video, audio and data, and receives data transmitted from the terminal apparatuses. In order to realize this, frequency bands are divided for use of data transmission between the head end 101, and the terminal apparatus A111, the terminal apparatus B112, and the terminal apparatus C113.

FIG. 2 is a table showing an example of divided frequency bands. There are roughly two types of frequency bands: Out of Band (to be abbreviated as OOB) and In-Band. A frequency band of 5-130 MHz is allocated to OOB to be mainly used for data exchange between the head end 101, and the terminal apparatus A111, the terminal apparatus B112, and the terminal apparatus C113. A frequency band of 130 MHz-864 MHz is allocated to In-Band to be mainly used for broadcasting services including video and audio. QPSK is employed for OOB, whereas QAM64 is employed for In-Band as modulation techniques. A detailed explanation of the modulation techniques is omitted here, since they are publicly known techniques which are less related to the present invention.

FIG. 3 shows a more specific example of how the OOB frequency band is used. A frequency band of 70 MHz-74 MHz is used to transmit data from the head end 101. In this case, all of the terminal apparatus A111, the terminal apparatus B112, and the terminal apparatus C113 receive the same data from the head end 101. Meanwhile, a frequency band of 10.0 MHz-10.1 MHz is used to transmit data from the terminal apparatus A111 to the head end 101. A frequency band of 10.1 MHz-10.2 MHz is used to transmit data from the terminal apparatus B112 to the head end 101. A frequency band of 10.2 MHz-10.3 MHz is used to transmit data from the terminal apparatus C113 to the head end 101. Accordingly, it becomes possible to transmit data unique to each terminal apparatus to the head end 101 from the terminal apparatus A111, the terminal apparatus B112, and the terminal apparatus C113.

FIG. 4 shows an example use of the In-Band frequency band. Frequency bands of 150-156 MHz and 156-162 MHz are allocated respectively to a television channel 1 and a television channel 2, and the subsequent frequencies are allocated to television channels at 6 MHz intervals. 310 MHz and the subsequent frequencies are allocated to radio channels at 1 MHz intervals. Each of the above channels may be used either for analog broadcasting or digital broadcasting. In the case of digital broadcasting, data is transmitted in the transport packet format compliant with the MPEG2 specification, in which case data intended for various data broadcasting systems can be transmitted, in addition to audio and video data.

The head end 101 is equipped with a QPSK modulation unit, a QAM modulation unit, and the like in order to transmit broadcast signals suitable to the respective frequency ranges. Moreover, the head end 101 is equipped with a QPSK demodulation unit for receiving data from the terminal apparatuses. Also, the head end 101 is assumed to be further equipped with various devices related to the above modulation units and demodulation unit. However, a detailed explanation of them is omitted here, since the present invention is mainly related to the terminal apparatuses.

The terminal apparatus A111, the terminal apparatus B112, and the terminal apparatus C113 receive and reproduce broadcast signals transmitted from the head end 101. Furthermore, the terminal apparatus A111, the terminal apparatus B112, and the terminal apparatus C113 transmit data unique to each terminal apparatus to the head end 101.

In the present embodiment, these three terminal apparatuses are assumed to be terminal apparatuses capable of displaying two windows simultaneously such as ones represented by Picture in Picture and Double Window, for example. Note that the present invention is not limited to two windows, and therefore it is possible to carry out the present invention if terminal apparatuses are capable of displaying an arbitrary number of windows simultaneously.

Figure 5:
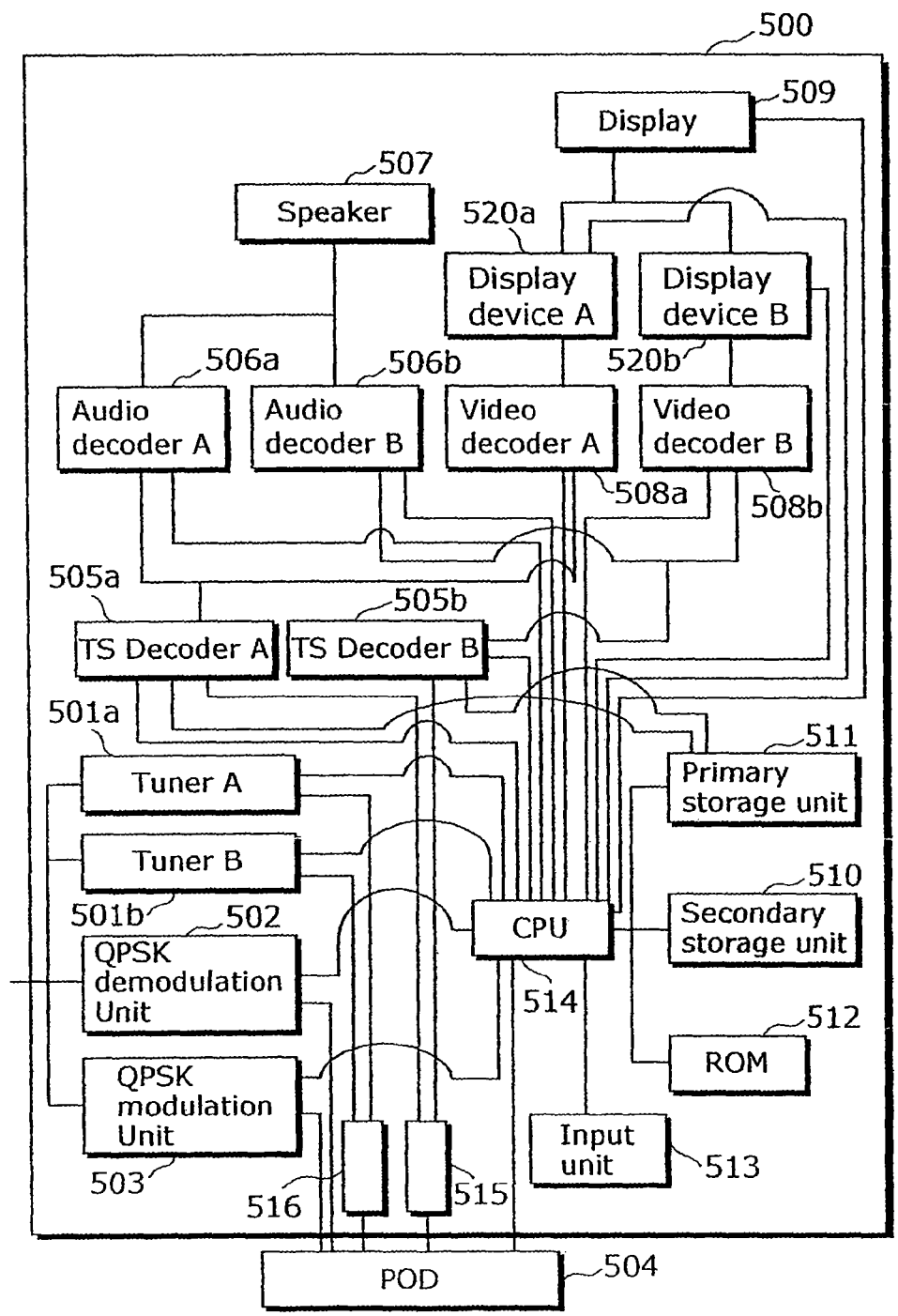
FIG. 5 is a diagram showing a configuration of a terminal apparatus in the cable television system according to the present invention.

FIG. 5 is a block diagram showing a hardware configuration of each terminal apparatus. 500 is a terminal apparatus, which is made up of a tuner A501a, a tuner B501b, a QPSK demodulation unit 502, a QPSK modulation unit 503, a TS decoder A505a, a TS decoder B505b, an audio decoder A506a, an audio decoder B506b, a speaker 507, a video decoder A508a, a video decoder B508b, a display 509, a secondary storage unit 510, a primary storage unit 511, a ROM 512, an input unit 513, a CPU 514, a demultiplexer 515, a multiplexer 516, a display device A520a, and a display device B520b. Furthermore, a POD 504 can be attached to/detached from the terminal apparatus 500.

Figure 6:
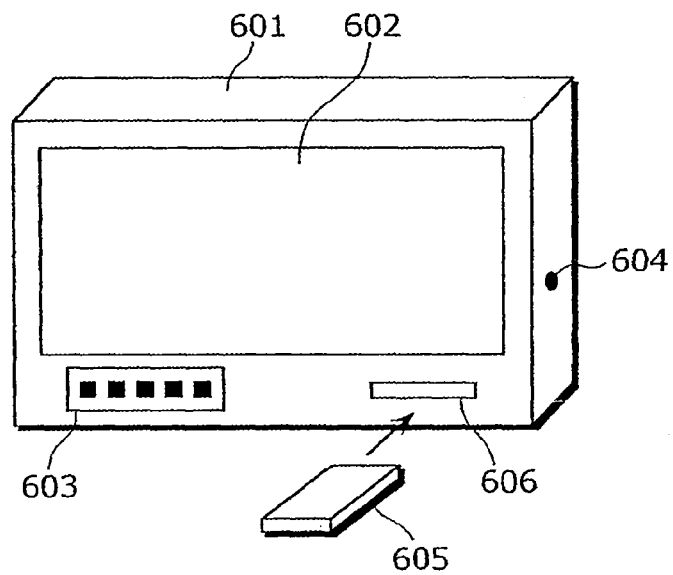
FIG. 6 is a diagram showing an example external view of the terminal apparatus in the cable television system according to the present invention.

FIG. 6 shows a thin-shaped television, which is an example external view of the terminal apparatus 500.

601 is a steel case of the thin-shaped television, in which all components of the terminal apparatus 500 except for the POD 504 are contained.

602 is a display, which corresponds to the display 509 in FIG. 5.

603 is a front panel unit which is made up of plural buttons and which corresponds to the input unit 513 in FIG. 5.

604 is a signal input terminal to which a cable line is connected for transmitting/receiving signals to and from the head end 101. The signal input terminal is connected to the tuner A501a, the tuner B501b, the QPSK demodulation unit 502, and the QPSK modulation unit 503 shown in FIG. 5.

605 is a POD card corresponding to the POD 504 in FIG. 5. The POD 504 is embodied independently of the terminal apparatus 500 and can be attached to/detached from the terminal apparatus 500, as in the case of the POD card 605 in FIG. 6. A detailed explanation of the POD 504 is given later.

606 is an insertion slot into which the POD 605 is inserted.

Figure 8:
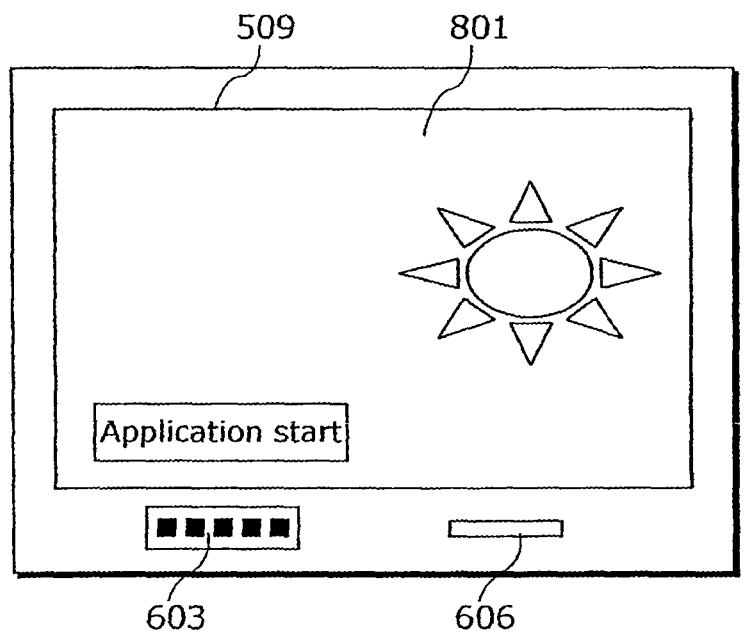
FIG. 8 is a diagram showing an example of a display window displayed by a display 509 according to the present invention.
Figure 9:
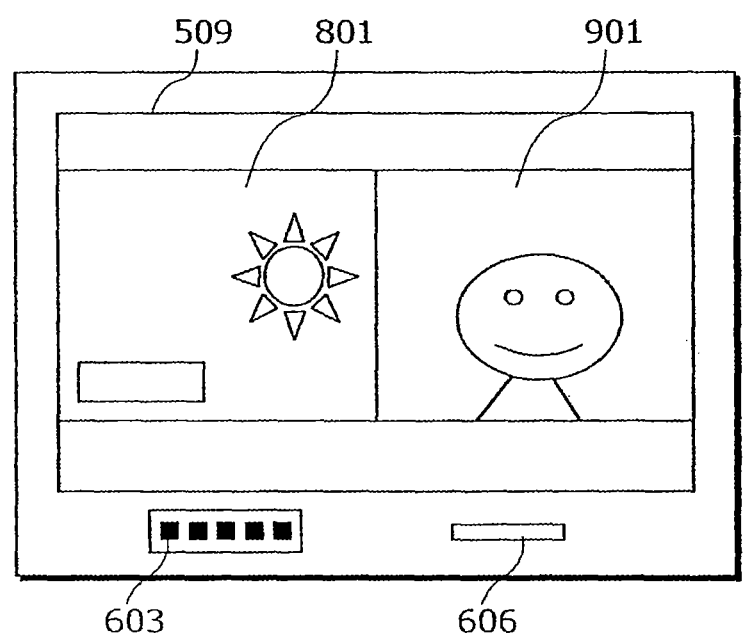
FIG. 9 is a diagram showing an example of a display window displayed by the display 509 according to the present invention.

The terminal apparatus shown in FIG. 5 is capable of full-screen display as illustrated as a display window 801 in FIG. 8 and capable of displaying two windows simultaneously as illustrated in FIG. 9. In FIG. 9, the display 509 displays two windows, where the display window 801 shows video and audio that is reproduced based on the resultant of demodulating, by the tuner A501a, signals transmitted from the head end 101 in FIG. 5, whereas a display window 901 shows video and audio that is reproduced based on the resultant of demodulating, by the tuner B501b, signals transmitted from the head end 101 in FIG. 5.

Referring to FIG. 5, each of the tuner A501a and tuner B501b demodulates a signal which has been QAM-modulated in and transmitted from the head end 101, according to tuning information that includes a frequency specified by the CPU 514, and passes the resultant to the multiplexer 516. The multiplexer 516 multiplexes it and passes the resultant to the POD 504.

The QPSK demodulation unit 502 demodulates a signal which has been QPSK-modulated in and transmitted from the head end 101, according to tuning information that includes a frequency specified by the CPU 514, and passes the resultant to the POD 504.

The QPSK modulation unit 503 QPSK-demodulates a signal passed from the POD 504, according to demodulation information that includes a frequency specified by the CPU 514, and transmits the resultant to the head end 101.

As shown in FIG. 6, the POD 504 is detachable from the main body of the terminal apparatus 500. The definition of the connection interface between the main body of the terminal 500 and the POD 504 is given in OpenCable™ HOST-POD Interface Specification (OC-SP-HOSTPOD-IF-I12-030210) and in specifications referred to by such specification. Therefore, a detailed description is omitted here, and an explanation is given only of constituent elements relevant to the present invention.

Figure 7:
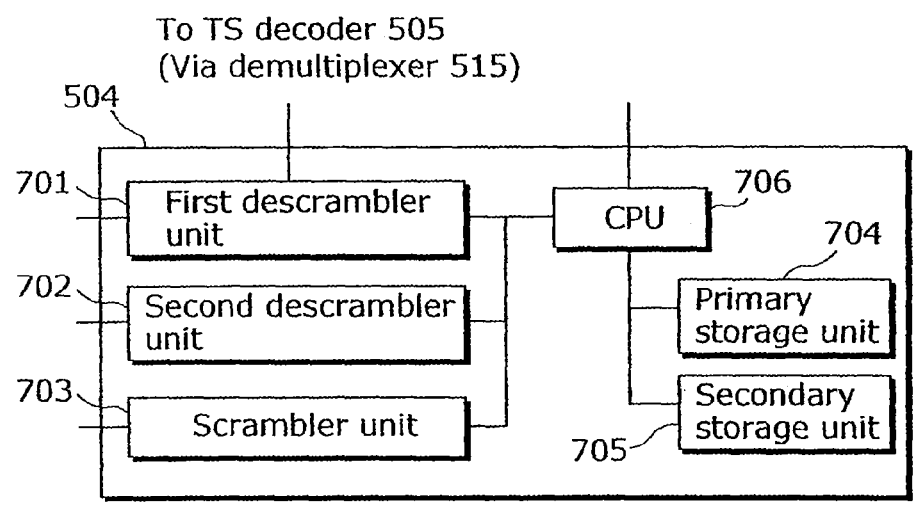
FIG. 7 is a diagram showing a hardware configuration of a POD 504 according to the present invention.

FIG. 7 is a block diagram showing an internal configuration of the POD 504. The POD 504 is made up of a first descrambler unit 701, a second descrambler unit 702, a scrambler unit 703, a primary storage unit 704, a secondary storage unit 705, and a CPU 706.

Under the instruction from the CPU 706, the first descrambler unit 701 receives, from the tuner A501a and the tuner B501b of the terminal apparatus 500, signals that are obtained by multiplexing scrambled signals by the multiplexer 516, and descrambles such signals. Then, the first descrambler unit 701 transmits the descrambled signals to the demultiplexer 515, which demultiplexes them and transmits the resultant to the TS decoder A505a and the TS decoder B505b of the terminal apparatus 500. Information required for decoding such as a key is provided by the CPU 706 according to need. More specifically, the head end 101 broadcasts several pay channels, and when the user purchased the right to view these pay channels, the first descrambler unit 701 receives required information such as a key from the CPU 706 and performs descrambling. Accordingly, the user can view these pay channels. When required information such as a key is not provided, the first descrambler unit 701 passes the received signals directly to the TS decoder A505a and the TS decoder B505b via the demultiplexer 515, without performing descrambling.

The second descrambler unit 702 receives a scrambled signal from the QPSK demodulation unit 502 of the terminal apparatus 500 under the instruction from the CPU 706, and descrambles such signal. Then, the second descrambler unit 702 passes the descrambled data to the CPU 706.

The scrambler unit 703 scrambles the data received from the CPU 706, under the instruction from the CPU 706, and sends the resultant to the QPSK modulation unit 503 of the terminal apparatus 500.

The primary storage unit 704, a concrete constituent element of which is a primary memory such as a RAM, is intended for storing data temporarily when the CPU 706 performs processing.

The secondary storage unit 705, a concrete constituent element of which is a secondary storage memory such as a flash ROM, is intended for storing a program to be executed by the CPU 706 as well as for storing data which should never be deleted even when the power is turned off.

Figure 10:
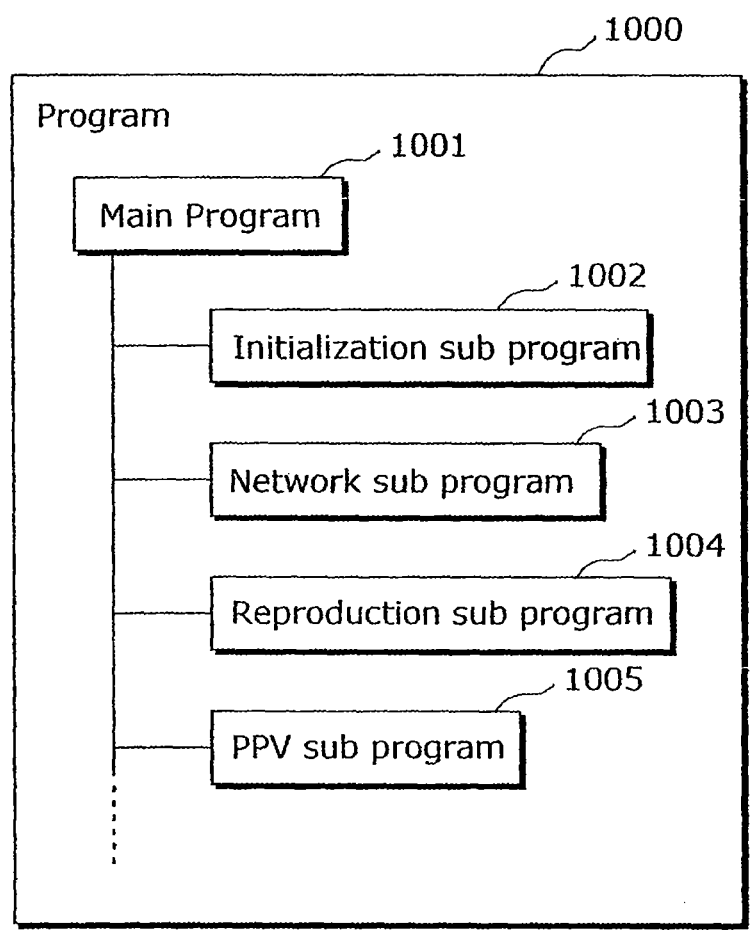
FIG. 10 is a diagram showing a structure of a program stored in the POD 504 according to the present invention.

The CPU 706 executes the program stored in the secondary storage unit 705. The program is made up of plural sub programs. FIG. 10 shows an example of the program stored in the secondary storage unit 705. In FIG. 10, a program 1000 is made up of plural sub programs including a main program 1001, an initialization sub program 1002, a network sub program 1003, a reproduction sub program 1004, and a PPV sub program 1005.

Here, PPV, which is an abbreviation of Pay Per View, refers to a service that allows the user to view a certain program such as a movie on a chargeable basis. When the user enters his/her personal identification number, the fact that the user purchased the right to view the program is notified to the head end 101, and the program is descrambled. Accordingly, the user can view such program. This viewing of the program requires the user to pay for the purchase at later date.

The main program 1001, which is the sub program activated by the CPU 706 first of all when the power is turned on, controls the other sub programs.

The initialization sub program 1002, which gets activated by the main program 1001 when the power is turned on, carries out information exchange and the like with the terminal apparatus 500 to perform initialization processing. This initialization processing is defined in detail in OpenCable™ HOST-POD Interface Specification (OC-SP-HOSTPOD-IF-I12-030210) and in specifications referred to by such specification. Furthermore, the initialization sub program 1002 also performs initialization processing not defined in these specifications. Here, a part of such initialization processing is introduced. When the power is turned on, the initialization sub program 1002 notifies the QPSK demodulation unit 502 of a first frequency stored in the secondary storage unit 705 via the CPU 514 of the terminal apparatus 500. The QPSK demodulation unit 502 performs tuning using the provided first frequency, and transmits the resulting signal to the secondary scrambler unit 702. Moreover, the initialization sub program 1002 provides the secondary descrambler unit 702 with descrambling information such as a first key stored in the secondary storage unit 705. As a result, the secondary descrambler unit 702 performs descrambling and passes the resultant to the CPU 706 executing the initialization sub program 1002. Accordingly, the initialization sub program 1002 can receive the information. In the present embodiment, the initialization sub program 1002 receives information via the network sub program 1003. A detailed description on this is given later.

Furthermore, the initialization sub program 1002 notifies the QPSK modulation unit 503 of a second frequency stored in the secondary storage unit 705 via the CPU 514 of the terminal apparatus 500. The initialization sub program 1002 provides the scrambler unit 703 with scrambling information stored in the secondary storage unit 705. When the initialization sub program 1002 provides, via the network sub program 1003, the scrambler unit 703 with information required to be sent, the scrambler unit 703 scrambles the data using the provided scrambling information, and provides the scrambled data to the QPSK modulation unit 503 of the terminal apparatus 500. The QPSK modulation unit 503 modulates the scrambled information which it received, and sends the modulated information to the head end 101.

As a result, it becomes possible for the initialization sub program 1002 to carry out a bilateral communication with the head end 101 via the terminal apparatus 500, the secondary descrambler unit 702, the scrambler unit 703, and the network sub program 1003.

The network sub program 1003, which is used by plural sub programs such as the main program 1001 and the initialization sub program 1002, is a sub program intended for carrying out a bilateral communication with the head end 101. More specifically, the network sub program 1003 behaves as if other sub programs using the network sub program 1003 were carrying out a bilateral communication with the head end 101 in accordance with TCP/IP. A detailed explanation of TCP/IP is omitted here, since it is a publicly known technique that specifies the protocols to be used when exchanging information between plural terminals. When activated by the initialization sub program 1002 at power-on time, the network sub program 1003 notifies, via the terminal apparatus 500, the head end 101 of an MAC address (an abbreviation of Media Access Control) which is an identifier for identifying the POD 504 and which is stored in the secondary storage unit 705 beforehand, so as to request for obtaining an IP address. The head end 101 notifies the POD 504 of the IP address via the terminal apparatus 500, and the network sub program 1003 stores such IP address into the primary storage unit 704. From then on, the head end 101 and the POD 504 communicate with each other using such IP address as the identifier of the POD 504.

The reproduction sub program 1004 provides the first descrambler unit 701 with descrambling information such as a second key stored in the secondary storage unit 705 as well as descrambling information such as a third key provided by the terminal apparatus 500, so as to allow descrambling to be performed. Furthermore, the reproduction sub program 1004 receives, via the network sub program 1003, information indicating that the signal inputted in the first descrambler unit 701 is a PPV channel. On the notification that the signal is a PPV channel, the reproduction sub program 1004 activates the PPV sub program 1005.

When activated, the PPV sub program 1005 displays, on the terminal apparatus 500, a message that urges the user to purchase the program, and accepts an input from the user. More specifically, when information wished to be displayed on the screen is sent to the CPU 514 of the terminal apparatus 500, a program running on the CPU 514 of the terminal apparatus 500 shows the message on the display 509 of the terminal apparatus 500. Then, when the user enters the personal identification number via the input unit 513 of the terminal apparatus 500, the CPU 514 of the terminal apparatus 500 accepts it, and sends it to the PPV sub program 1005 running on the CPU 706 of the POD 504. The PPV sub program 1005 sends, to the head end 101, the accepted personal identification number via the network sub program 1003. When such personal identification number is valid, the head end 101 notifies, via the network sub program 1003, the PPV sub program 1005 of descrambling information required for descrambling such as a fourth key. The PPV sub program 1005 provides the first descrambler unit 701 with the accepted descrambling information such as the fourth key, and then the first descrambler unit 701 descrambles the input signal.

Figure 11A:
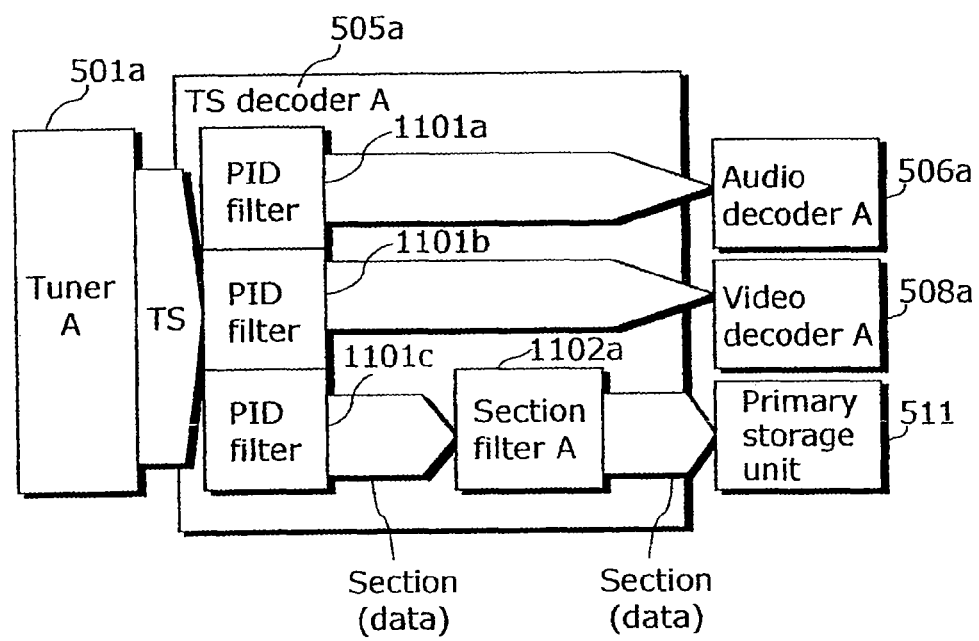
FIG. 11A is a diagram showing a configuration of a TS decoder A according to the present invention.
Figure 11B:
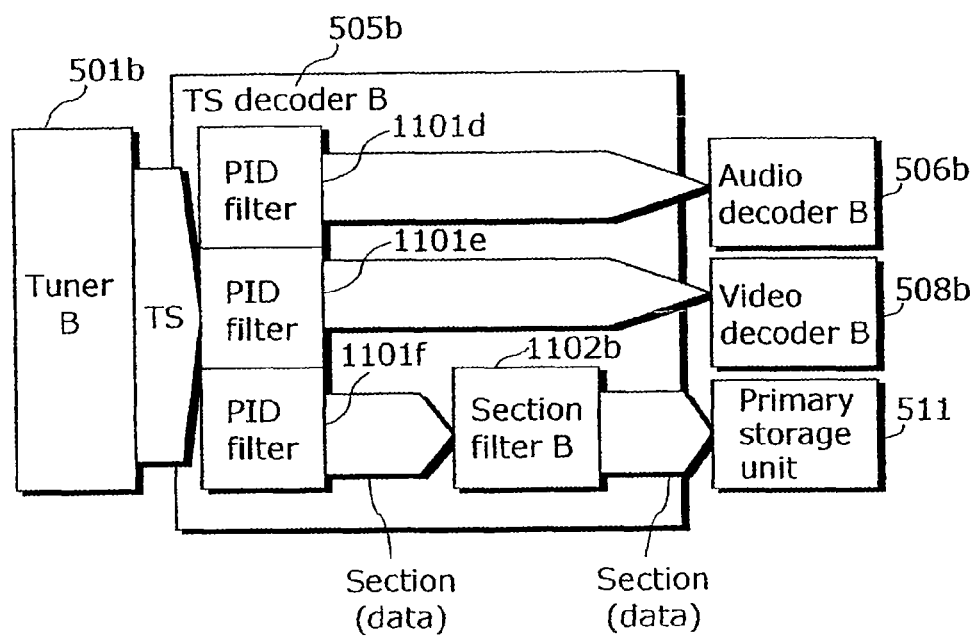
FIG. 11B is a diagram showing a configuration of a TS decoder B according to the present invention.

Referring to FIG. 5, each of the TS decoder A505a and TS decoder B505b performs filtering on the signal accepted from the POD 504 via the demultiplexer 515, and passes necessary data to the audio decoder A506a, the audio decoder B506b, the video decoder A508a, the video decoder B508b, and the primary storage unit 510. FIG. 11A shows the TS decoder A505a and FIG. 11B shows the TS decoder B505b. PID filters 1101a-1101f perform filtering on specified packet IDs. There are plural PID filters in the respective TS decoders. A section filter A1102a and a section filter B1102b perform filtering on data except for video and audio, and store the resultant into the respective primary storage devices. Here, a signal sent from the POD 504 is an MPEG2 transport stream. A detailed description about an MPEG2 transport stream is given in the MPEG specification ISO/IEC138181-1, and therefore it is not explained in detail in the present embodiment. An MPEG2 transport stream is composed of plural fixed length packets, and a packet ID is assigned to each packet.

Figure 12:
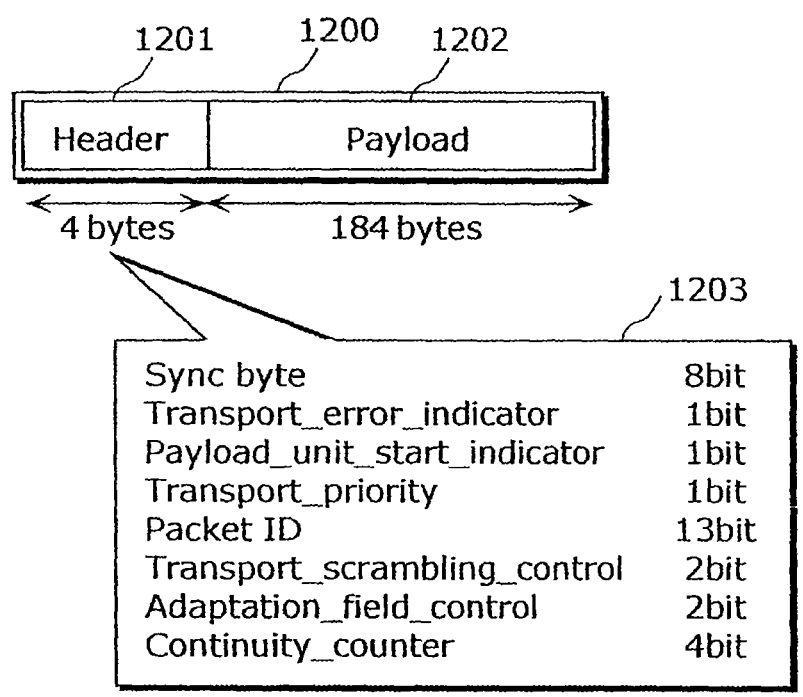
FIG. 12 is a diagram showing a structure of a packet defined in the MPEG standard.
Figure 13:
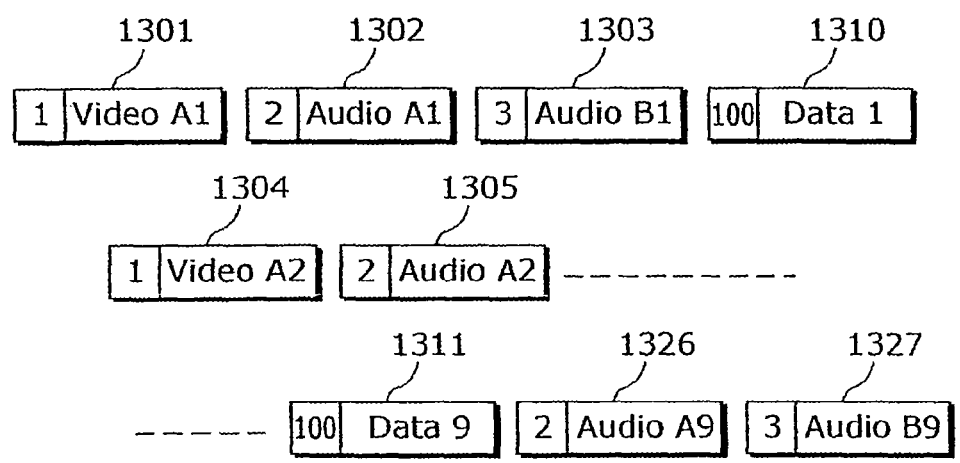
FIG. 13 is a diagram showing an example of an MPEG2 transport stream.

FIG. 12 is a diagram showing the structure of a packet. 1200 is a packet, which contains fixed length 188 bytes. The top four bytes is a header 1201 storing information for identifying the packet, and the other 184 bytes is a payload 1202 storing information wished to be carried. 1203 shows the breakdown of the header 1201. A packet ID is included in 13 bits from the $1^{st}$ to the $12^{th}$-$24^{th}$ bit. FIG. 13 is a schematic diagram illustrating plural packet strings to be transmitted. A packet 1301 contains a packet ID "1" in its header and includes the first information of video A in its payload. A packet 1302 contains a packet ID "2" in its header and includes the first information of audio A in its payload. A packet 1303 contains a packet ID "3" in its header and includes the first information of audio B in its payload. A packet 1310 contains a packet ID "100" and includes the first information of data 1 in its payload.

A packet 1304 contains the packet ID "1" in its header and includes the second information of the video A in its payload, which is the subsequent information of the packet 1301. Similarly, packets 1305, 1311, 1326 and 1327 carry subsequent data of the other packets. By concatenating the contents of the payloads of packets with the same packet IDs in the above manner, it is possible to reproduce video and audio in successive order. Furthermore, while the contents of the payloads of packets with the same packet IDs are concatenated, data other than the video and audio is stored into the primary storage unit 511.

Referring to FIG. 5, when the CPU 514 indicates, to the TS decoder A505a, the packet ID "1" as well as "the video decoder A508a" as an output destination, the PID filter 1101b of the TS decoder A505a extracts packets with the packet ID "1" from the MPEG2 transport stream received from the POD 504 via the demultiplexer 515, and passes them to the video decoder A508a. In FIG. 5, therefore, only the video data is passed over to the video decoder A508a. At the same time, when the CPU 514 indicates, to the TS decoder A505a, the packet ID "2" as well as "the audio decoder A506a", the PID filter 1101a of the TS decoder A505a extracts packets with the packet ID "2" from the MPEG2 transport stream received from the POD 504, and passes them to the audio decoder A506a. Furthermore, when the CPU 514 indicates, to the TS decoder A505a, the packet ID "100" as well as "the primary storage unit 511", the PID filter 1101c of the TS decoder A505a extracts packets with the packet ID "100" from the MPEG2 transport stream received from the POD 504, and passes them to the primary storage device.

This processing of extracting only necessary packets according to packet IDs corresponds to filtering to be performed by the TS decoders 505. The TS decoder A505a is capable of performing more than one filtering processing concurrently at the instruction from the CPU 514.

Referring to FIG. 5, the audio decoder A506a and the audio decoder B506b concatenate audio data embedded in the packets in the MPEG2 transport stream provided respectively by the TS decoder A505a and the TS decoder B505b, perform digital-to-analog conversion on the concatenated data, and output the resultant to the speaker 507.

The speaker 507 outputs the signals provided by the audio decoder A506a and the audio decoder B506b as audio.

Figure 15:
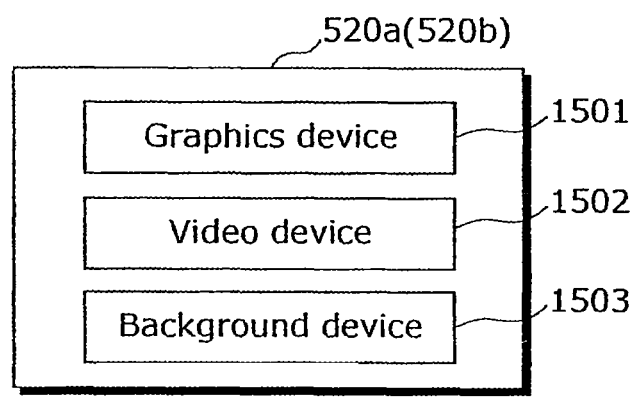
FIG. 15 is a diagram showing a configuration of a display device A520a or a display device B520b according to the present invention.
Figure 16:
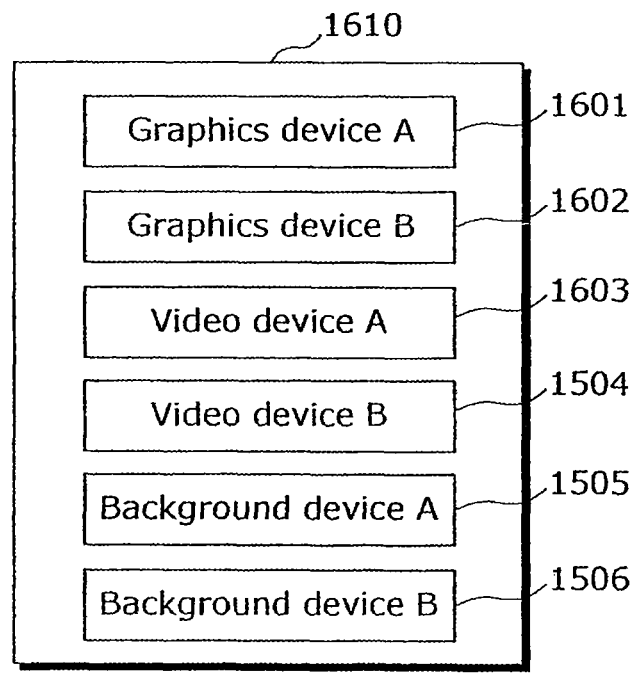
FIG. 16 is a diagram showing a configuration of a display device according to the present invention.

The video decoder A508a and the video decoder B508b concatenate video data embedded in the packets in the MPEG2 transport stream provided respectively by the TS decoder A505a and the TS decoder B505b, perform digital-to-analog conversion on the concatenated data, output the resultant to the display device A520a and the display device B520b, and display the resultant on the display 509 in synthesized form. The display device A520a and the display device B520b are each configured as shown in FIG. 15. In FIG. 15, a graphics device 1501 is used to display graphics. A video device 1502 is used to display video, and a background device 1503 is used to display the background of video. At the final stage, video and graphics displayed on the respective devices are outputted to the display 509 in synthesized form. As FIG. 16 shows, it is possible to integrate the display device A520a and the display device B520b together. In FIG. 16, 1610 is the integration of the display device A520a and the display device B520b. Assume, in FIG. 16, that the graphics device A1601, the video device A1603, and the background device A1505 are respectively the constituent elements of the display device A520a, and that graphics device B1602, the video device B1504, and the background device B1506 are respectively the constituent elements of the display device B520b. Each of these devices are integrated and outputted to the display 509.

A concrete constituent element of the display 509 is a CRT or a liquid crystal and the like.

The secondary storage unit 510, concrete constituent elements of which are a flash memory, a hard disk, and the like, stores and deletes data and programs specified by the CPU 514. Stored data and programs are referred to by the CPU 514. The stored data and programs are kept in storage even while the terminal apparatus 500 is powered off.

The primary storage unit 511, concrete constituent elements of which are a RAM and the like, temporarily stores data and programs specified by the CPU 514 and deletes them. Stored data and programs are referred to by the CPU 514. The stored data and programs are deleted when the terminal apparatus 500 gets powered off.

The ROM 512 is a read-only memory device, concrete constituent elements of which are a ROM, a CD-ROM, and a DVD, and the like. The ROM 512 stores a program to be executed by the CPU 514.

Figure 14:
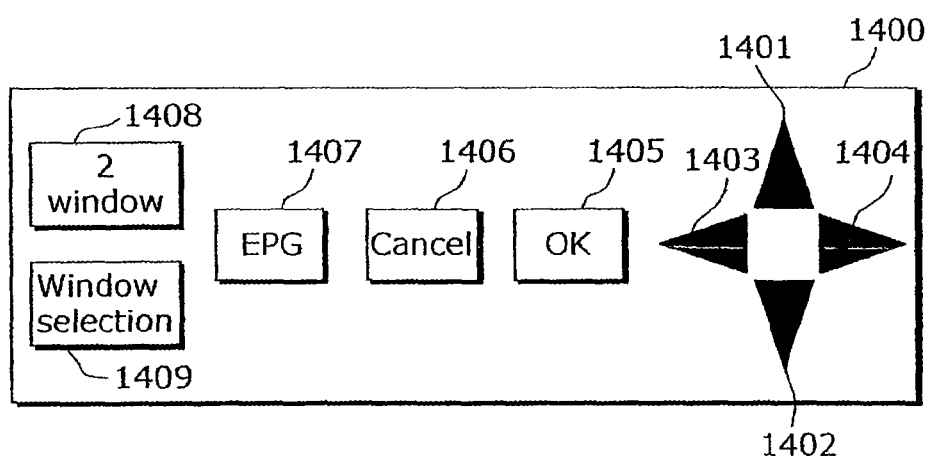
FIG. 14 is a diagram showing an example external view of an input unit 513 in the case where it is configured in the form of a front panel.

The input unit 513, concrete constituent elements of which are a front panel or a remote controller, accepts an input from the user. FIG. 14 shows an example of the input unit 513 in the case where it is configured in the form of a front panel. 1400 is a front panel, which corresponds to the front panel unit 603 shown in FIG. 6. Such front panel 1400 is made up of seven buttons: an up-cursor button 1401, a down-cursor button 1402, a left-cursor button 1403, a right-cursor button 1404, an OK button 1405, a cancel button 1406, an EPG button 1407, a two-window button 1408, and a window selection button 1409. When the user presses down a button, the identifier of such pressed button is notified to the CPU 514.

The CPU 514 executes the program stored in the ROM 512. According to instructions from such program to be executed, the CPU 514 controls the tuner A501a, the tuner B501b, the QPSK demodulation unit 502, the QPSK modulation unit 503, the POD 504, the TS decoder A505a, the TS decoder B505b, the display 509, the secondary storage unit 510, the primary storage unit 511, the audio decoder A506a, the audio decoder B506b, the video decoder A508a, the video decoder B508b, the ROM 512, the display device A520a, and the display device B520b.

Figure 17:
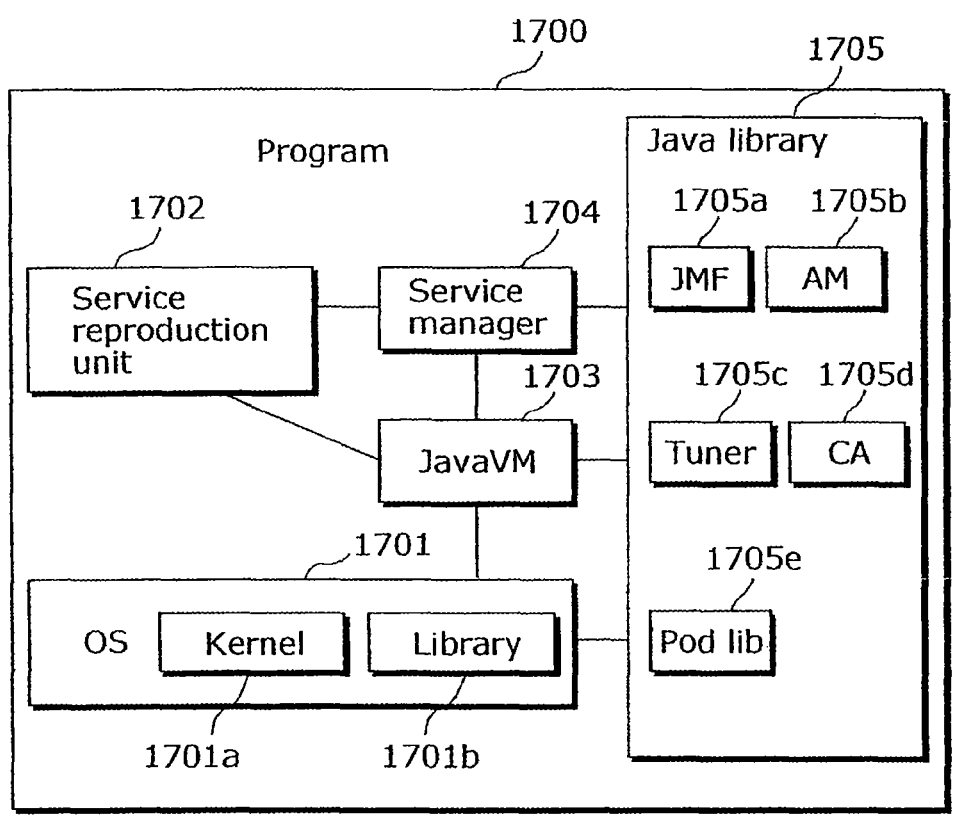
FIG. 17 is a diagram showing a structure of the program stored in the terminal apparatus 500 according to the present invention.

FIG. 17 is a diagram showing an example structure of the program that is stored in the ROM 512 and executed by the CPU 514.

A program 1700 is made up of plural sub programs. To be more specific, the program 1700 is made up of an OS 1701, a service reproduction unit 1702, a JavaVM 1703, a service manager 1704, and a Java library 1705.

The OS 1701 is a sub program to be activated by the CPU 514 when the terminal apparatus 500 is powered on. The OS 1701 is an abbreviation of operating system, an example of which is Linux™ and the like. The OS 1701 is a generic name for a publicly known art made up of a kernel 1701a for executing a sub program in parallel with another sub program and of a library 1702b, and therefore a detailed explanation is omitted. In the present embodiment, the kernel 1701a of the OS 1701 executes the JavaVM 1703 as a sub program. Meanwhile, the library 1701b provides these sub programs with plural functions required for controlling the constituent elements of the terminal apparatus 500.

Here, tuning is introduced as an example of such functions. With the function of tuning, tuning information including a frequency is received from another sub program and then passed over to the tuner A501a or the tuner B501b.

Here, consider the case where tuning information is passed over to the tuner A501a. It is possible for the tuner A501a to perform demodulation based on the provided tuning information, and pass the demodulated data to the POD 504 via the multiplexer 516. As a result, the other sub programs can control the tuner A501a via the library 1701b.

Figure 18:
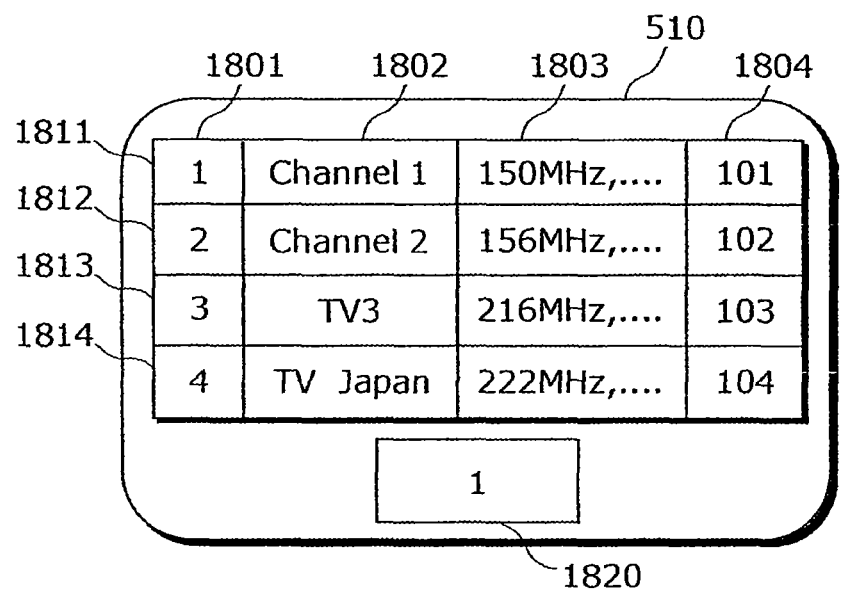
FIG. 18 is a diagram showing an example of information stored in a secondary storage unit 510 according to the present invention.

The service reproduction unit 1702 gives an instruction about the reproduction of a service, using a service identifier. The service reproduction unit 1702, which is a Java program, accepts an input from the user via the JavaVM 1703. A description of service is given later. The relationship between a service and an identifier is pre-stored in the secondary storage unit 510 as service information. FIG. 18 shows an example of service information stored in the secondary storage unit 510. Service information is stored in tabular form. A column 1801 describes the identifiers of services. A column 1802 describes service names. A column 1803 describes tuning information. Here, tuning information, which is a value to be provided to the tuner A501a, includes frequency, transmission rate, coding ratio, and the like. A column 1804 describes program numbers. Program numbers are numbers used to identify PMTs defined by the MPEG2 standard. A description about PMT is given later. Each of lines 1811-1814 indicates a set of the identifier, service name, and tuning information of each service. The line 1811 describes a set that includes "1" as an identifier, "Channel 1" as a channel name, a frequency of "312 MHz" as tuning information, and "101" as a program number. The service reproduction unit 1702 passes the identifier of a service directly to the service manager 1704 in order to reproduce the service. Processing to be performed between the service reproduction unit 1702 and the service manager 1704 is described in detail later.

Figure 19A:
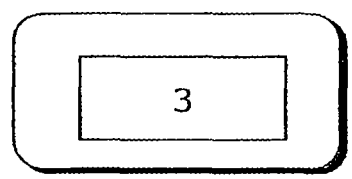
FIG. 19A is a diagram showing an example of information stored in a primary storage unit 511 according to the present invention.
Figure 19B:
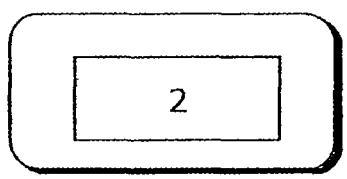
FIG. 19B is a diagram showing another example of information stored in a primary storage unit 511 according to the present invention.
Figure 19C:
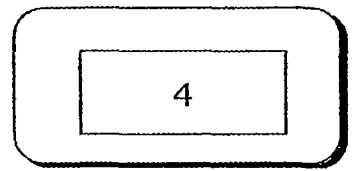
FIG. 19C is a diagram showing further another example of information stored in a primary storage unit 511 according to the present invention.

Also, in FIG. 18, 1820 shows the identifier of the lastly selected service. When the user presses down the up-cursor 1401 and the down-cursor 1402 on the front panel 1400 while the reproduction is taking place, the service reproduction unit 1702 receives a notification about such press from the input unit 513 via the CPU 514, and switches the service being reproduced to another one. First, the service reproduction unit 1702 stores, in the secondary storage unit 510, the identifier of the service that is currently reproduced. FIG. 19A, FIG. 19B, and FIG. 19C show example identifiers of services stored in the secondary storage unit 510. FIG. 19A shows that an identifier "3" is stored, and it is shown, by referring to FIG. 18, that a service with the service name "TV 3" is being reproduced. When the user presses down the up-cursor 1401 in a state illustrated in FIG. 19A, the service reproduction unit 1702 refers to the service information shown in FIG. 18, and passes the identifier "2" of a service with the service name of "Channel 2" to the service manager in order to newly reproduce a service with the service name of "Channel 2", which is the previous service in the table. At the same time, the service reproduction unit 1702 rewrites the identifier into the service identifier "2" stored in the secondary storage unit 510. FIG. 19B shows such rewritten service identifier. Meanwhile, when the user presses down the down-cursor 1402 in the state illustrated in FIG. 19A, the service reproduction unit 1702 refers to the service information shown in FIG. 18, and passes the identifier "4" of a service with the service name of "TV Japan" to the service manager in order to newly reproduce a service with the service name of "TV Japan", which is the next service in the table. At the same time, the service reproduction unit 1702 rewrites the identifier into the service identifier "4" stored in the primary storage unit 511. FIG. 19C shows such rewritten service identifier.

The JavaVM 1703 is a Java virtual machine that sequentially analyzes and executes programs written in the Java™ language. Programs written in the Java language are compiled into intermediate codes known as byte codes which do not depend on hardware. The Java virtual machine is an interpreter that executes such byte codes. Some of the Java virtual machines translate byte codes into an executable form which can be interpreted by the CPU 514 and pass the resultant to the CPU 514, which executes it. The JavaVM 1703 gets activated, with a Java program to be executed being specified by the kernel 1701a. In the present embodiment, the kernel 1701a specifies the service manager 1704 as a Java program to be executed. A detailed commentary on the Java language is given in many books that include "Java Language Specification (ISBN 0-201-63451-1)". Therefore, a detailed description about it is omitted here. Also, a detailed commentary on the operation of the JavaVM itself is given in many books that include "Java Virtual Machine Specification (ISBN 0-201-63451-X)". Therefore, a detailed description about it is omitted here.

The service manager 1704, which is a Java program written in the Java language, is executed by the JavaVM 1703 sequentially. It is possible for the service manager 1704 to call and to be called by another sub program not written in the Java language through the JNI (Java Native Interface). A commentary on the JNI is given in many books that include "Java Native Interface". Therefore, a detailed description about it is omitted here.

Figure 20:
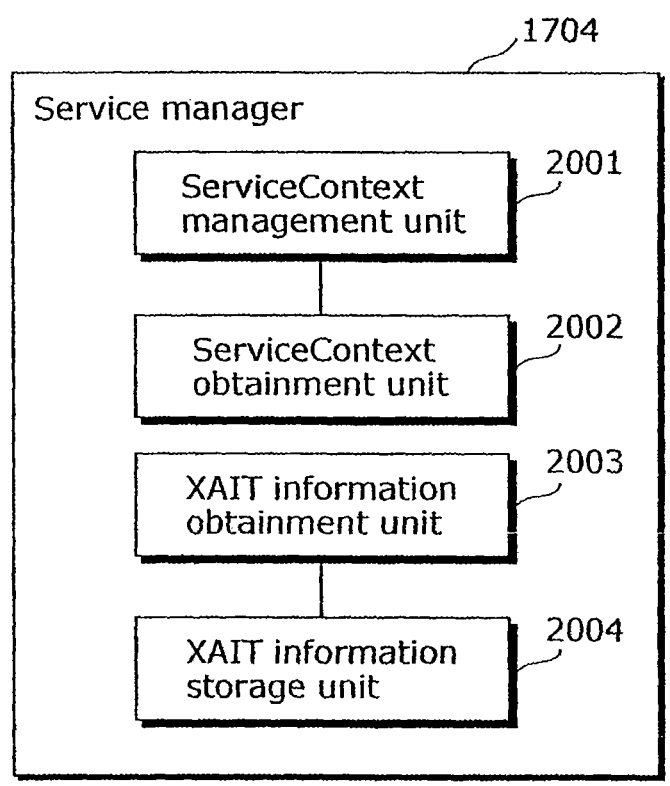
FIG. 20 is a diagram showing a configuration of a service manager 1704 according to the present invention.
Figure 21:
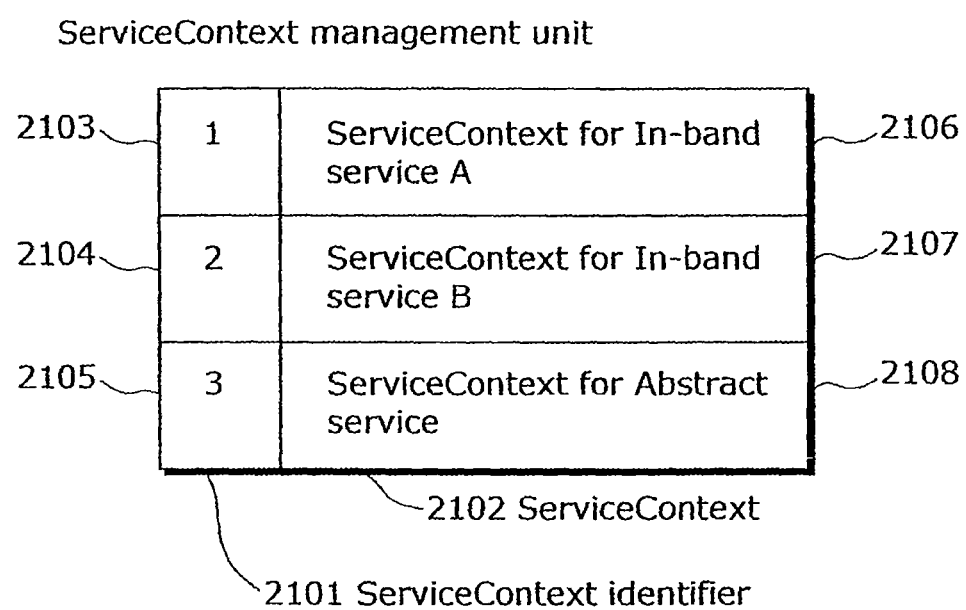
FIG. 21 is a diagram showing an example of a ServiceContext management unit according to the present invention.

FIG. 20 shows the configuration of the service manager 1704. The service manager 1704 is comprised of a ServiceContext management unit 2001, a ServiceContext obtainment unit 2002, a XAIT information obtainment unit 2003, and a XAIT information storage unit 2004. The ServiceContext management unit 2001 holds the identifier of a ServiceContext and the ServiceContext in a pair. As FIG. 21 shows, a column 2101 describes the identifiers of ServiceContexts, and a column 2102 describes the ServiceContexts. A line 2103 indicates that the ServiceContext identifier "1" is associated with a ServiceContext A for In-band service. A line 2104 indicates that a ServiceContext B for In-band service is identified by the ServiceContext identifier "2". A line 2105 indicates that a ServiceContext for Abstract service is identified by the ServiceContext identifier "3".

In-band service here is a unit of displaying/executing video, audio, Java programs and the like, and is a service defined in the ninth chapter in the DVB-MHP specification (formally known as ETSI TS 101 812 DVB-MHP specification V1.0.2).

ServiceContexts are defined in the Java TV (Java TV API Version 1.0 specification) specification. The ServiceContext for In-band service A2106 and the ServiceContext for In-band service B2107 specify a set of resources required to execute one service and execute an In-band service using such set of resources.

Figure 22:
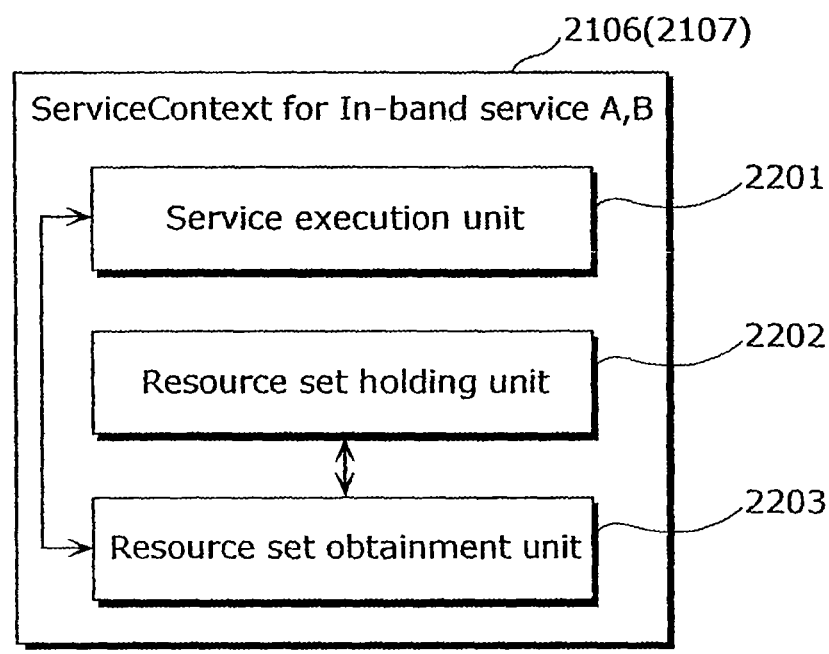
FIG. 22 is a diagram showing an example of a ServiceContext for In-band service according to the present invention.
Figure 23:
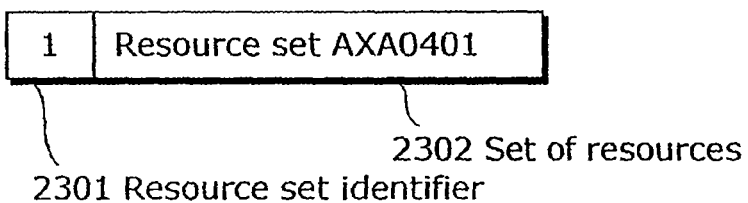
FIG. 23 is a diagram showing an example of a resource set holding unit according to the present invention.

FIG. 22 shows either the ServiceContext for In-band service A2106 or the ServiceContext for In-band service B2107. 2201 is a service execution unit, 2202 is a resource set holding unit, and 2203 is a resource set obtainment unit. When a service identifier is passed to the service execution unit 2201, the service execution unit 2201 executes an In-band service by use of a set of resources indicated by the resource set holding unit 2202. The resource set holding unit 2202 is illustrated in FIG. 23. FIG. 23 shows an example in which a resource set identifier 2301 and a set of resources 2302 (information that includes resource set information indicating one or more resources) are stored in a pair. The resource set obtainment unit 2203 obtains the set of resources held by the resource set holding unit 2202. In the present embodiment, the resource set obtainment unit 2203 is used only from the Java library 1705.

Figure 24:
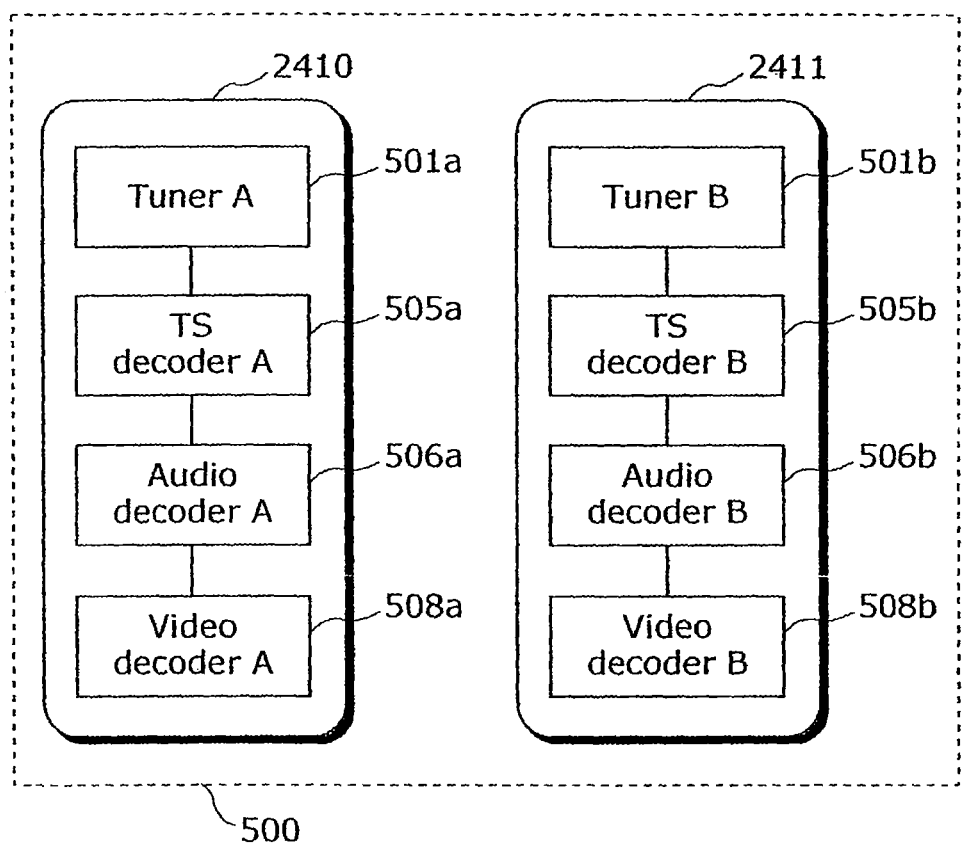
FIG. 24 is a diagram showing an example of sets of resources according to the present invention.

FIG. 24 shows an example of resources. Resources shown in FIG. 24 are the tuner A501*a*, the tuner B501*b*, the TS decoder A505*a*, the TS decoder B505*b*, the audio decoder A506*a*, the audio decoder B506*b*, the video decoder A508*a*, and the video decoder B508*b*. 2410 and 2411 indicate the respective sets of resources. The tuner A501*a*, the tuner B501*b*, the TS decoder A505*a*, the TS decoder B505*b*, the audio decoder A506*a*, the audio decoder B506*b*, the video decoder A508*a*, and the video decoder B508*b* are explained in FIG. 5, and therefore no description is given here.

Note that in the present embodiment, the tuner A501*a*, the tuner B501*b*, the TS decoder A505*a*, the TS decoder B505*b*, the audio decoder A506*a*, the audio decoder B506*b*, the video decoder A508*a*, and the video decoder B508*b* are assumed to be resources, but it is possible to carry out the present embodiment if another configuration is employed or if other resources are included.

Figure 25:
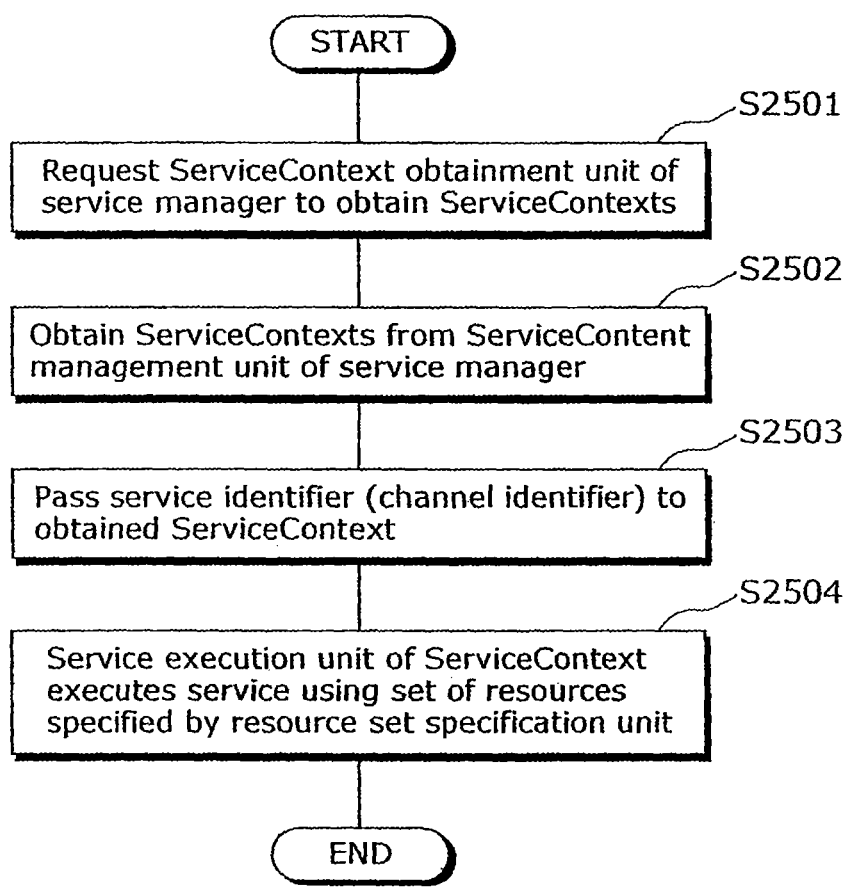
FIG. 25 is a flowchart relating to the obtainment of ServiceContexts according to the present invention.

In order to operate one In-band service, the service identifier that is wished to be executed is indicated to the service execution unit 2201 of the ServiceContext A2002 or the ServiceContext B2003 managed by the service manager 1704. FIG. 25 is a flowchart showing a series of its processing. When the service reproduction unit 1702 wishes to execute an In-band service, the service reproduction unit 1702 first requests the ServiceContext obtainment unit 2002 of the service manager 1704 to obtain ServiceContexts (Step S2501). In response to this obtainment request, the ServiceContext obtainment unit 2002 obtains the ServiceContext A2106 or the ServiceContext B2107 from the ServiceContext management unit 2001, and notifies the service reproduction unit 1702 of this (Step S2502). The service reproduction unit 1702 passes the service identifier to the service execution unit 2201 of either of the obtained service ServiceContexts, that is, the ServiceContext A2106 or the ServiceContext B2107 (Step S2503). The service execution unit 2201 of the ServiceContext A2106 or the ServiceContext B2107 that receives the service identifier executes the service A2601 or the service B2602 for In-band corresponding to such service identifier, using the set of resources A2410 or the set of resources B2411 (Step S2504).

Figure 26:
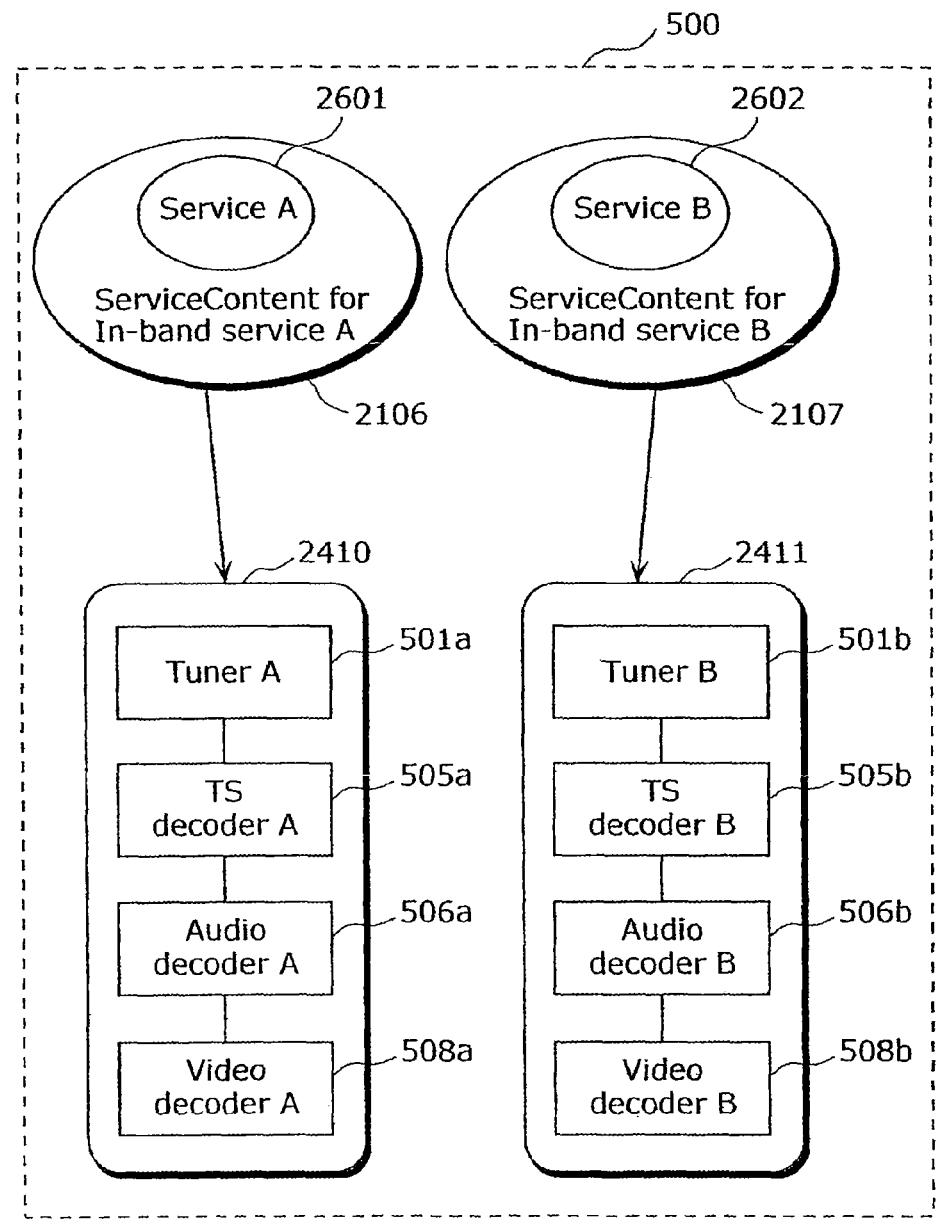
FIG. 26 is a diagram showing a relationship between the ServiceContexts and the set of resources according to the present invention.

FIG. 26 shows the respective relationship among services, the ServiceContexts and the sets of resources. The ServiceContext A2106 executes the service for In-band A2601, using the set of resources A2410. The ServiceContext B2107 executes the service for In-band B2602, using the set of resources B2411. The other constituent elements are as shown in FIG. 24, and therefore no description is given here.

In the present embodiment, consider the case where the user turns the power on, after which two-window display is selected by the press of the two-window button 408 on the front panel 1400.

When the user turns the power on, an In-band service indicated by the lastly selected service identifier stored in the secondary storage unit 510 is executed.

The service reproduction unit 1702 passes the service identifier to the service execution unit 2201 of the ServiceContext for In-band service A2106.

Figure 27:
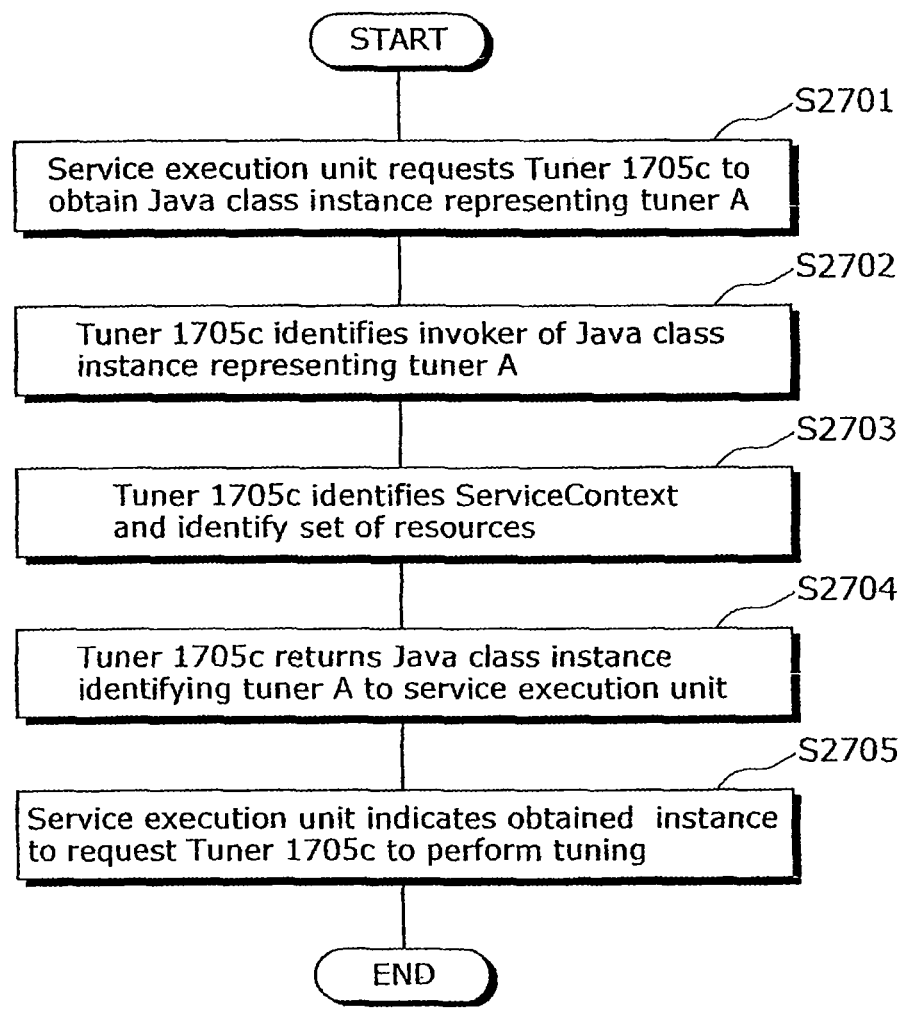
FIG. 27 is a flowchart for obtaining an instance of a Java class representing a tuner according to the present invention.

The service execution unit 2201 of the ServiceContext for In-band service A2106 first passes the service identifier to the Tuner 1705*c* that exists in the Java library 1705 so as to request for tuning. In order to make a request for tuning, the service execution unit 2201 operates in a manner as shown in the flowchart in FIG. 27. The service execution unit 2201 requests the Tuner 1705*c* to obtain an instance of a Java class representing the tuner A501*a* (Step S2701). The Tuner 1705*c* identifies the invoker of the instance of the Java class representing the tuner A501*a* (Step S2702). For example, the Tuner 1705*c* determines, by a thread, the invoker that has requested the instance. Here, it is possible for a thread to identify a Java program according to a group to which such thread belongs to. And it is possible to obtain a service from such Java program, and then identify the ServiceContext A2106 after making an enquiry to the service manager. The Tuner 1705*c* obtains the set of resources A2410 from the resource set obtainment unit 2203 of the ServiceContext A2106 identified in Step S2702 (Step S2703). The Tuner 1705*c* returns an instance of a Java class that represents a tuner and that uses the tuner A501*a* included in the set of resources 2410 obtained in Step S2703 (Step S2704). The service execution unit 2201 indicates the instance obtained in Step S2704 to request the Tuner 1705*c* to perform tuning (Step S2705). Upon receipt of the tuning request, the Tuner 1705*c* obtains tuning information with reference to the service information stored in the secondary storage unit 510. When the service execution unit 2201 of the ServiceContext for In-band service A2001 passes the service identifier "2" to the Tuner 1705*c*, the Tuner 1705*c* refers to the line 1812 in FIG. 18 to obtain the corresponding tuning information "156 MHz". The Tuner 1705*c* passes the tuning information to the tuner A501*a* via the library 1701*b* of the OS 1701. The tuner A501*a* demodulates the signal sent from the head end 101 according to the provided tuning information, and passes the demodulated signal to the POD 504 via the multiplexer 516.

Next, the service execution unit 2201 of the ServiceContext for In-band service A2001 requests the CA 1705*d* in the Java library 1705 to perform descrambling. The CA 1705*d* provides information required for descrambling to the POD 504 via the library 1701b of the OS 1701. The POD 504 descrambles the signal provided from the tuner A501a based on the provided information, and passes the descrambled signal to the TS decoder 505 via the demultiplexer 515.

Next, the service execution unit 2201 of the ServiceContext for In-band service A2001 provides a JMF 1705a inside the Java library 1705 with the service identifier, so as to request for the reproduction of video and audio.

Figure 28:
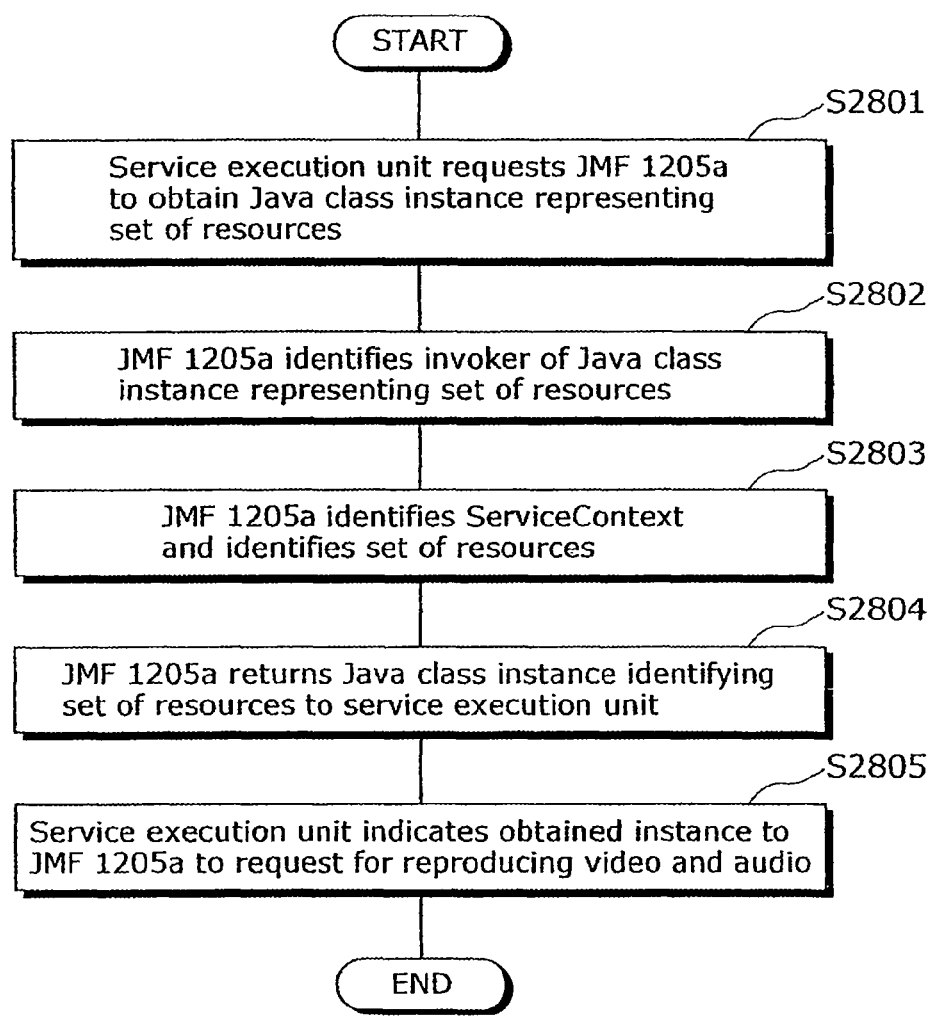
FIG. 28 is a flowchart for obtaining an instance of a Java class that reproduces video and audio according to the present invention.

FIG. 28 is a flowchart.

First, the service execution unit 2201 requests the JMF 1705a to obtain an instance of a Java class representing resources (the TS decoder A505a, the audio decoder 506a and the video decoder 508a) that are required for reproducing video and audio (Step S2801).

Using a thread, for example, the JMF 1705a identifies the invoker of the instance of the Java classes representing the resources required for reproducing video and audio (Step S2802). Here, it is possible for a thread to identify a Java program according to a group to which such thread belongs to. And it is possible to obtain a service from such Java program, and then identify the ServiceContext A2106 after making an enquiry to the service manager.

The JMF 1705a obtains the set of resources A2410 from the resource set obtainment unit 2203 of the ServiceContext A2106 specified in Step S2802 (Step S2803).

The JMF 1705a returns the instance of the Java class that represents a set of resources required for reproducing video and audio included in the set of resources 2410 obtained in Step S2803 (Step S2804).

The service execution unit 2201 requests the JMF 1705a to reproduce video and audio, using the instance obtained in Step S2804 (Step S2805). Upon receipt of the reproduction request, the JMF 1705a obtains, from a PAT and a PMT, packet IDs used to identify the video and audio to be reproduced. PAT and PMT are tables defined by the MPEG-2 standard that show the program line-up included in an MPEG2 transport stream. PAT and PMT are carried in the payloads in packets included in an MPEG2 transport stream, together with audio and video. Refer to the specification for a detailed description of PAT and PMT. Here, only an overview of PAT and PMT is given.

PAT, which is an abbreviation of Program Association Table, is carried in packets with the packet ID "0". In order to obtain the PAT, the JMF 1705a indicates, to the TS decoder A505a, the packet ID "0" and the CPU 514 through the library 1701b of the OS 1701. Then, the TS decoder A505a performs filtering based on the packet ID "0", and passes the resultant to the CPU 514. Accordingly, the JMF 1705a can collect the PAT packets.

Figure 29:
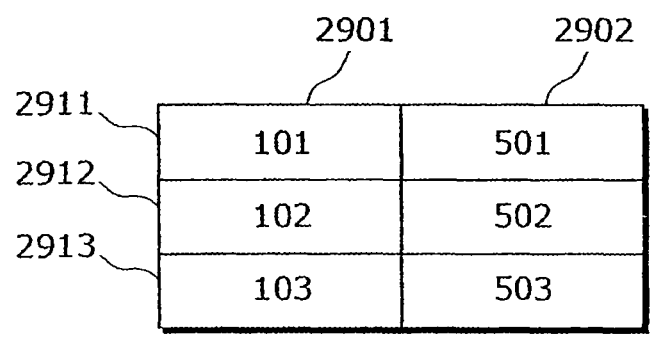
FIG. 29 is a schematic diagram showing the contents of a PAT specified in the MPEG2 standard according to the present invention.

FIG. 29 illustrates a table that schematically shows an example of the collected PAT information. A column 2901 describes program numbers. A column 2902 describes packet IDs. The packet IDs shown in the column 2902 are used to obtain the PAT. Each of lines 2911-2913 is a pair of the program number of a service and a packet ID corresponding to it. Here, three services are defined. The line 2911 defines a pair of the program number "101" and the packet ID "501".

Assuming that the service identifier provided to the JMF 1705a is "2", the JMF 1705a refers to the line 1812 in FIG. 18, so as to obtain the program number "102" corresponding to such service identifier, and then refers to the line 2912 in the PAT shown in FIG. 29, so as to obtain the packet ID "502" corresponding to the program number "102". PMT, which is an abbreviation of Program Map Table, is carried in packets with the packet IDs specified in the PAT. In order to obtain the PMT, the JMF 1705a indicates, to the TS decoder A505a, a packet ID and the CPU 514 through the library 1701b of the OS 1701. Here, a packet ID to be specified is "502". Then, the TS decoder A505a performs filtering based on the packet ID "502", and passes the resultant to the CPU 514. Accordingly, the JMF 1705a can collect the PMT packets.

Figure 30:
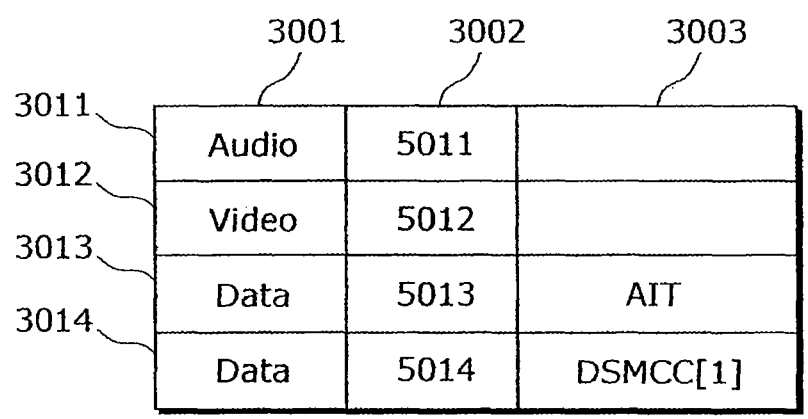
FIG. 30 is a schematic diagram showing the contents of a PMT specified in the MPEG2 standard according to the present invention.

FIG. 30 illustrates a table that schematically shows an example of the collected PMT information. A column 3001 describes stream types. A column 3002 describes packet IDs. Information specified in the respective stream types is carried in the payloads of packets with the packet IDs specified in the column 3002. A column 3003 describes additional information. Each of lines 3011-3014 is a pair of a packet ID and the type of information being transmitted, which is known as an elementary stream. The line 3011, which is a pair of the stream type "audio" and the packet ID "5011", indicates that audio data is stored in the payload of the packet with the packet ID "5011". The JMF 1705a obtains, from the PMT, the packet IDs of the video and audio to be reproduced. Referring to FIG. 30, the JMF 1705a obtains the audio packet ID "5011" from the line 3011, and the video packet ID "5012" from the line 3012.

Then, the JMF 1705a provides the TS decoder A505a with pairs of the obtained audio packet ID and the audio decoder A506a as an output destination as well as the video packet ID and the video decoder A508a as an output destination, via the library 1701b of the OS 1701. The TS decoder A505a performs filtering based on such provided packet IDs and the output destinations. Here, the packet with the packet ID "5011" is passed to the audio decoder A506a and the packet with the packet ID "5012" is passed to the video decoder A508a. The audio decoder A506a performs digital-to-analog conversion on the provided packets, so as to reproduce the audio via the speaker 507. The video decoder A508a performs digital-to-analog conversion on the provided packets, so as to output the resultant to the display device A520a, and displays the resultant on the display 509 in synthesized form.

Finally, the service execution unit 2201 of the ServiceContext for In-band service A2106 provides the service identifier to an AM 1705b in the Java library 1705, so as to request for data broadcast reproduction. Here, data broadcast reproduction means to extract a Java program included in the MPEG2 transport stream and cause the JavaVM 1703 to execute it. As a technique for embedding a Java program into an MPEG2 transport stream, a method known as DSMCC is used, which is described in the MPEG specification ISO/IEC138181-6. A detailed explanation of DSMCC is omitted here. DSMCC specification defines a method of encoding a file system comprised of directories and files used by a computer, in packets within an MPEG2 transport stream. Information about the Java program to be executed is carried in packets in the MPEG2 transport stream in the form of AIT. AIT is an abbreviation of Application Information Table whose definition is given in the tenth chapter of the DVB-MHP standard (formally known as ETSI TS101 812 DVB-MHP specification V1.0.2).

The AM 1705b determines, by a thread, an invoker Java program of the TS decoder A505a to be used, and identifies it by obtaining the ServiceContext A2106. First, in order to obtain the AIT, the AM 1705b obtains the PAT and PMT as in the case of the JMF 1705a, and obtains the packet ID of the packet that stores the AIT. Assuming that "2" is the provided service identifier and that the PAT shown in FIG. 29 and the PMT shown in FIG. 30 are being transmitted, the AM 1705b obtains the PMT shown in FIG. 30 according to the same procedure followed by the JMF 1705a. Subsequently, the AM 1705b extracts, from the PMT, the packet ID of the elementary stream whose stream type is "Data" and which has "AIT"

as additional information. As shown in FIG. 30, the elementary stream in the line 3013 corresponds to such elementary stream, and therefore the AM 1705b obtains the packet ID "5013" from it.

Figures 31, 32:
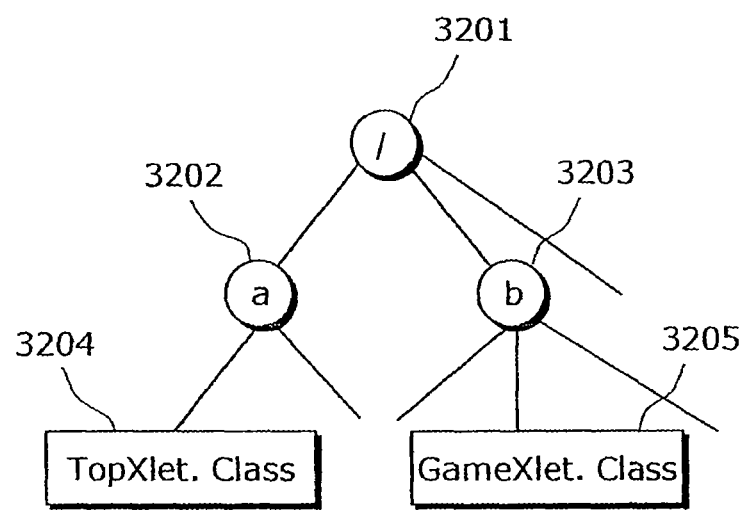
FIG. 31 is a schematic diagram showing the contents of an AIT specified in the DVB-MHP standard according to the present invention.
FIG. 32 is a schematic diagram showing a file system to be transmitted in the DSMCC format according to the present invention.

The AM 1705b provides the TS decoder A505a with the packet ID of the AIT and the primary storage unit 511 as an output destination through the library 1701b of the OS 1701. Then, the TS decoder A505a performs filtering based on such provided packet ID, and stores the AIT into the primary storage unit 511. Accordingly, the AM 1705b can collect the AIT packets. FIG. 31 is a table that schematically shows an example of the collected AIT information. A column 3101 describes identifiers of Java programs. A column 3102 describes control information for controlling the Java programs. The control information includes "autostart", "present", and "kill". "autostart" means that the terminal apparatus 500 automatically executes the program promptly. "present" means that the program is not executed automatically. "kill" means that the program is to be terminated. A column 3103 describes DSMCC identifiers used to extract packet IDs that include Java programs in the DSMCC format. A column 3104 describes program names of the Java programs. Each of lines 3111 and 3112 is a set of information about a Java program. The Java program defined in the line 3111 is a set of an identifier "301", control information "autostart", a DSMCC identifier "1", and a program name "a/TopXlet". The Java program defined in the line 3112 is a set of an identifier "302", control information "present", a DSMCC identifier "1", and a program name "b/GameXlet". Here, these two Java programs have the same DSMCC identifier. This indicates that two Java programs are included in the file system which has been encoded according to the same DSMCC method. Here, only four pieces of information are specified for the respective Java programs, but more pieces of information are specified in actuality. Refer to the DVB-MHP specification for detail.

The AM 1705b finds the "autostart" Java program from the AIT, and extracts the corresponding DSMCC identifier and Java program name. Referring to FIG. 31, the AM 1705b extracts the Java program in the line 3111, and obtains the DSMCC identifier "1" and the Java program name "a/TopXlet".

Next, the AM 1705b obtains, from the PMT, the packet ID of packets that store Java programs in the DSMCC format, using the DSMCC identifier obtained from the AIT. More specifically, the AM 1705b obtains, from the PMT, the packet ID included in the elementary stream whose stream type is "Data" and whose DSMCC identifier in the additional information matches.

Here, assuming that such DSMCC identifier is "1" and the PMT is the one shown in FIG. 30, the elementary stream in the line 3014 satisfies the above condition. Therefore, the packet ID "5018" is to be extracted.

The AM 1705b indicates, to the TS decoder A505a, the packet ID of packets in which data is embedded in the DSMCC format as well as the primary storage unit 511 as an output destination through the library 1701b of the OS 1701. Here, the packet ID "5014" is provided. Then, the TS decoder A505a performs filtering based on the provided packet ID, and stores the DSMCC-format data into the primary storage unit 511. Accordingly, the AM 1705b can collect the required packets. The AM 1705b reconstructs the file system from the collected packets according to the DSMCC method, and stores the reconstructed file system into the primary storage unit 511. The process for extracting data such as the file system from packets in the MPEG2 transport and storing the extracted data into storage units such as the primary storage unit 511 is hereinafter called download.

FIG. 32 shows an example of the downloaded file system. In the diagram, circles represent directories and squares represent files, where 3201 is a root directory, 3202 is a directory "a", 3203 is a directory "b", 3204 is a file "TopXlet. class", and 3205 is a file "GameXlet. class".

Subsequently, the AM 1705b passes, to the JavaVM 1703, a Java program to be executed out of the file system downloaded into the primary storage unit 511. Here, assuming that the Java program name to be executed is "a/TopXlet", a file "a/TopXlet. class" resulted from appending ". class" to the above Java program name is a file to be executed. "/" is a delimiter between a directory and a file name, and as shown in FIG. 32, the file 3204 is a Java program to be executed. Next, the AM 1705b passes the file 3204 to the JavaVM 1703.

Figure 33:
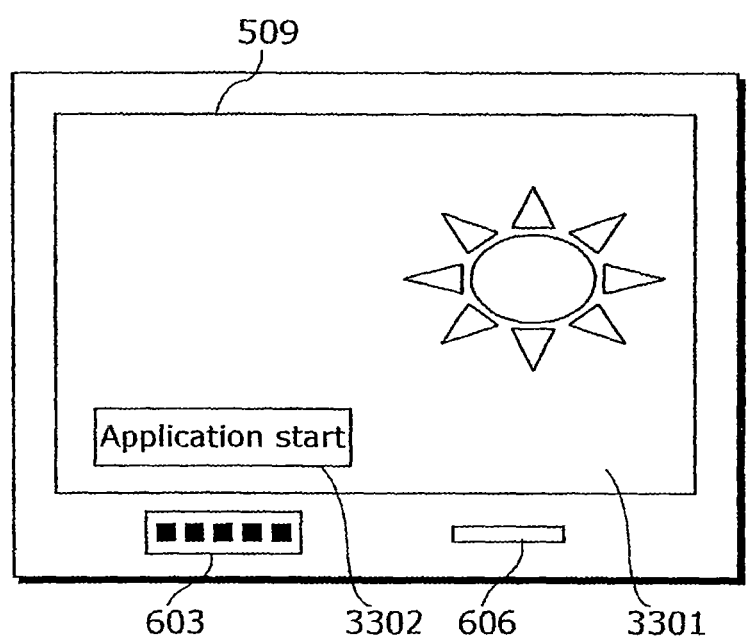
FIG. 33 is a diagram showing an example of a display window displayed by the display 509 according to the present invention.
Figure 34:
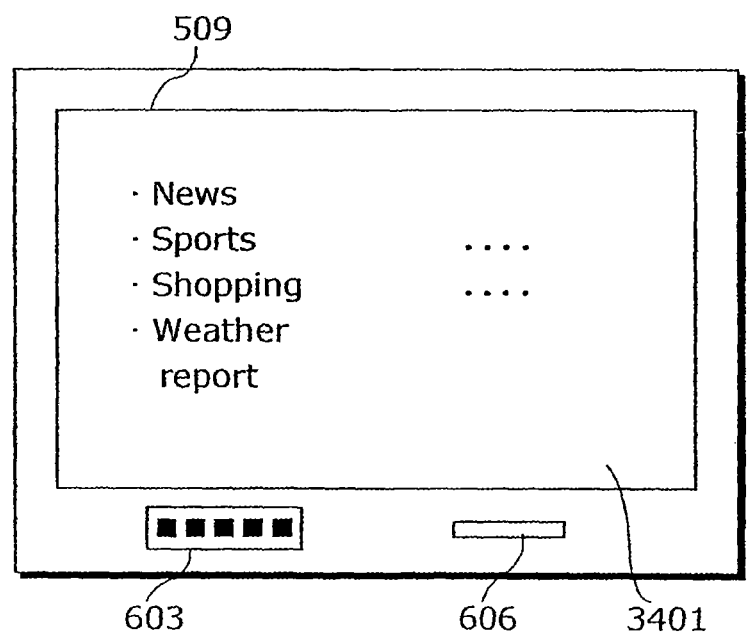
FIG. 34 is a diagram showing an example of a display window displayed by the display 509 according to the present invention.

The JavaVM 1703 executes such received Java program. FIG. 33 shows an example of how an In-band service indicated by the service identifier "2" is executed. 509 is the display, and 603 and 606 are as shown in FIG. 6. 3301 is an In-band service identified by the service identifier "2", and 3302 is an icon that is displayed by the executed Java program. For example, in response to the user's pressing down of the "OK" button 1405 on the front panel, it is also possible to give a full-screen display of a total information program 3401, as shown in FIG. 34.

Next, when the user presses down the "two-window" button 1408 on the front panel 1400, two services are displayed. For example, the service reproduction unit 1702 passes the service identifier "1" to the service execution unit 2201 of the ServiceContext for In-band service B2107.

Figure 35:
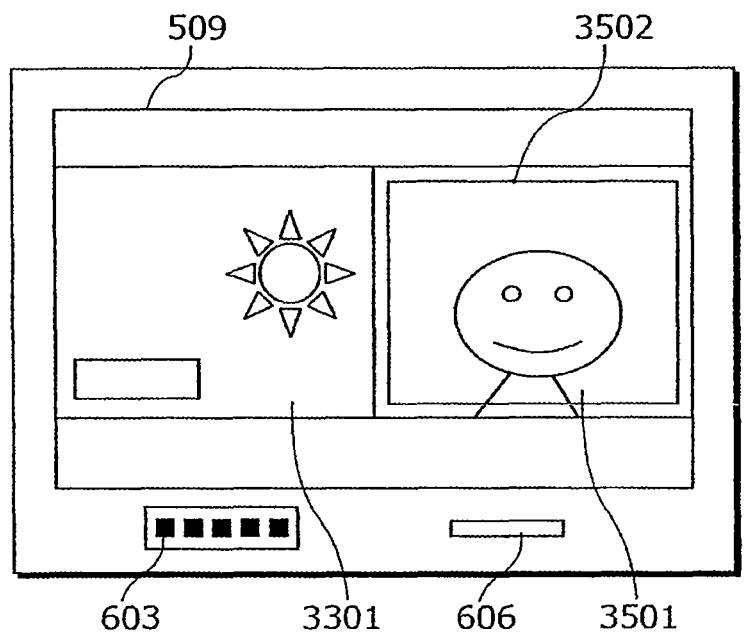
FIG. 35 is a diagram showing an example of a display window displayed by the display 509 according to the present invention.
Figure 36:
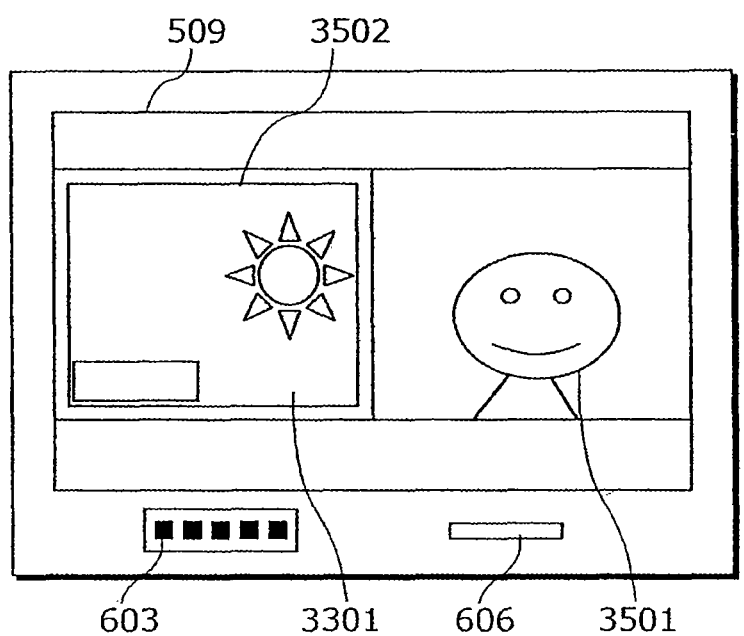
FIG. 36 is a diagram showing an example of a display window displayed by the display 509 according to the present invention.

In this case, the service B2602 is executed in the same manner by use of the tuner B501b, the TS decoder B505b, the audio decoder B506b, and the video decoder B508b shown in FIG. 5. FIG. 35 shows an example case where two services are displayed. In FIG. 35, 3501 is an In-band service that is indicated by the service identifier "1". Descriptions of the other constituent elements are omitted here, since they are shown in FIG. 33. 3502 is a cursor. In the case where the input unit takes the form of the front panel 1400, the cursor 3502 moves, as shown in FIG. 36, by the press of the "window selection" button 1409. Furthermore, the cursor 3502 automatically disappears after a certain period of time.

Figure 37:
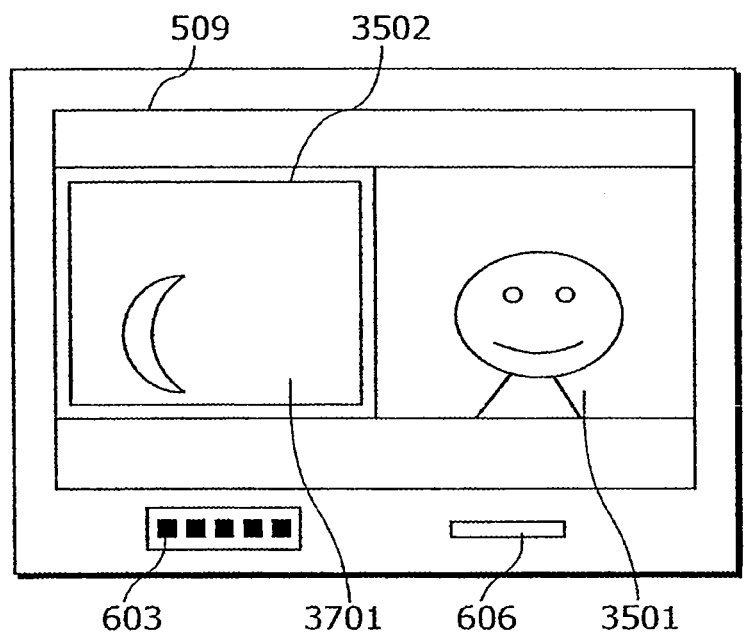
FIG. 37 is a diagram showing an example of a display window displayed by the display 509 according to the present invention.

In FIG. 36, the cursor 3502 is placed on the In-band service indicated by the service identifier "2". In this case, when the user presses the down cursor button 1402, for example, the service execution unit 2201 of the ServiceContext A2202 that is executing the In-band service indicated by the service identifier "2" receives another service identifier, e.g. the service identifier "3", terminates the reproduction of the video and audio as well as the execution of the Java program which are included in the In-band service A2601 and which are being carried out by the ServiceContext A2002 through each library included in the Java library 1705, through each library included in the same Java library 1705, and then performs the reproduction of the video and audio as well as the execution of a Java program that are included in a new In-band service, based on the newly received service identifier "3". When this is done, the In-band service B2602 that is executed on the ServiceContext B2403 keeps on running, without being terminated. FIG. 37 shows an example case where the service identifier "3" and the service identifier "1" are displayed concurrently. 3701 is an In-band service that is indicated by the service identifier "3". The Java library 1705 is a collection of plural Java libraries stored in the ROM 512. In the present embodiment, the Java library 1705 includes the JMF 1705*a*, the AM 1705*b*, the Tuner 1705*c*, the CA 1705*d*, a POD lib 1705*e*, and the like.

In the present embodiment, it is also possible to omit the ROM 512 by storing information stored in the ROM 512 in the secondary storage unit 510. Furthermore, it is also possible that the secondary storage unit 510 is made up of plural sub secondary storage units, and each sub secondary storage unit stores different information, so that information can be stored in segments. For example, one sub secondary storage unit may store only tuning information, another sub secondary storage unit may store the library 1201*b* of the OS 1201, and another different sub secondary storage unit may store a downloaded Java program.

An Abstract service is made up of one or more Java programs. Abstract service, which is independent of tuning, is implemented as an EPG, for example. EPG is an abbreviation of Electric Program Guide. A description of EPG is given later.

A ServiceContext for Abstract service executes Abstract services.

Figure 39:
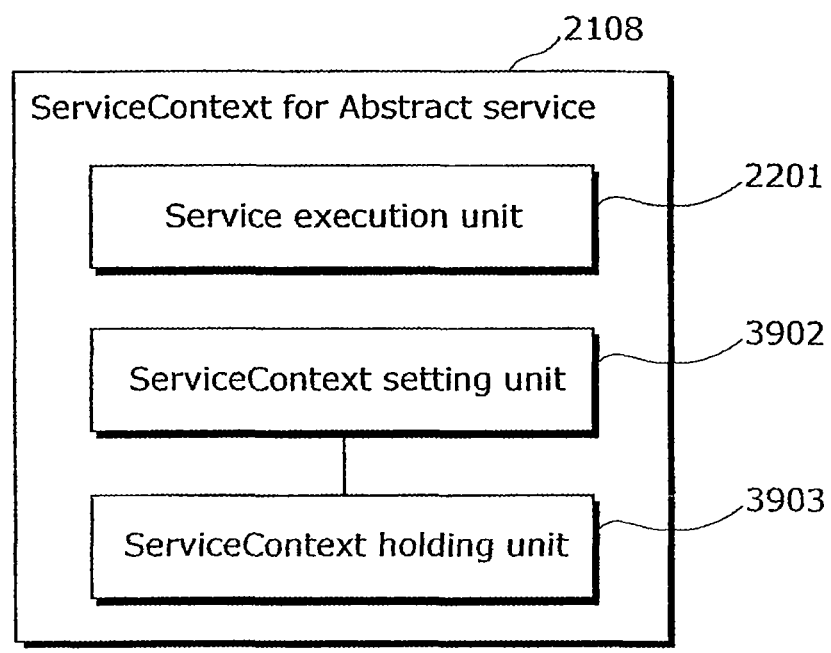
FIG. 39 is a diagram showing a configuration of a ServiceContext for Abstract service according to the present invention.

FIG. 39 shows a ServiceContext for Abstract service. A ServiceContext for Abstract service 2108 is comprised of a service execution unit 3901, a ServiceContext setting unit 3902, and a ServiceContext holding unit 3903. When the service execution unit 3901 executes a service, the ServiceContext setting unit 3902 identifies a set of resources to be used, by associating the ServiceContext for Abstract service with a ServiceContext for In-band service and then by having the ServiceContext holding unit 3903 to hold the associated ServiceContexts.

The XAIT information obtainment unit 2003 of the service manager 1704 carries out a bilateral communication with the head end 101 through the POD lib 1705*e* included in the Java library 1705. This bilateral communication can be realized by the POD Lib 1705*e* through the use of the library 1701*b* of the OS 1701, as well as through the use of the QPSK demodulation unit 502 and the QPSK modulation unit 503 via the POD 504.

Through the above communication, the XAIT information obtainment unit 2003 of the service manager 1704 receives, from the head end 101, information about Java programs which the terminal apparatus 500 should store in the secondary storage unit 510. Such information is called XAIT information. The XAIT information is transmitted between the head end 101 and the POD 504 in an arbitrary form. The present invention can be carried out regardless of transmission format, as long as information required as XAIT is included.

FIG. 41 illustrates a table that schematically shows an example of the XAIT information obtained from the head end 101. A column 4101 describes the identifiers of Abstract services. These identifiers of Abstract services each correspond to one Abstract service. A column 4102 describes control information for controlling the Abstract services. The control information includes "true" and "false". "true" means that the program is executed automatically when the terminal apparatus 500 is powered on, and "false" means that the program is not to be executed automatically. A column 4103 describes DSMCC identifiers used to extract packet IDs that include Java programs in the DSMCC format. A column 4104 describes the program names of the Java programs. A column 4105 describes the priorities of the Java programs. A column 4106 describes control information for controlling the Java programs, and a Java program is executed if it indicates "autostart" when a service is executed. A column 4107 describes identifiers of the Java programs. Each of lines 4111, 4112 and 4113 is a set of information about a Java program. The Java program defined in the line 4111 is a set of an identifier "701", service control information "true", a Java program identifier "7011", a DSMCC identifier "1", a program name "a/EPGXlet", a Java program priority "200", and Java program control information "autostart". Here, seven pieces of information are specified for the respective Java programs, but the present invention can be carried out even when more or fewer pieces of information are defined.

When the XAIT information is received by the XAIT information obtainment unit 2003, the service manager 1704 stores the file system from the MPEG2 transport stream into the primary storage unit 511 by use of the XAIT information storage unit 2004, according to the same procedure as the one for downloading the Java program from the AIT information. Subsequently, the service manager 1704 copies such stored file system to the secondary storage unit 510. Note that it is also possible to download the file system not via the primary storage unit 511 but directly into the secondary storage unit 510.

Note that the copied file system is stored into the secondary storage unit 510 in the present embodiment, but it is also possible to store it into the primary storage unit 511. It should be noted, however, that all stored information is lost at power-off time, in the case where the file system is stored into the primary storage unit 511.

Figure 42:
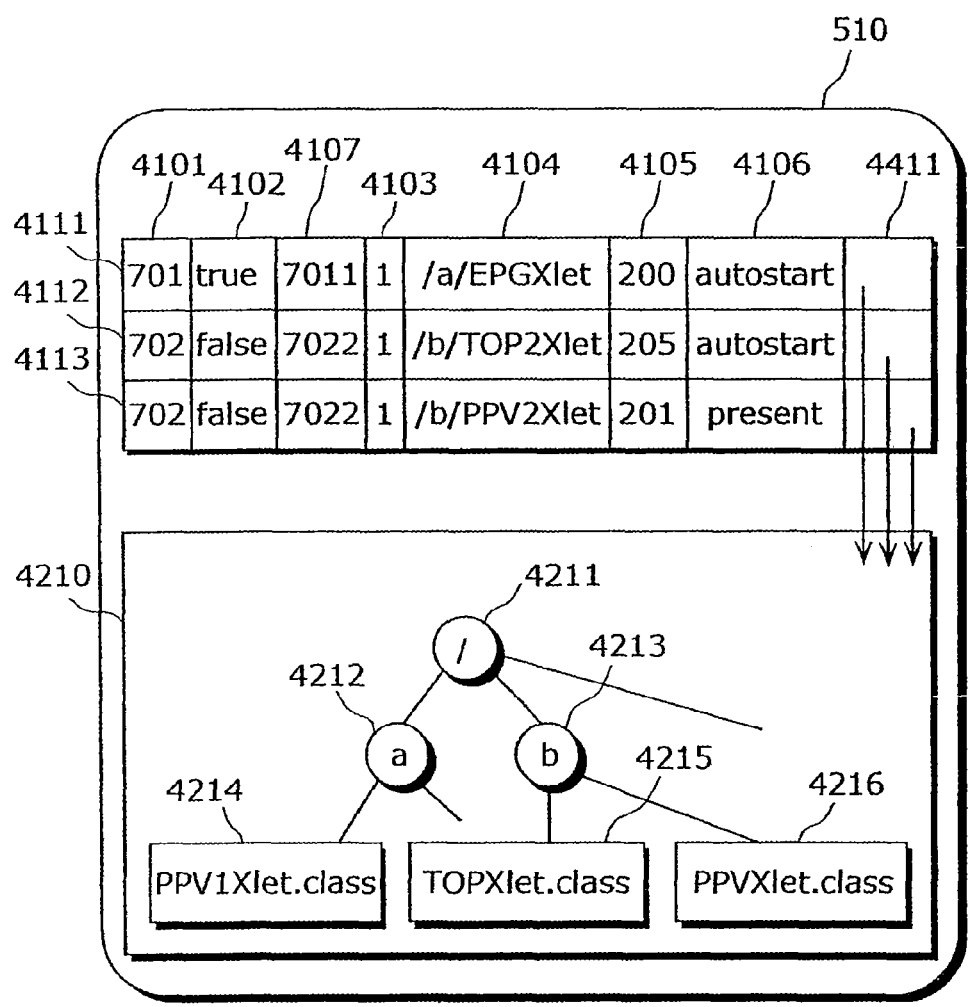
FIG. 42 is a diagram showing an example of information stored in the secondary storage unit 510 according to the present invention.

Next, the XAIT information storage unit 2004 of the service manager 1704 stores, in the secondary storage unit 510, the result of associating the XAIT information with a storage position of the downloaded file system. FIG. 42 shows an example of the XAIT information and the downloaded file system stored in the secondary storage unit 510 in association with each other. Elements in FIG. 42 that have the same numbers as those in FIG. 41 are the same as each other, and therefore an explanation for such elements is omitted. A column 4411 stores the storage positions of corresponding downloaded file systems. In FIG. 42, such storage positions are indicated by arrows. 4210 is a downloaded file system, where a top directory 4211, a directory "a" 4212, a directory "b" 4213, a file "EPGXlet. class" 4214, a file "TOPXlet. class" 4215, and a file "PVXlet. class" 4216 are included.

Here, the XAIT information is stored after the Java program is stored, but it is also possible for the XAIT information to be stored before the Java program. An Abstract service indicated by the identifier of an Abstract service whose control information is "true" is automatically executed by the terminal apparatus 500.

After the service manager 1704 is indicated to the JavaVM 1703 and the service manager 1704 is activated by the JavaVM 1703, the service reproduction unit 1702 obtains, from the XAIT information storage unit 2004, an Abstract service whose control information is "true" via the XAIT information obtainment unit 2003, with reference to the control information of each Abstract service, obtains the ServiceContext for Abstract service 2108 from the ServiceContext obtainment unit 2002, and causes the service execution unit 2201 of the ServiceContext for Abstract service 2108 to execute it.

In the present embodiment, consider the case where an EPG is executed as a Java program included in an Abstract service.

Figure 81:
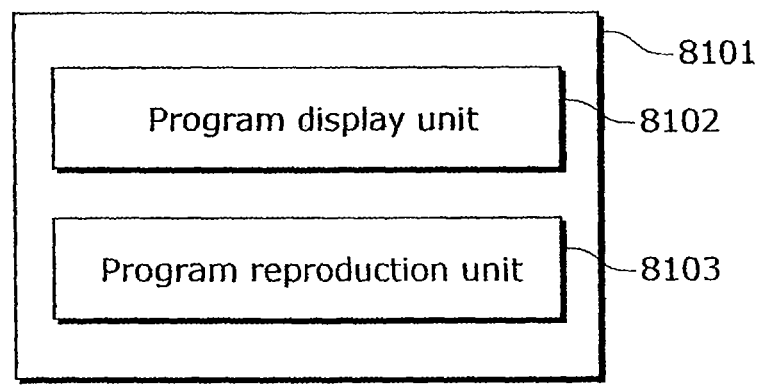
FIG. 81 is a diagram showing an EPG according to the present invention.

FIG. 81 shows an example configuration of an EPG. An EPG 8101 is comprised of a program display unit 8102 for displaying a list of programs to the user as well as for accepting an input from the user, and a program reproduction unit 8103 for selecting services. When the user turns the power on, the lastly executed service is shown on the display 509, and a Java program indicating the EPG 8101 is not displayed on the screen although it is being executed. In the case where the input unit 513 takes the form of the front panel shown in FIG. 14, such Java program is shown for the first time on the display 509 by the user's pressing the EPG button 1407 on the input unit 513.

Figure 38:
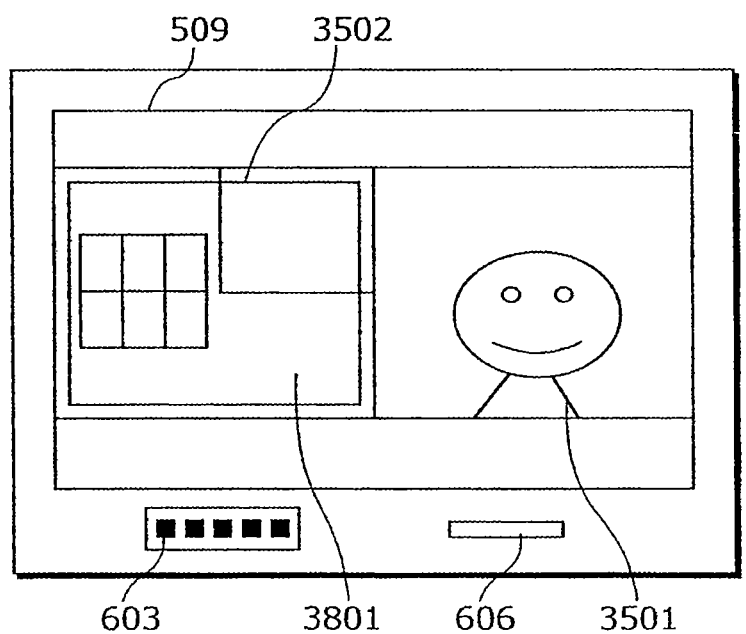
FIG. 38 is a diagram showing an example of a display window displayed by the display 509 according to the present invention.
Figure 40A:
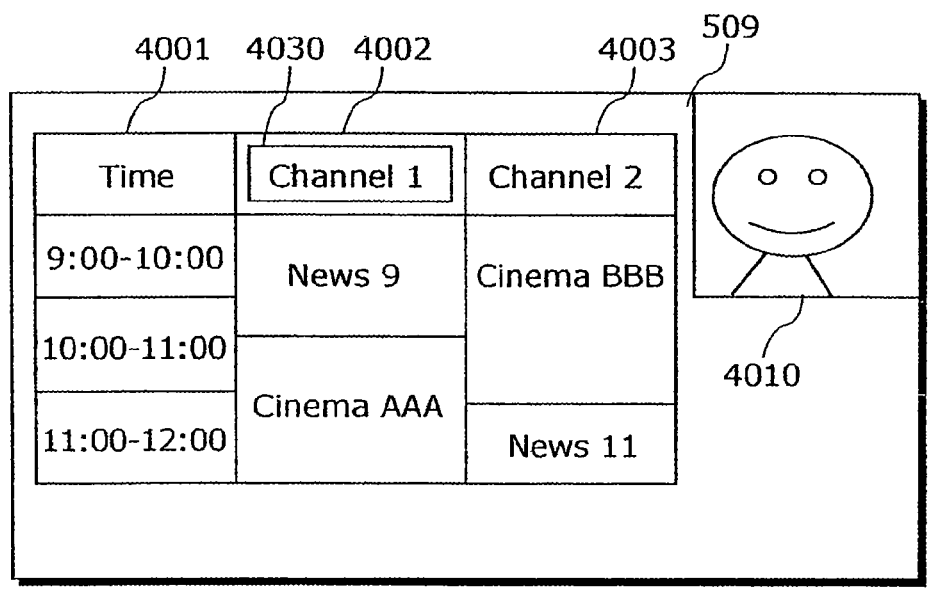
FIG. 40A is a diagram showing an example display window displayed by the display 509 according to the present invention.
Figure 40B:
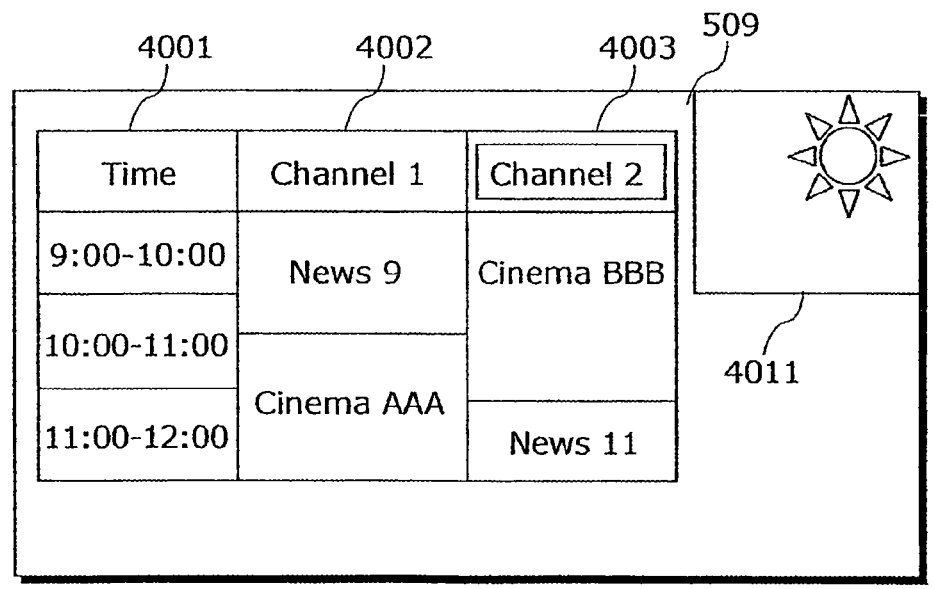
FIG. 40B is a diagram showing another example display window displayed by the display 509 according to the present invention.

In the present embodiment, consider the case where the user presses down the EPG button 1407 on the input unit 513 when the display 509 is as shown in FIG. 37. When the user presses down the EPG button 1407 on the input unit 513, the program display unit 8102 of the EPG 8101 receives its identifier, and shows program information on the display 509. FIG. 38 illustrates the display 509 when the EPG button 1407 is pressed down. 3801 is an EPG. FIG. 40A and FIG. 40B show examples of the EPG 3801 displayed on the display 509. Referring to FIG. 40A, the program information is displayed on the display 509 in a grid pattern. A column 4001 describes time information. A column 4002 describes a service name "Channel 1" and programs to be broadcast during time periods corresponding to the respective times described in the column 4001. It is shown that a program "News 9" is broadcast from 9:00 to 10:30, and "Cinema AAA" is broadcast from 10:30 to 12:00 on "Channel 1". A column 4003 describes a service name "Channel 2" and programs to be broadcast during time periods corresponding to the respective times described in the column 4001, as in the case of the column 4002. A program "Cinema BBB" is broadcast from 9:00 to 11:00, and "News 11" is broadcast from 11:00 to 12:00. 4030 is a cursor. The cursor 4030 moves at the press of the left-cursor 1403 or the right-cursor 1404 on the front panel 1400. When the right-cursor 1404 is pressed down in the state illustrated in FIG. 40A, the cursor 4030 moves toward right as shown in FIG. 40B. Meanwhile, when the left-cursor 1403 is pressed down in the state illustrated in FIG. 40B, the cursor 4030 moves toward left as shown in FIG. 40A.

When the OK button 1405 on the front panel 1400 is pressed down in the state shown in FIG. 40A, the program display unit 8102 notifies the reproduction unit 8103 of the identifier of "Channel 1". Meanwhile, when the OK button 1405 on the front panel 1400 is pressed down in the state shown in FIG. 40B, the program display unit 1702a notifies the reproduction unit 1402b of the identifier of "Channel 2".

Furthermore, the program display unit 8102 periodically stores program information to be displayed from the head end 101 into the primary storage unit 511 via the POD 504. Generally, it takes time to obtain program information from the head end. However, it becomes possible to quickly display a program table by displaying the program information that is pre-stored in the primary storage unit 511 at the press of the EPG button 1407 on the input unit 513.

4010 and 4011 in FIG. 40A and FIG. 40B show the video and audio being reproduced of the respective services on which the cursors are placed. When reproducing video and audio, a Java program included in an Abstract service specifies the identifiers of video and audio that are wished to be reproduced, using the program JMF 1705a, and reproduces them using the audio decoder A506a or the audio decoder B506b, and the video decoder A508a or the video decoder B508b.

In the present embodiment, in order to specify which set of resources is to be used for reproducing video and audio by a Java program included in an Abstract service running on the ServiceContext for Abstract service, the ServiceContext for Abstract service is associated with either of the ServiceContexts for In-band service A2106 or B2107.

FIG. 39 shows the ServiceContext for Abstract service. The ServiceContext setting unit 3902 associates the ServiceContext for Abstract service with the ServiceContext for In-band service A. By a Java program indicating the ServiceContext for In-band A2106 to the ServiceContext setting unit 3902, it becomes possible to identify the set of resources A2410 as a set of resources to be used.

Figure 43:
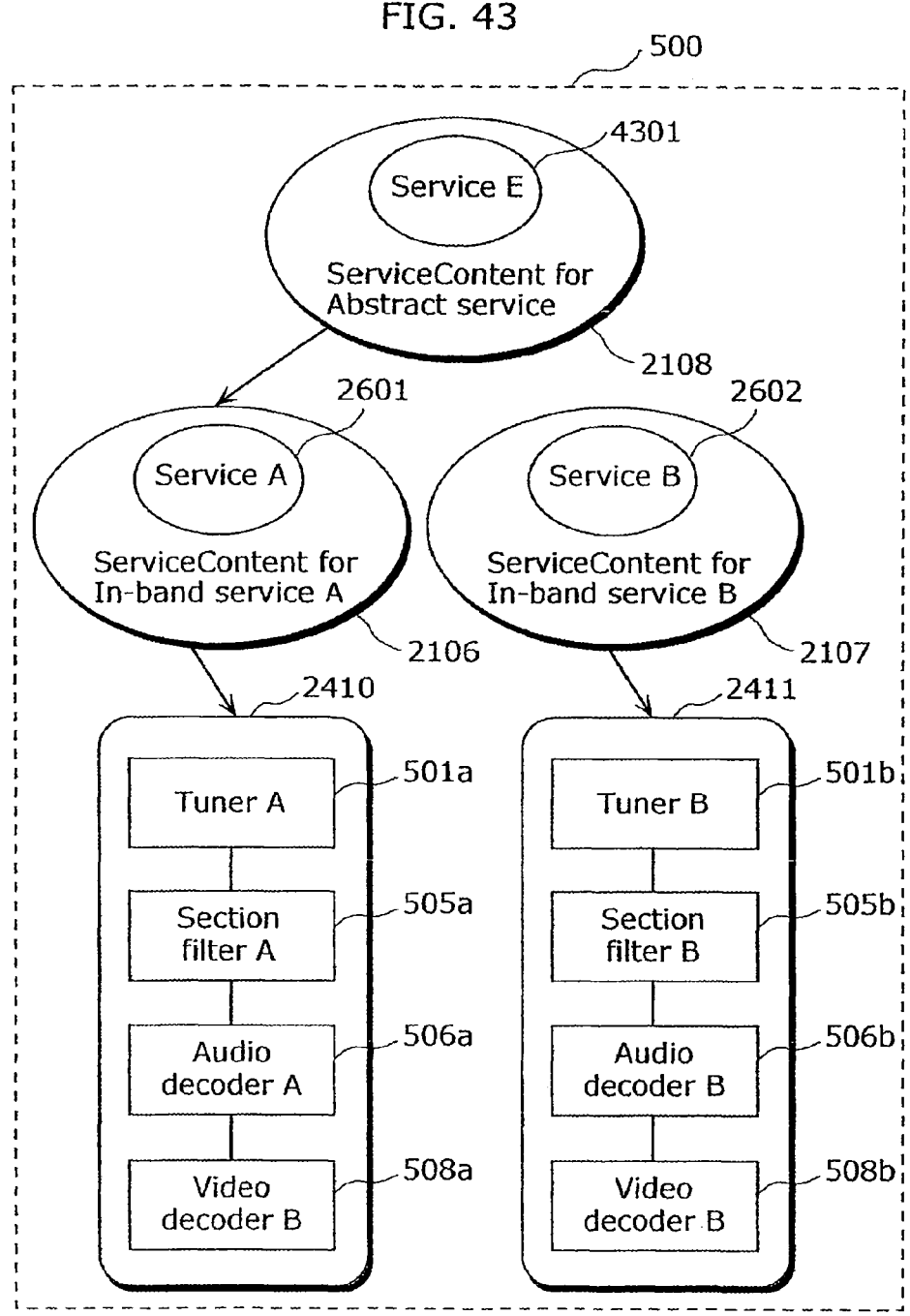
FIG. 43 is a diagram showing a relationship between the ServiceContexts and the sets of resources according to the present invention.

FIG. 43 is a diagram showing the ServiceContext for Abstract service being associated with the ServiceContext for In-band service A. 2108 is the ServiceContext for Abstract service, on which an Abstract service E4301 runs. The other elements are the same as those shown in FIG. 26, and therefore no description is given of them. In FIG. 43, it is possible to specify a set of resources identified by the ServiceContext A2106 by associating the ServiceContext 2108 for Abstract service with the ServiceContext A2106.

Figure 44:
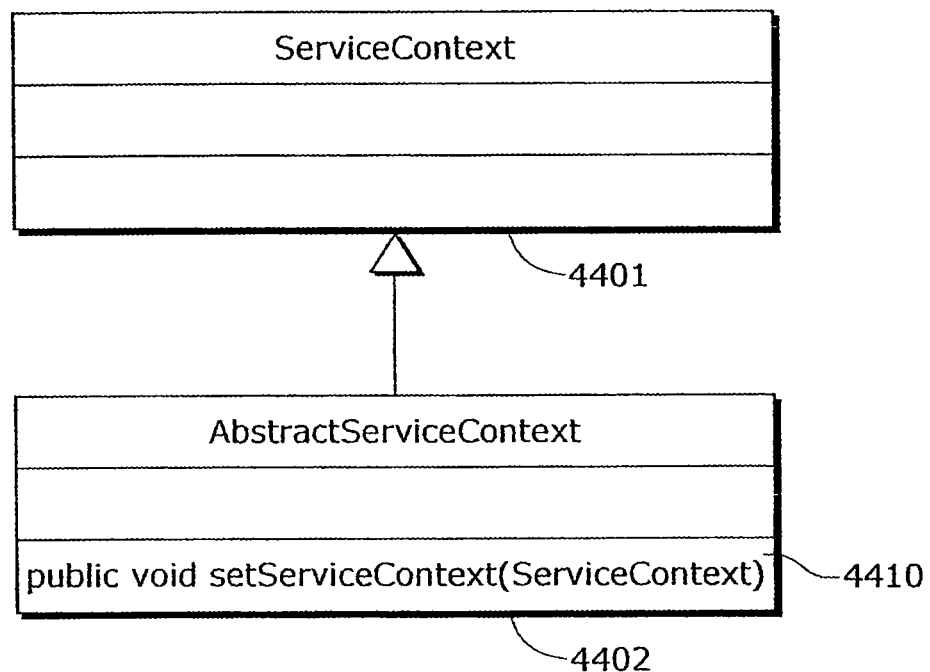
FIG. 44 is a diagram showing a Java class according to the present invention.

FIG. 44 shows an example method of associating the ServiceContext for Abstract service with a ServiceContext for In-band service.

In FIG. 44, the ServiceContext for Abstract service is defined as AbstractServiceContext class 4402. The AbstractServiceContext class 4402 inherits ServiceContext class 4401 of the ServiceContext for In-band service. The service execution unit 2201 shown in FIG. 39 is the same as the ServiceContext class 4401. The ServiceContext setting unit 3902 defines a method. In FIG. 44, a setServiceContext (ServiceContext) method 4410 is defined as an example. It is possible to identify a set of resources held by the ServiceContext for In-band service by specifying, as an argument of such method, the ServiceContext for In-band service which is wished to be associated.

In the present embodiment, it is possible for the ServiceContext for Abstract service to identify a set of resources by specifying, as an argument of setServiceContext (ServiceContext), one of two ServiceContexts for In-band service. For example, it is possible to specify which one of the two In-band services 3701 and 3501 shown in FIG. 37 should display an Abstract service.

Figure 45:
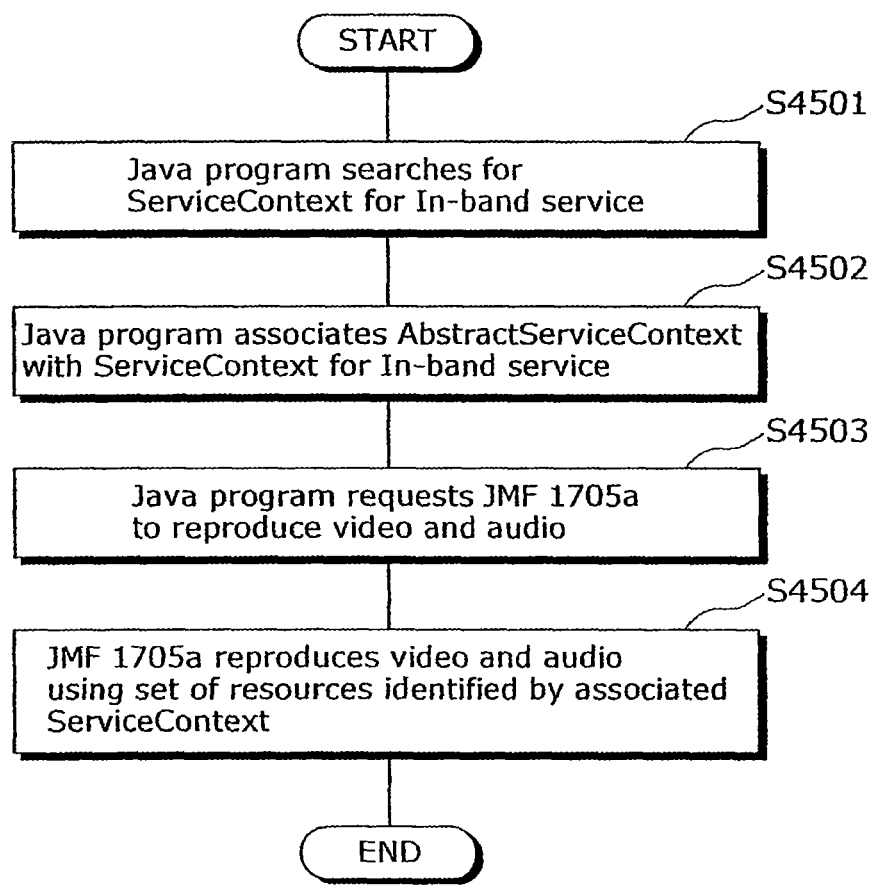
FIG. 45 is a flowchart for reproducing video and audio according to the present invention.

FIG. 45 is a flowchart showing processing to be performed by a Java program included in an Abstract service when reproducing video and audio.

The present embodiment presents an example in which a Java program representing an EPG uses resources for the ServiceContext for In-band service A as shown in FIG. 38. The Java program obtains a ServiceContext for In-band service from the ServiceContext obtainment unit of the service manager 1704 (Step S4501). Next, using setServiceContext (ServiceContext) 4410, the Java program associates the ServiceContext for Abstract service 2108 with the ServiceContext for In-band service A2106. The ServiceContext specified as an argument is to be retained by the ServiceContext holding unit 3903 of the ServiceContext for Abstract service 2108 (Step S4502). The Java program requests the JMF 1705a to obtain an instance (resource set information) of a Java class representing a set of resources, and to reproduce video and audio using such instance (Step S4503). The JMF 1705a reproduces the specified video and audio using the set of resources A2410 specified by such instance (Step S4504). Here, the details of Step S4503 are as shown in FIG. 28.

Figure 46:
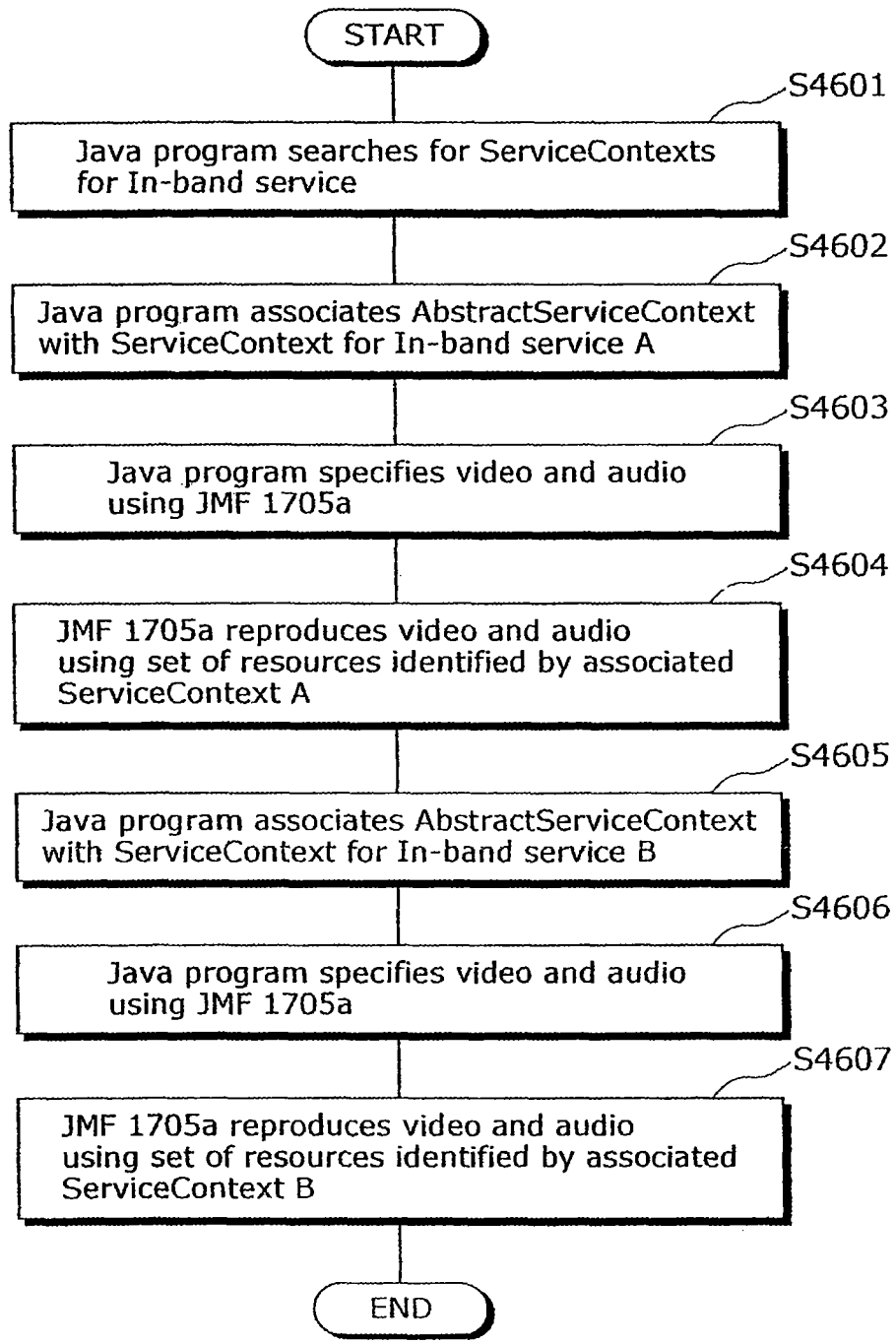
FIG. 46 is a flowchart for reproducing video and audio according to the present invention.

Furthermore, when a Java program included in the ServiceContext for Abstract service wishes to reproduce two pieces of video and audio data, it is possible to reproduce such pieces video and audio data by following the procedure shown in FIG. 46.

First, the Java program obtains ServiceContexts for In-band service from the ServiceContext obtainment unit of the service manager 1704 (Step S4601). Next, using setServiceContext (ServiceContext) 4410, the Java program associates the ServiceContext for Abstract service 2108 with the ServiceContext for In-band service A2106 (Step S4602). The Java program requests the JMF 1705*a* to obtain an instance of a Java class representing a set of resources, and to reproduce video and audio by specifying such video and audio using such instance (Step S4603). The JMF 1705*a* reproduces the specified video and audio using the set of resources A2410 specified by such instance (Step S4604). Then, the Java program associates the ServiceContext for Abstract service with the ServiceContext for In-band service B2107 by use of a method of AbstractServiceContext, setSeriveContext(ServiceContextB) 4410 (Step S4605). The Java program requests the JMF 1705*a* to obtain an instance of a Java class representing a set of resources, and to reproduce video and audio by specifying such video and audio using such instance (S4606). The JMF 1705*a* reproduces the specified video and audio using the set of resources A2410 specified by such instance (Step S4607). As described above, it is also possible to control plural sets of resources. Note that in the present embodiment, a ServiceContext for In-band service is explicitly associated to the ServiceContext for Abstract service, but it is also possible to associate a certain ServiceContext for In-band service by default.

Also, the present embodiment presents an example of the ServiceContext for Abstract service that is associated with a ServiceContext for In-band service, but there may exist a ServiceContext for Abstract service that cannot be associated with another ServiceContext.

Note that the POD 504 is detachable in the present embodiment, but it is also possible to carry out the present invention if the POD 504 is embedded into the terminal apparatus 500. When the POD 504 is embedded, the CPU 706 of the POD 504 may be removed and the CPU 514 performs the operation of the CPU 706.

Moreover, it is also possible to carry out the present invention if not only downloaded Java programs but also pre-stored Java programs are to be registered in the POD Lib 1705*e*. Furthermore, it is also possible to provide a slot unit for inserting/ejecting a detachable storage medium such as an SD memory card, so as to load Java programs from it. Also, a network unit to get connected to a network may be provided, so as to load Java programs from the Internet.

Second Embodiment

The present embodiment describes a ServiceContext for Abstract service with a configuration that is different from that of the ServiceContext for Abstract service shown in FIG. 39 that is defined in the first embodiment. The other part is the same as the first embodiment, and therefore descriptions are given in the present embodiment, focusing on the configuration of the ServiceContext for Abstract service, especially how the ServiceContext for Abstract service and a ServiceContext for In-band service are associated with each other.

Figure 47:
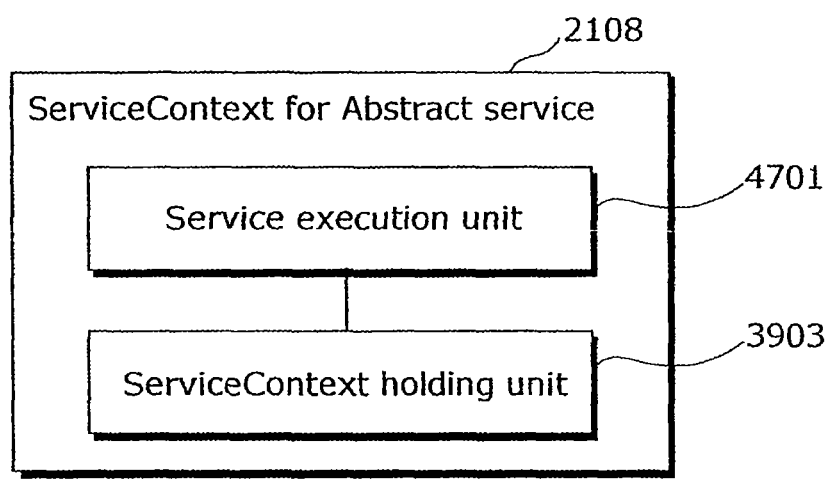
FIG. 47 is a diagram showing a configuration of a ServiceContext for Abstract service.
Figure 49:
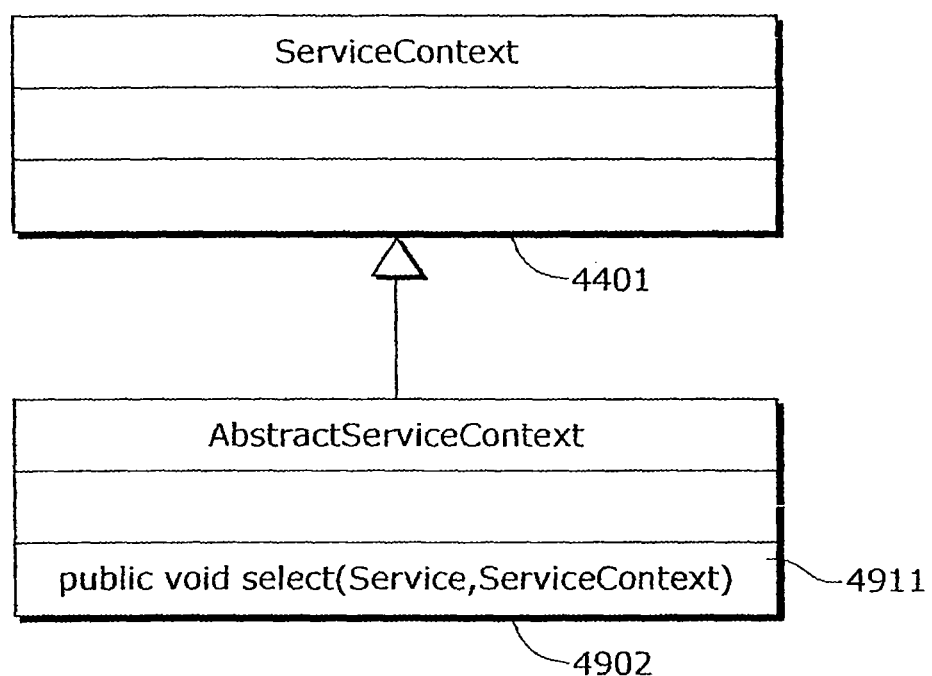
FIG. 49 is a diagram showing a Java class according to the present invention.

FIG. 47 shows the ServiceContext for Abstract service in the present embodiment. Its constituent elements are a service execution unit 4701 and the ServiceContext holding unit 3903. The service execution unit 4701 associates the ServiceContext for Abstract service with a ServiceContext for In-band service by receiving the ServiceContext for In-band service at the time when the service execution unit 4701 of the ServiceContext for Abstract service 2108 receives the service identifier. Such received ServiceContext for In-band service is retained in the ServiceContext holding unit 3903. FIG. 49 shows an example method of associating the ServiceContext for Abstract service with the ServiceContext for In-band service. The ServiceContext 4401 shown in FIG. 49 is as defined in FIG. 44. The AbstractServiceContext class 4902 inherits the ServiceContext class 4401. The service execution unit 4701 newly has select (Service, ServiceContext) 4911, which is a method for executing services. Using this method, an Abstract service specified as an argument is executed, and at the same time, a ServiceContext for In-band service specified as an argument is stored into the ServiceContext holding unit 3903 so as to be associated with the above Abstract service. Accordingly, when the Abstract service specified on the ServiceContext for Abstract service is to be executed, a set of resources specified by such ServiceContext for In-band service is used. Furthermore, when a Java program included in the Abstract service requires some resources (e.g. reproduction of video and audio), resources identified by the ServiceContext specified as an argument in the select method are to be used.

Figure 50:
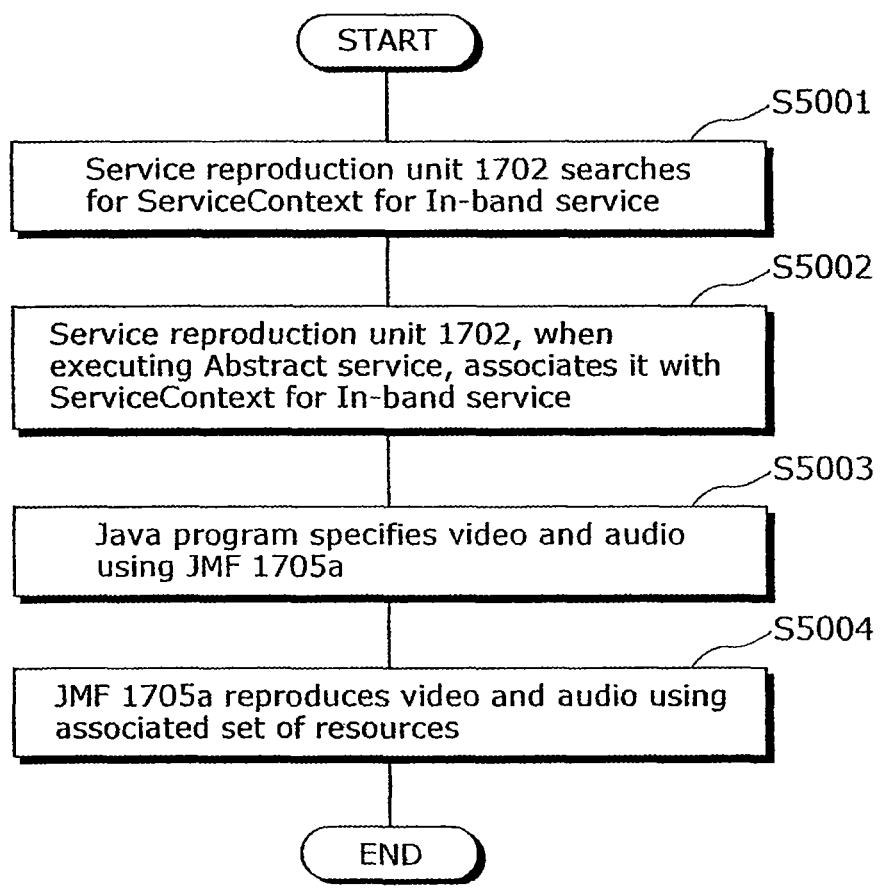
FIG. 50 is a flowchart for reproducing video and audio according to the present invention.

FIG. 50 is a flowchart in the present embodiment. The service reproduction unit 1702 obtains a ServiceContext for In-band service from the ServiceContext obtainment unit 2002 of the service manager 1704 (Step S5001). When executing an Abstract service, the service reproduction unit 1702 stores a ServiceContext for In-band service specified as an argument into the ServiceContext holding unit 3903, by specifying such ServiceContext for In-band service in the select (Service, ServiceContext) method 4911 of the Abstract service (Step S5002). The Java program requests the JMF 1705*a* to obtain an instance of a Java class representing a set of resources, and to reproduce video and audio by specifying such video and audio using such instance (Step S5003). The JMF 1705*a* reproduces the specified video and audio using the set of resources A2410 or the set of resources B2411 identified by the instance obtained in Step S5003 (Step S5004). Here, the details of Step S5003 are as shown in FIG. 28.

Third Embodiment

The present embodiment is different from the first embodiment in the method of associating the ServiceContext for Abstract service 2108 with a ServiceContext for In-band service. The other part is the same as the first embodiment, and therefore descriptions are given in the present embodiment, focusing on how the ServiceContext for Abstract service and a ServiceContext for In-band service are associated with each other.

Figure 51:
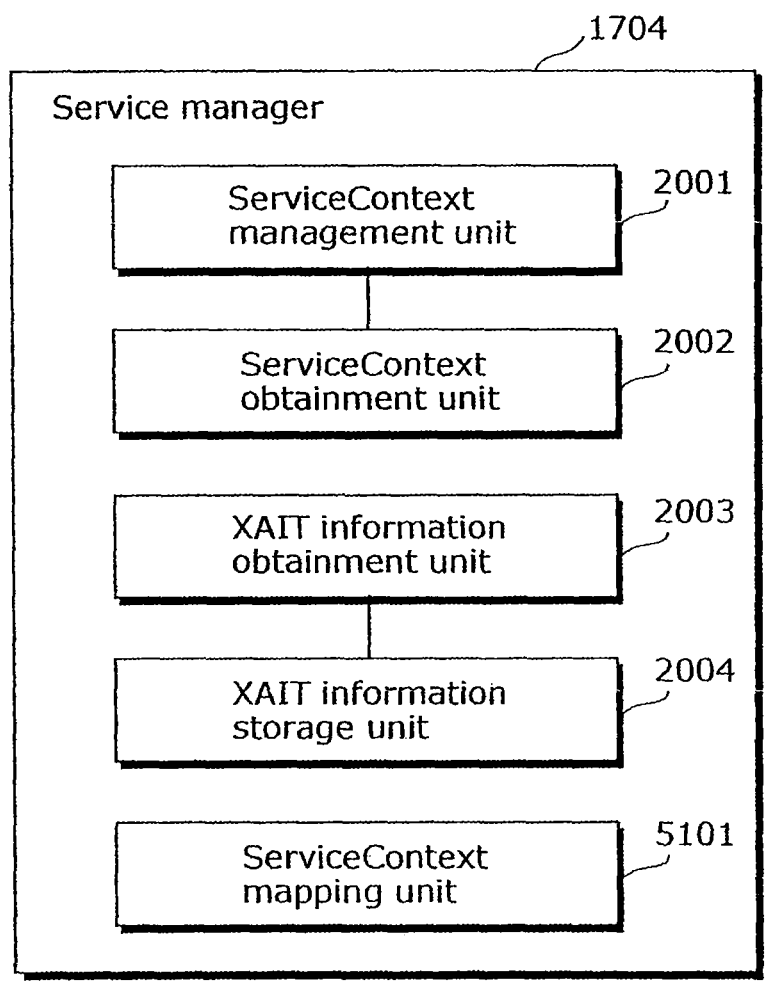
FIG. 51 is a diagram showing a configuration of the service manager 1704 according to the present invention.
Figure 52:
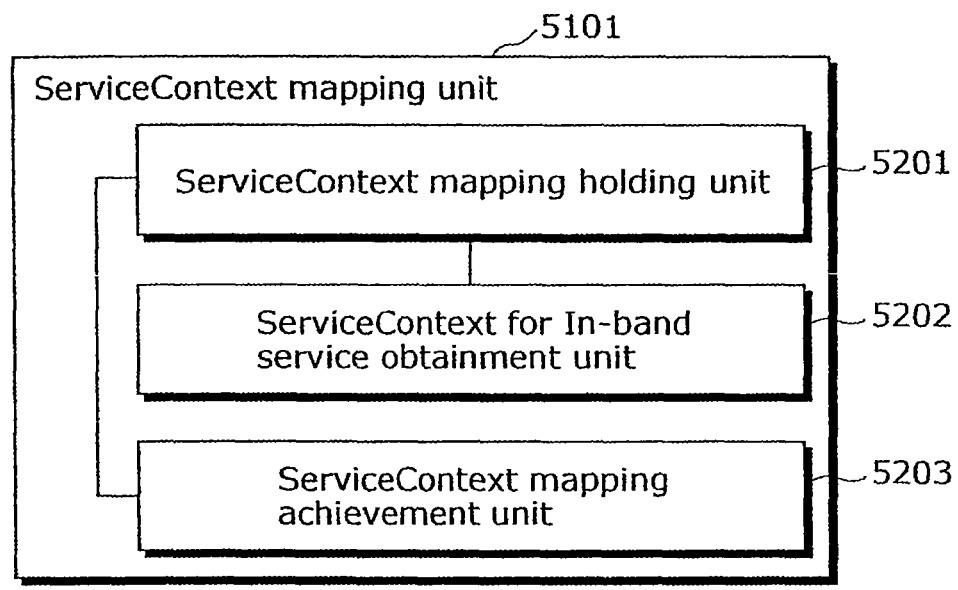
FIG. 52 is a diagram showing a configuration of a ServiceContext mapping unit according to the present invention.
Figure 53:
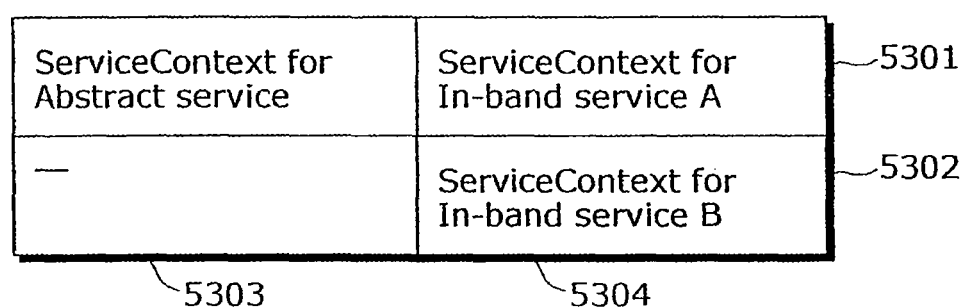
FIG. 53 is a diagram showing an example of a ServiceContext mapping holding unit according to the present invention.

FIG. 51 shows the configuration of the service manager 1704 in the present embodiment. In the present embodiment, the ServiceContext for Abstract service and a ServiceContext for In-band service are associated by the ServiceContext mapping unit 5101 of the service manager 1704. The ServiceContext mapping unit 5101 holds the relationship between the ServiceContext for Abstract service and a ServiceContext for In-band service. FIG. 52 shows the configuration of the ServiceContext mapping unit 5101. The ServiceContext mapping unit 5101 is comprised of a ServiceContext mapping holding unit 5201, a ServiceContext for In-band service obtainment unit 5202, and a ServiceContext mapping achievement unit 5203. FIG. 53 shows an example of the ServiceContext mapping holding unit 5201. In FIG. 53, a column 5303 describes the ServiceContext for Abstract service and a column 5304 describes ServiceContexts for In-band service. In lines 5301 and 5302, ServiceContexts for In-band service and Abstract service in the same line are associated with each other. Service contexts in the same line use the same set of resources.

Note that in FIG. 53, one ServiceContext for In-band service is associated with one ServiceContext for Abstract service at greatest, but it is possible to carry out the present invention if a plurality of ServiceContexts for Abstract service are associated with a single ServiceContext for In-band service.

Figure 48:
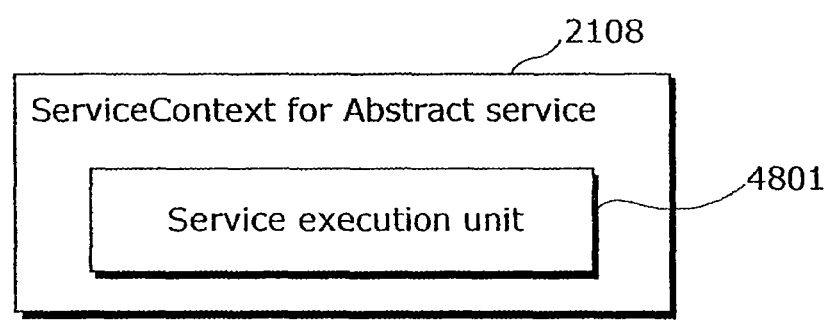
FIG. 48 is a diagram showing a configuration of the ServiceContext for Abstract service.

The ServiceContext for In-band service obtainment unit 5202 obtains, from the ServiceContext mapping holding unit 5203, a ServiceContext for In-band service to which the ServiceContext for Abstract service is associated, and returns it. The ServiceContext mapping achievement unit 5203 associates the ServiceContext for Abstract service and the ServiceContext for In-band service with each other. FIG. 48 shows the ServiceContext for Abstract service according to the present embodiment. The ServiceContext for Abstract service includes a service execution unit 4801. Upon receipt of a service identifier, the service execution unit 4801 obtains a ServiceContext for In-band service stored in the ServiceContext mapping unit 5101, and specifies a set of resources to execute a service.

FIG. 54 shows an example method of associating the ServiceContext for Abstract service and a ServiceContext for In-band service. In FIG. 54, the ServiceContext mapping unit is represented as ServiceContextMap class 5401. In order to implement the ServiceContext mapping achievement unit 5203, void setServiceContext (AbstractServiceContext, ServiceContext) 5413 is defined. getServiceContext (AbstractServiceContext) 5412 obtains a ServiceContext to which the AbstractServiceContext class specified as an argument is currently associated, from serviceContextMap 5411 that represents the ServiceContext mapping holding unit 5201. setServiceContext(AbstractServiceContext, ServiceContext) 5413 associates two ServiceContexts specified as arguments, and stores the associated ServiceContexts in the serviceContextMap. Meanwhile, as a method for implementing the ServiceContext for In-band service obtainment unit 5202, ServiceContext getServiceContext (AbstractServiceContext)) 5412 for obtaining a ServiceContext for In-band service from the serviceContextMap 5411 is defined.

Figure 55:
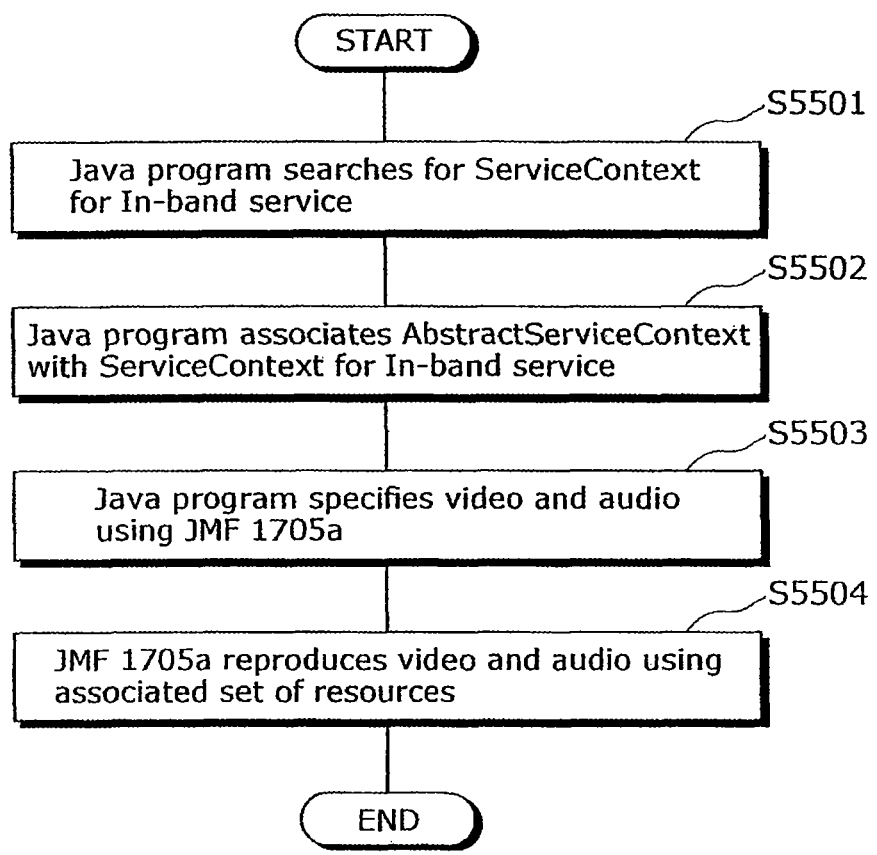
FIG. 55 is a flowchart for reproducing video and audio according to the present invention.

FIG. 55 shows a flowchart in the present embodiment.

A Java program included in an Abstract service obtains a ServiceContext for In-band service from the ServiceContext obtainment unit 2002 of the service manager 1704 (Step S5501). Next, using setServiceContext(AbstractService, ServiceContext) 5413, the Java program associates the ServiceContext for Abstract service 2108 with the ServiceContext A0106 for In-band service (Step S5502). Then, the Java program requests the JMF 1705a to obtain an instance of a Java class representing a set of resources, and to reproduce video and audio by specifying such video and audio using such instance (Step S5503). The JMF 1705a reproduces the specified video and audio using the set of resources A2410 or the set of resources B2411 identified by the instance obtained in Step S5503 (Step S5504).

Fourth Embodiment

Figure 56:
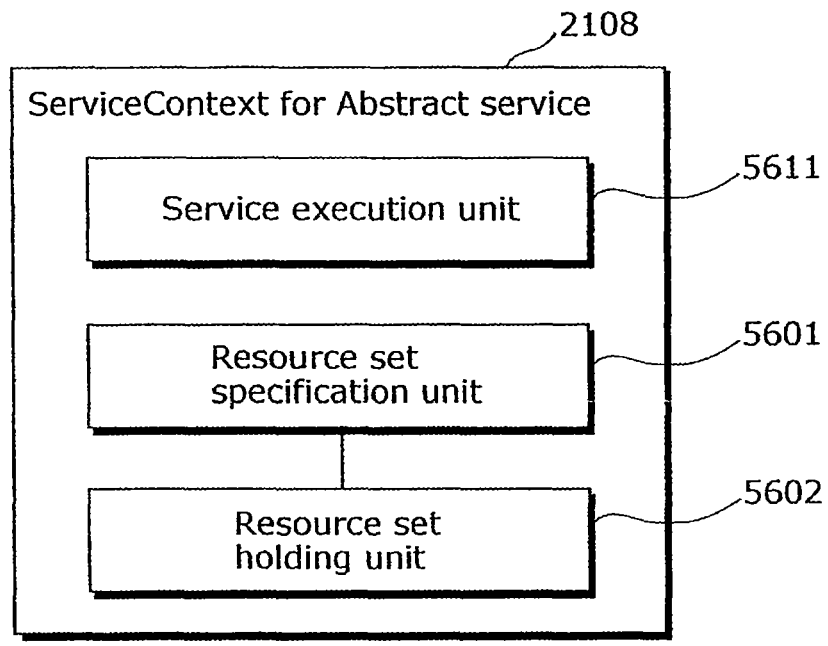
FIG. 56 is a diagram showing a configuration of the ServiceContext for Abstract service.
Figure 58:
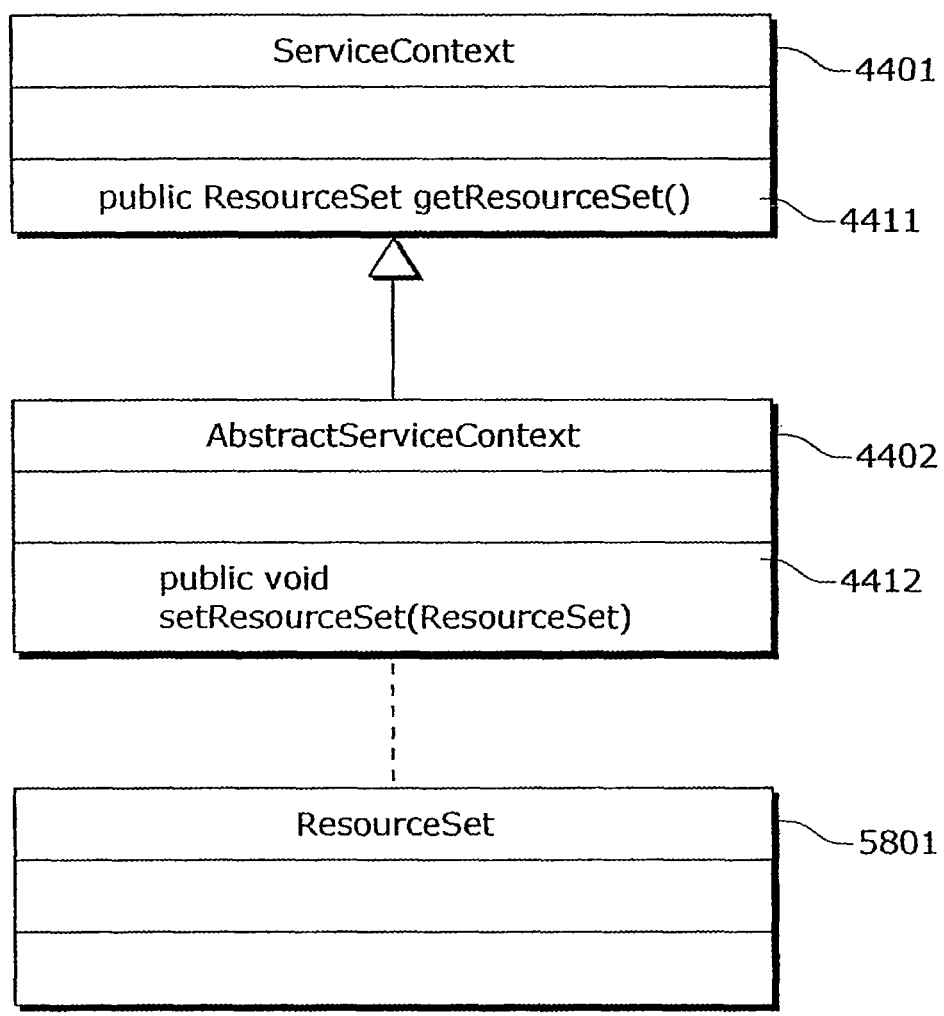
FIG. 58 is a diagram showing a Java class according to the present invention.

In the first to third embodiments, a set of resources is specified by associating the ServiceContext for Abstract service with a ServiceContext for In-band service. The present embodiment, unlike the first to third embodiments, is achieved by indicating a set of resources directly to the ServiceContext for Abstract service. The other part is the same as the first embodiment, and therefore descriptions are given in the present embodiment, focusing on how a set of resources and the ServiceContext for Abstract service are mapped. FIG. 22 shows a configuration of the ServiceContext for In-band service according to the present embodiment, whereas FIG. 56 shows the configuration of the ServiceContext for Abstract service. The ServiceContext for Abstract service is comprised of a service execution unit 5611, a resource set specification unit 5601, and a resource set holding unit 5602. In FIG. 56, the service execution unit 5611, upon receipt of a service identifier, obtains a set of resources from the resource set obtainment unit 2203 of a ServiceContext for In-band service, identifies such set of resources, and executes a service. It is possible for the resource set specification unit 5601 to associate the ServiceContext for Abstract service with the set of resources, by specifying such set of resources obtained in the resource set obtainment unit 2203. The set of resources specified by the resource set specification unit 5601 are held by the resource set holding unit 5602. FIG. 58 shows an example method of associating the ServiceContext for Abstract service with a set of resources. In FIG. 58, getResourceSet( ) 4411 is newly defined as the resource set obtainment unit 2203 in the ServiceContext for In-band service. This method makes it possible to obtain an associated set of resources. The AbstractServiceContext class 4402 inherits the class of the ServiceContext for In-band service, and the resource set specification unit 5601 newly defines a method. In FIG. 58, a method, setResourceSet(ResourceSet) 4412, is defined as an example. Here, the ResourceSet 5801 specified as an augment is a class representing a set of resources. It is possible to specify a set of resources by specifying a set of resources that is whished to be associated, as an argument of this method.

Figure 60:
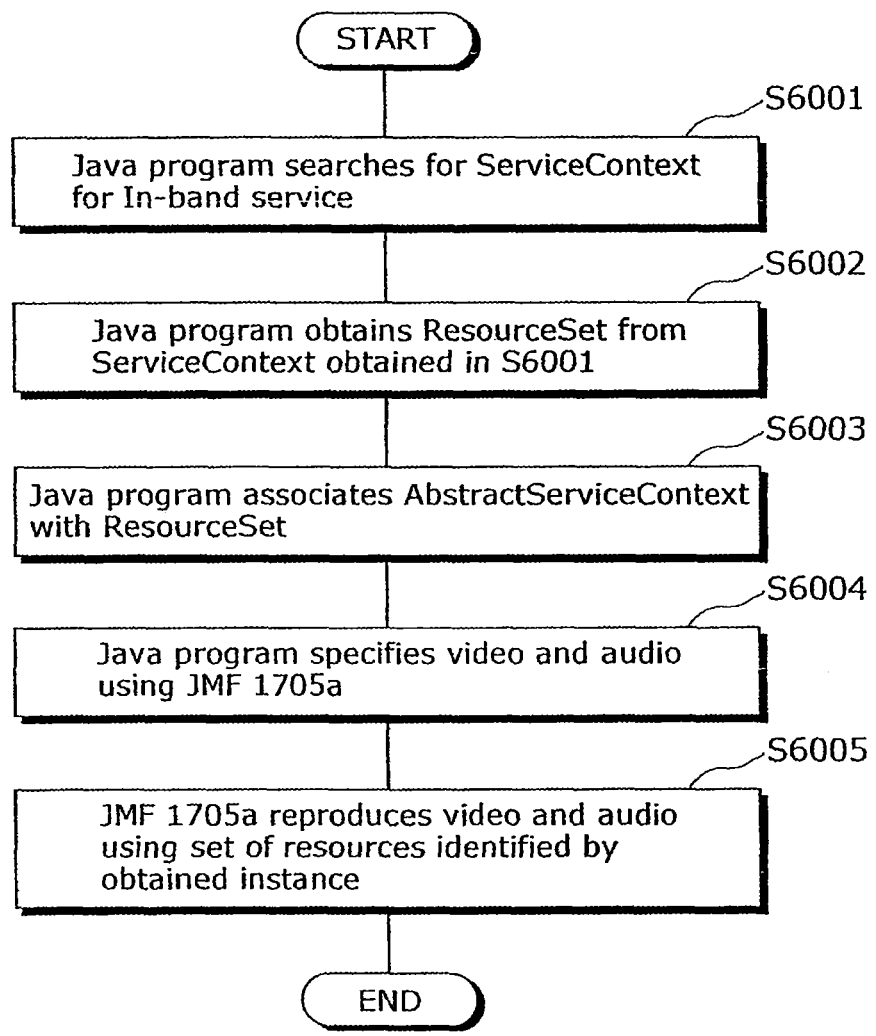
FIG. 60 is a flowchart for reproducing video and audio according to the present invention.

FIG. 60 shows a flowchart in the present embodiment.

A Java program included in an Abstract service obtains a ServiceContext for In-band service from the ServiceContext obtainment unit of the service manager 1704 (Step S6001). Then, the Java program obtains a ResourceSet from the obtained ServiceContext for In-band service, using getResourceSet( ) (Step S6002). Next, using setResourceSet (ResourceSet), the Java program associates the ServiceContext for Abstract service 2108 with the ResourceSet 5801 (Step S6003). Then, the Java program requests the JMF 1705a to obtain an instance of a Java class representing a set of resources, and to reproduce video and audio by specifying such video and audio using such instance (Step S6004). The JMF 1705a reproduces the specified video and audio using the set of resources A2410 or the set of resources B2411 identified by the instance obtained in Step S6003 (Step S6005).

Figure 59:
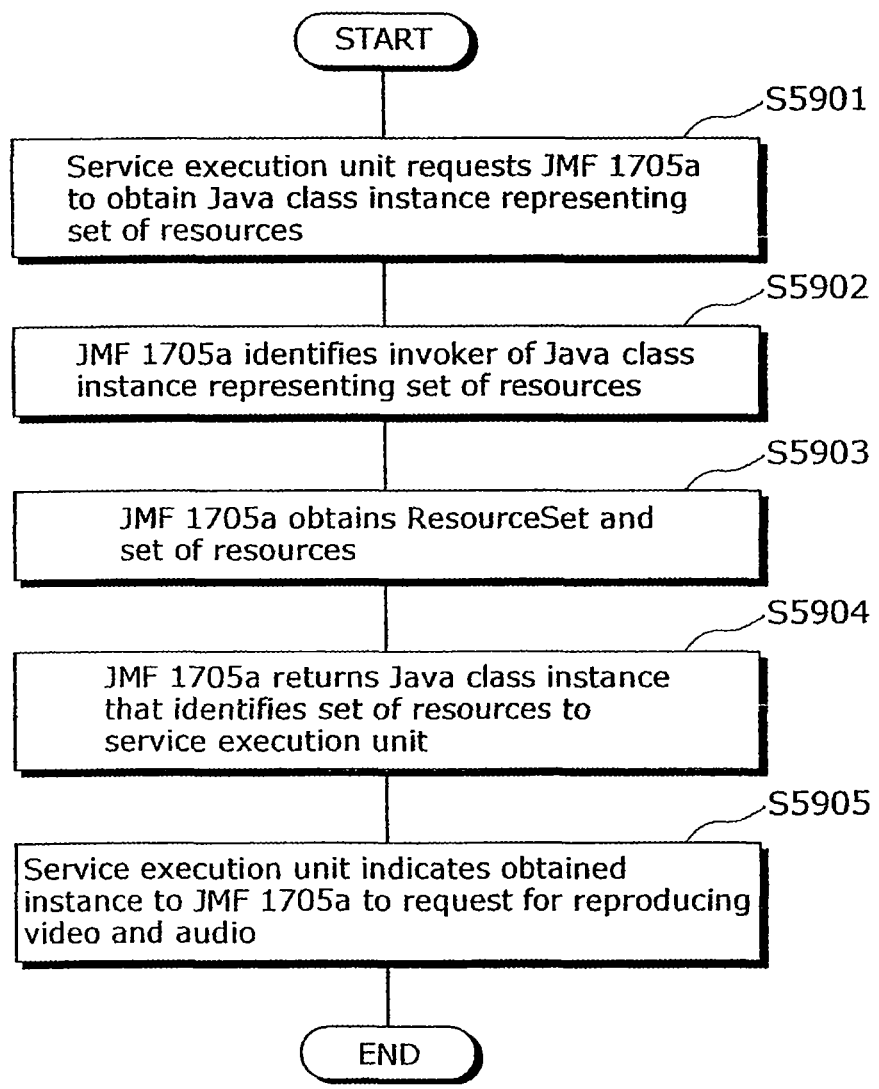
FIG. 59 is a flowchart for obtaining an instance of a Java class that reproduces video and audio according to the present invention.

Here, a detailed flowchart of Step S6004 is shown in FIG. 59. First, the service execution unit 5611 requests the JMF 1705a to obtain an instance of a Java class that represents resources required for reproducing video and audio (the TS decoder A505a, the audio decoder 506a, and the video decoder 508a) (Step S5901). The JMF 1705a specifies the invoker of the instance of the Java class representing the resources required for reproducing video and audio by a thread, for example (Step S5902). Here, it is possible for a thread to identify a Java program according to a group to which such thread belongs. And it is possible to obtain the service from such Java program, and obtain the ServiceContext A2106 as well as the ResourceSet and the set of resources after making an enquiry to the service manager 1704 (Step S5903). The JMF 1705a returns an instance of a Java class representing a set of resources for reproducing video and audio that are included in the set of resources 2410 obtained in Step S903 (Step S5904). The service execution unit 2201 requests the JMF 1705a to reproduce video and audio using the instance obtained in Step S5904 (Step S5905). In other words, the JMF 1705a functions as a resource management unit that obtains the set of resources (information including resource set information) associated with the ServiceContext A2106, and provides such obtained resource set information to the service.

Fifth Embodiment

In the present embodiment, unlike the first to third embodiments, resources to be used are specified by directly indicating a set of resources to the ServiceContext for Abstract service. The other part is the same as the first embodiment, and therefore descriptions are given in the present embodiment, focusing on how a set of resources and the ServiceContext for Abstract service are mapped.

The configuration of a ServiceContext for In-band service according to the present embodiment is as shown in FIG. 22, and therefore a description of it is omitted.

Figure 57:
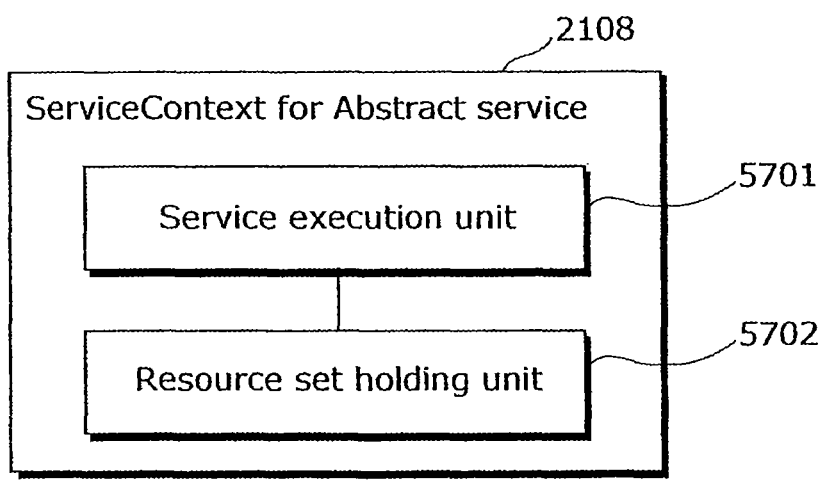
FIG. 57 is a diagram showing a configuration of the ServiceContext for Abstract service.

FIG. 57 is a diagram showing the configuration of the ServiceContext for Abstract service (service execution environment). The ServiceContext for Abstract service is comprised of a service execution unit 5701 (service execution unit) and a resource set holding unit 5702. The ServiceContext for Abstract service and a set of resources (information that includes resource set information indicating one or more resources) are associated with each other by receiving such set of resources at the same time of receiving a service identifier in the service execution unit 5701 in the ServiceContext for Abstract service shown in FIG. 57. Furthermore, the received set of resource is held by the resource set holding unit 5702. In other words, since the ServiceContext for Abstract service 2108 having the resource set holding unit 5702 with the above configuration is held by the ServiceContext management unit 2001, this ServiceContext management unit 2001 functions as a holding unit that holds the ServiceContext for Abstract service and the set of resources that are associated with each other.

Figure 61:
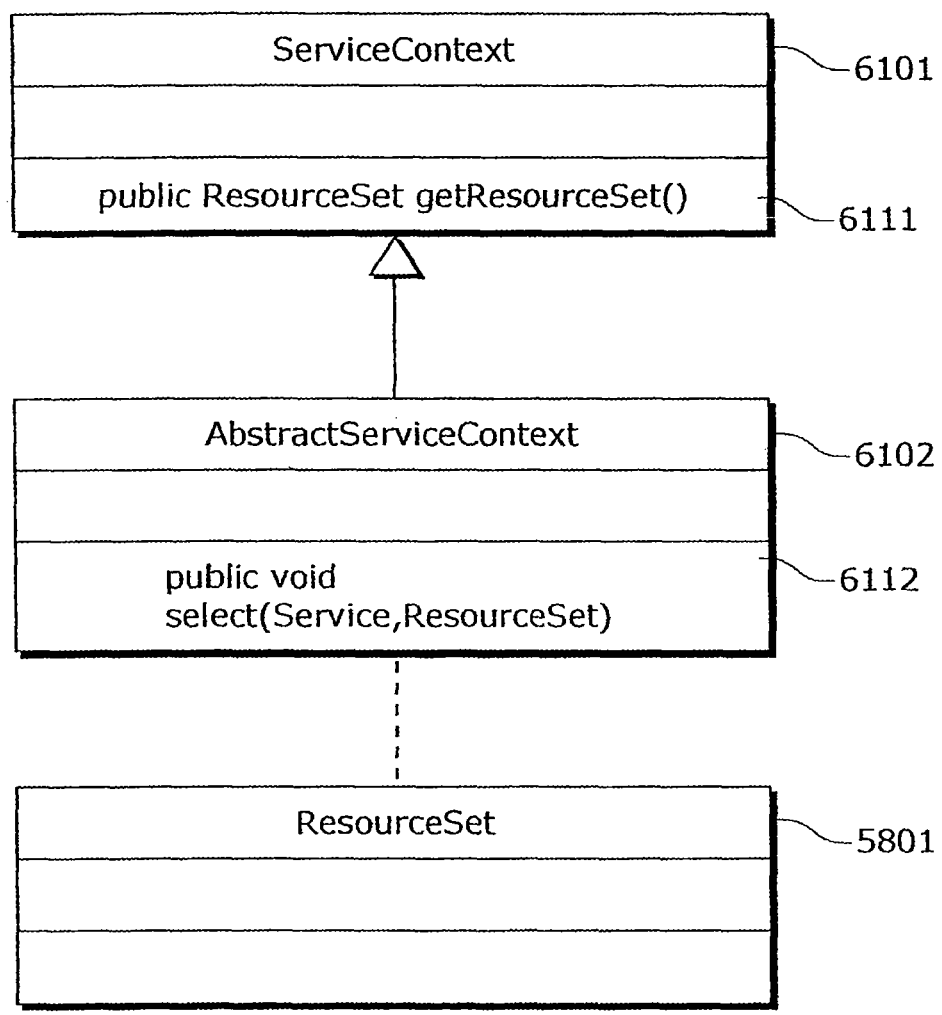
FIG. 61 is a diagram showing a Java class according to the present invention.

FIG. 61 shows an example method of associating the ServiceContext for Abstract service and a set of resources. In FIG. 61, a ServiceContext class 6101 is a ServiceContext for In-band service, an AbstractServiceContext class 6102 is the ServiceContext for Abstract service, and a ResourceSet Class 5801 is a set of resources. getResourceSet( ) 6111 is newly defined in the ServiceContext class 6101, as the resource set obtainment unit 2203. This method makes it possible to obtain a set of resources in use. The AbstractServiceContext class 6102 inherits the ServiceContext for In-band service class 6101. The service execution unit 5701 newly has a select (Service, ResourceSet) method 6112. Here, Service and ResourceSet are classes that indicate an Abstract service and a set of resources, respectively. Using this method, an Abstract service specified as an argument is executed, and associated with a ResourceSet specified as an argument, at the same time. Accordingly, when the Abstract service is executed on the ServiceContext for Abstract service, the specified set of resources is used. Furthermore, when a Java program included in the Abstract service requires some resources (e.g. reproduction of video and audio), a set of resources specified as an argument in the select method is to be used. In other words, this select (Service, ResourceSet) method 6112 functions as an association unit that associates a service execution environment with a set of resources.

As described above, in the present invention, since a ServiceContext that is a service execution environment is associated with a set of resources, it is possible to control one or more resources as a "set" of resources at the time of service execution.

Figure 62:
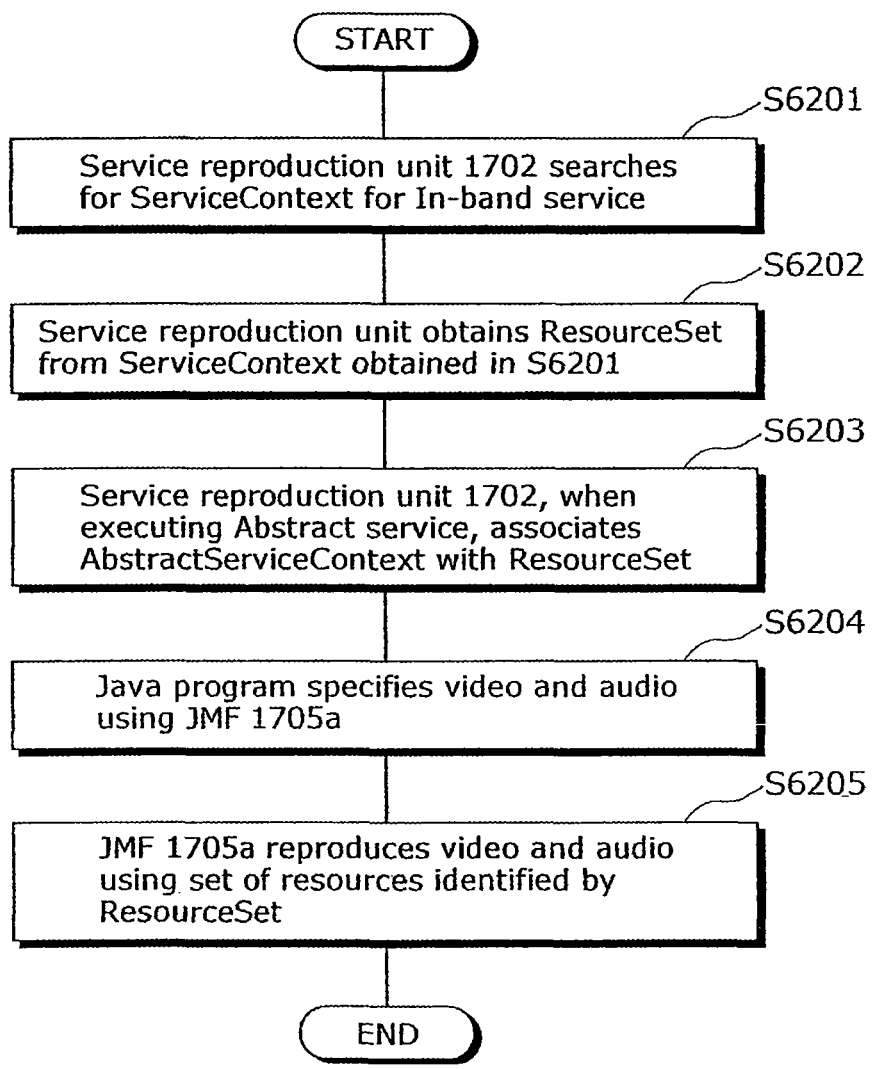
FIG. 62 is a flowchart for obtaining an instance of a Java class that reproduces video and audio according to the present invention.

FIG. 62 shows a flowchart in the present embodiment. The service reproduction unit 1702 obtains a ServiceContext for In-band service from the ServiceContext obtainment unit of the service manager 1704 (Step S6201). Then, the service reproduction unit 1702 obtains a ResourceSet from the obtained ServiceContext for In-band service, using getResourceSet( ) (Step S6202). When executing the Abstract service, the service reproduction unit 1702 specifies a ResourceSet in the select (Service, ResourceSet) method of the AbstractServiceContext, so as to identify the ResourceSet to be used (Step S6203). In other words, the AbstractServiceContext and the ResourceSet are associated with each other. Then, the Java program requests the JMF 1705a to obtain an instance of a Java class representing the set of resources, and to reproduce video and audio by specifying such video and audio using such instance (Step S6204). The JMF 1705a reproduces the specified video and audio using the set of resources A2410 or the set of resources B2411 identified by the ResourceSet that is associated with the AbstractServiceContext in Step S6203 (Step S6205). Here, a detailed flowchart of Step S6204 is as shown in FIG. 59.

Sixth Embodiment

In the present embodiment, unlike the first to third embodiments, resources to be used are specified by directly indicating a set of resources to the ServiceContext for Abstract service. The other part is the same as the first embodiment, and therefore descriptions are given in the present embodiment, focusing on how a set of resources and the ServiceContext for Abstract service are mapped.

Figure 63:
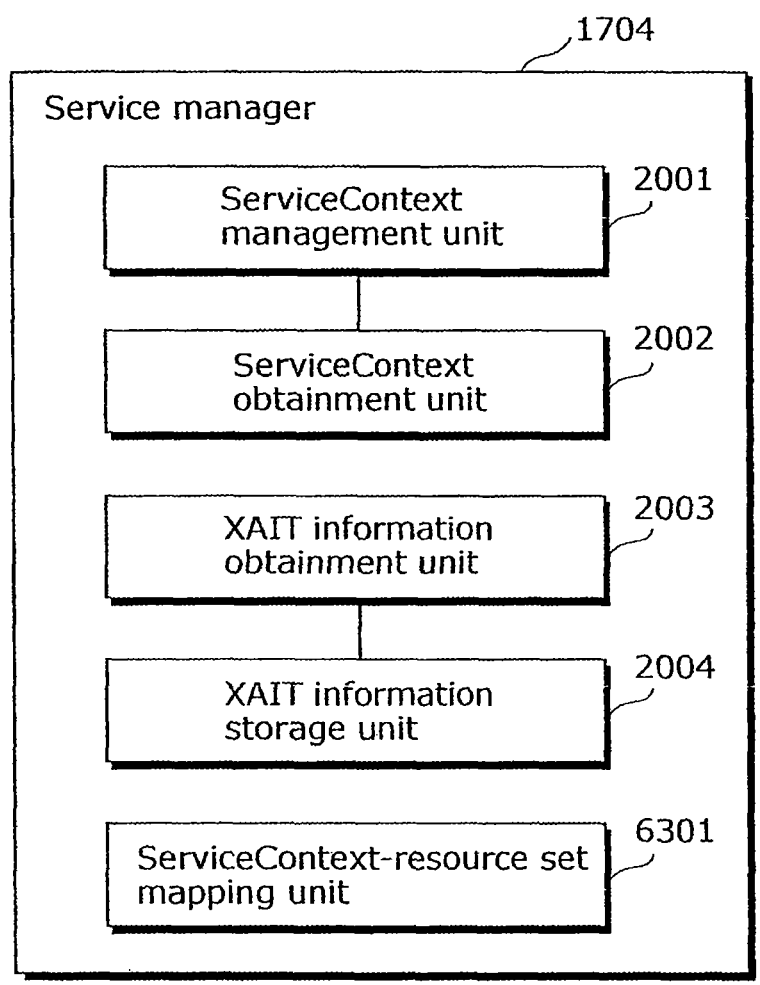
FIG. 63 is a diagram showing a configuration of the service manager 1704 according to the present invention.
Figure 64:
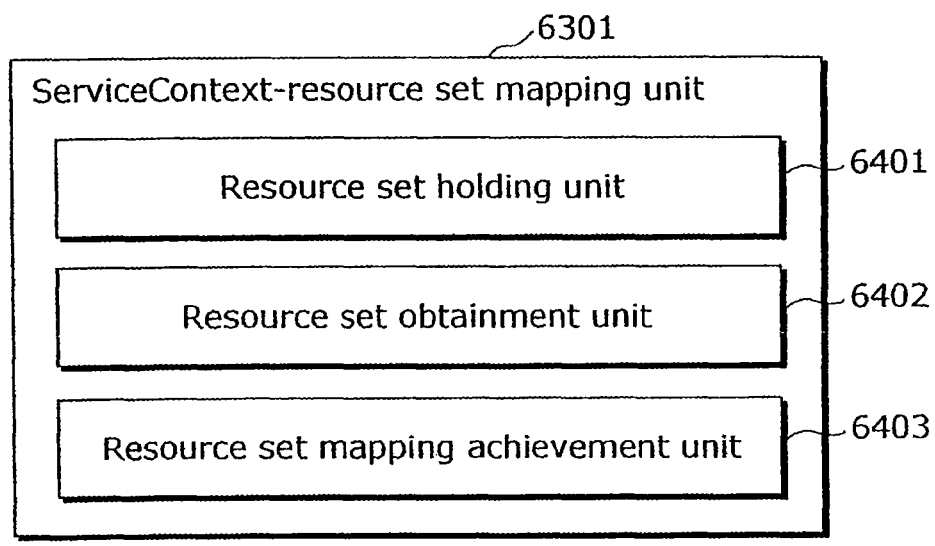
FIG. 64 is a diagram showing a configuration of a ServiceContext-resource set mapping unit according to the present invention.
Figure 65:
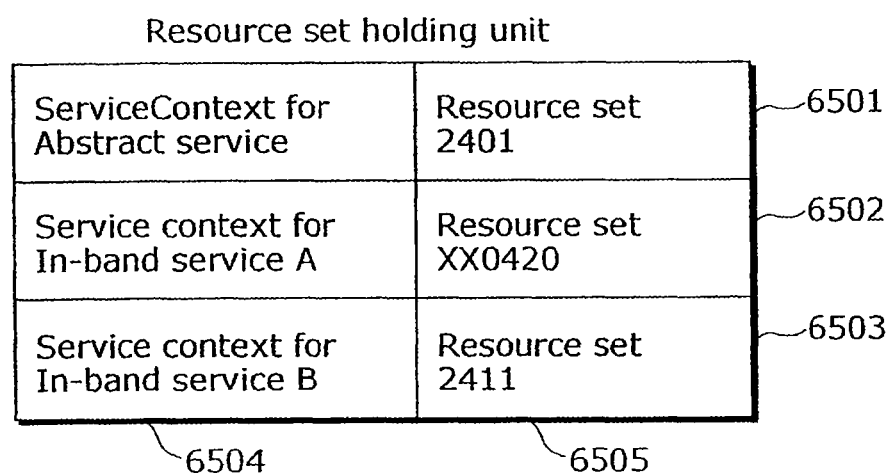
FIG. 65 is a diagram showing an example of a resource set holding unit according to the present invention.

In the present embodiment, the ServiceContext for Abstract service and a set of resources are mapped in the service manager 1704. FIG. 63 shows the configuration of the service manager 1704 according to the present embodiment. In FIG. 63, 6301 is a ServiceContext-resource set mapping unit. The configuration of the ServiceContext-resource set mapping unit is shown in FIG. 64. The ServiceContext-resource set mapping unit 6301 is made up of a resource set holding unit 6401, a resource set obtainment unit 6402, and a resource set mapping achievement unit 6403. FIG. 65 shows the resource set holding unit 6401. In FIG. 65, a column 6504 describes ServiceContexts for Abstract service or In-band service. A column 6505 describes sets of resources. Each of lines 6501-6503 describes a ServiceContext and a set of resources that are associated.

The resource set obtainment unit 6402 obtains a set of resources that is associated with the ServiceContext for Abstract service or a ServiceContext for In-band service. The resource set mapping achievement unit 6403 associates the ServiceContext for Abstract service with the set of resources.

Figure 66:
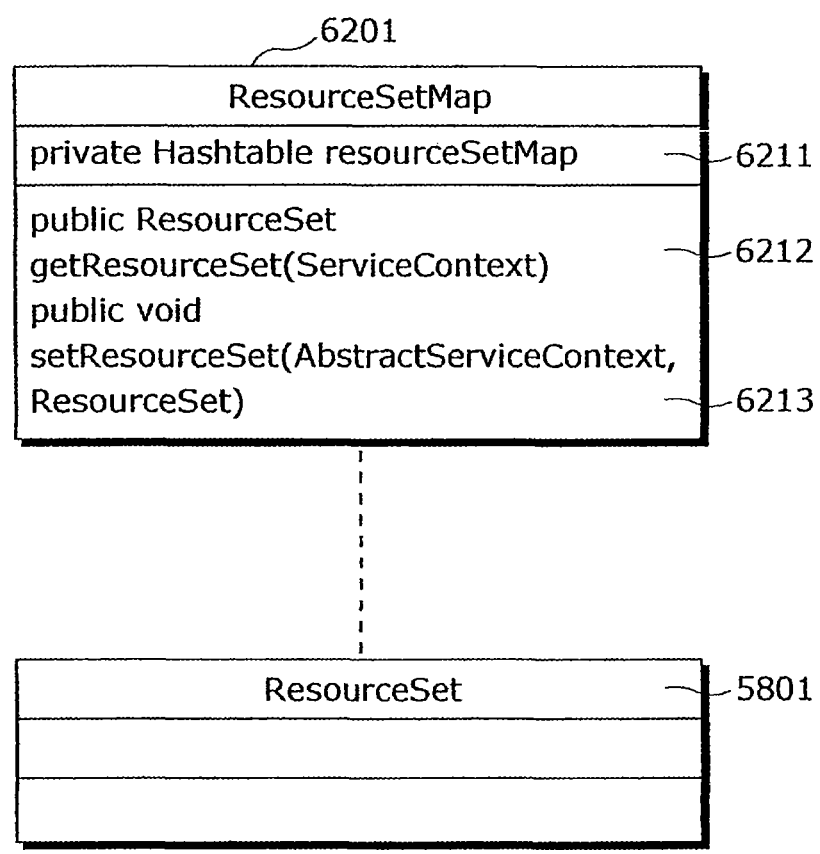
FIG. 66 is a diagram showing a Java class according to the present invention.

FIG. 66 shows an example method of associating the ServiceContext for Abstract service with a set of resources. In FIG. 66, the resource set holding unit 6401 is represented as a resourceSetMap class 6211. As a method to implement the resource set obtainment unit 6402, getResourceSet (ServiceContext) 6212 is defined. Also, as a method to implement the resource set mapping achievement unit 6403, a void setResourceSet (AbstractServiceContext, ResourceSet) Method 6213 is defined. getResourceSet (ServiceContext) 6212 obtains, from the ResourceMap that represents the resource set holding unit 6401, a ResourceSet to which a ServiceContect specified as an argument is associated. setResourceSet (AbstractServiceContext, ResourceSet) 6213 associates the Abstract ServiceContext and ResourceSet that are associated as arguments, and stores such relationship in the ResourceSetMap. Here, the resourceSet 5801 is a class representing a set of resources.

Figure 67:
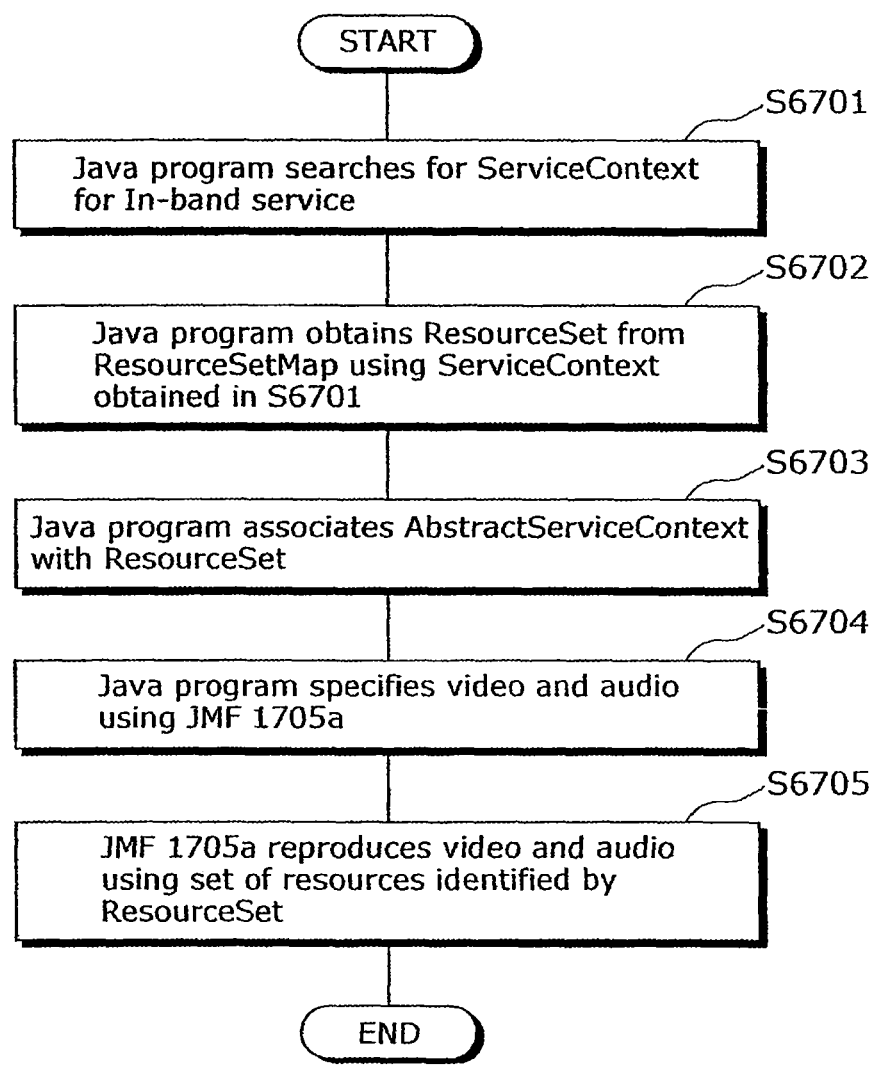
FIG. 67 is a flowchart for reproducing video and audio according to the present invention.

FIG. 67 shows a flowchart in the present embodiment.

A Java program included in an Abstract service obtains a ServiceContext for In-band service from the ServiceContext obtainment unit of the service manager 1704 (Step S6701). Next, the Java program obtains a ResourceSet by the obtained ServiceContext for In-band service, using getResourceSet (ServiceContext) 6212 (Step S6702). Next, the Java program specifies the ResourceSet by use of setResourceSet (AbstractServiceContext, ResourceSet) 6213 in the ResourceSetMap 6201, so as to identify the ResourceSet to be used (Step S6703). In other words, the Java program associates the AbstractServiceContext with the ResourceSet. Then, the Java program requests the JMF 1705a to obtain an instance of a Java class representing the set of resources, and to reproduce video and audio by specifying such video and audio using such instance (Step S6704). The JMF 1705a reproduces the specified video and audio using the set of resources A2410 or the set of resources B2411 identified by the ResourceSet that is associated with the AbstractServiceContext in Step S6703 (Step S6705). Here, a detailed flowchart of Step S6704 is as shown in FIG. 59.

Seventh Embodiment

In the present embodiment, unlike the first to sixth embodiments, by directly indicating a resource to the ServiceContext for Abstract service, a set of resources including such resource is identified. The other part is the same as the first embodiment, and therefore descriptions are given in the present embodiment, focusing on how a set of resources and the ServiceContext for Abstract service are mapped.

Figure 68:
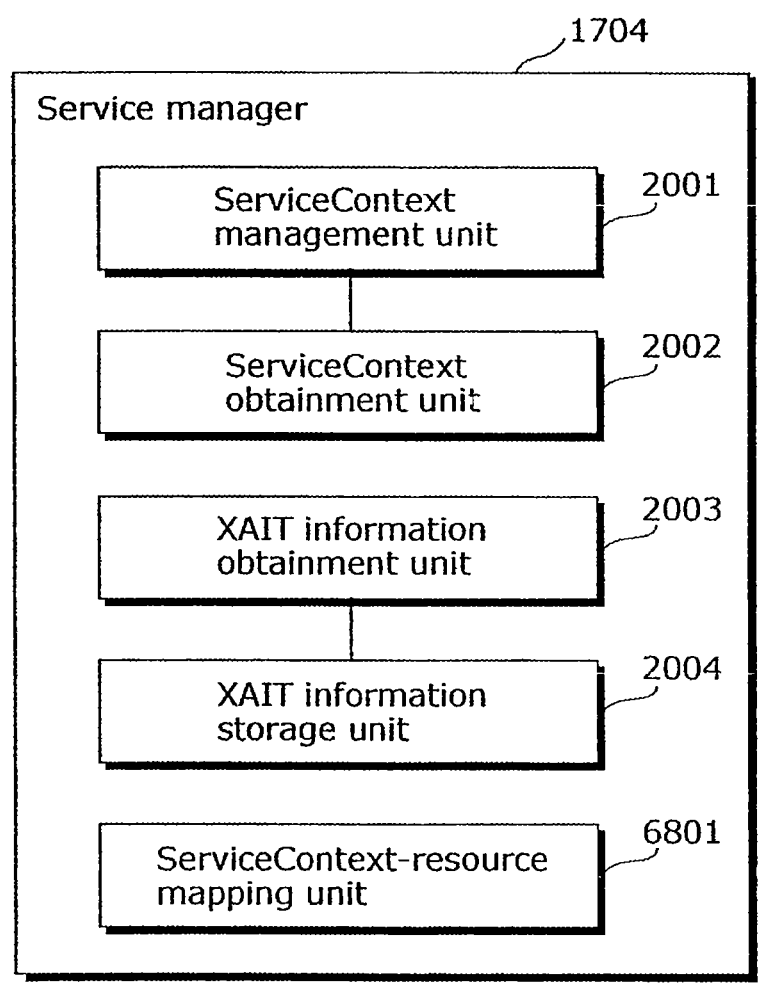
FIG. 68 is a diagram showing a configuration of the service manager 1704 according to the present invention.

In the present embodiment, by mapping a ServiceContext and a set of resources as well as mapping the set of resources and respective resources in the service manager 1704, and then by indicating the respective resources to the ServiceContext for Abstract service, the set of resources is automatically indicated to such ServiceContext for Abstract service. FIG. 68 shows the configuration of the service manager 1704 according to the present embodiment. In FIG. 68, 6801 is a ServiceContext-resource mapping unit. The configuration of the ServiceContext-resource mapping unit is shown in FIG. 69. The ServiceContext-resource mapping unit 6801 is made up of a resource holding unit 6901, the resource set holding unit 6401, a resource obtainment unit 6902, the resource set obtainment unit 6402, and a resource mapping achievement unit 6903. The resource set obtainment unit 6402 and the resource set holding unit 6401 are shown in FIG. 64, and therefore descriptions thereof are omitted here. FIG. 70 shows an example of the resource holding unit 6901. A line 7001 describes sets of resources, a line 7002 describes tuners, a line 7003 describes TS decoders, a line 7004 describes audio decoders, and a line 7005 describes video decoders. Furthermore, a column 7006 describes the set of resources A2410 and resources included in such set of resources A2410, whereas a column 7007 describes the set of resources B2411 and resources included in such set of resources B2411.

Note that the resource holding unit 6901 holds the above tuners, TS decoders, audio decoders, and video decoders as resources, but it is possible to carry out the present embodiment if the resource holding unit 6901 has a different configuration.

The resource obtainment unit 6902 obtains resources to which either the ServiceContext for Abstract service or a ServiceContext for In-band service is associated. The resource mapping achievement unit 6903 associates the ServiceContext for Abstract service with the resources.

Figure 71:
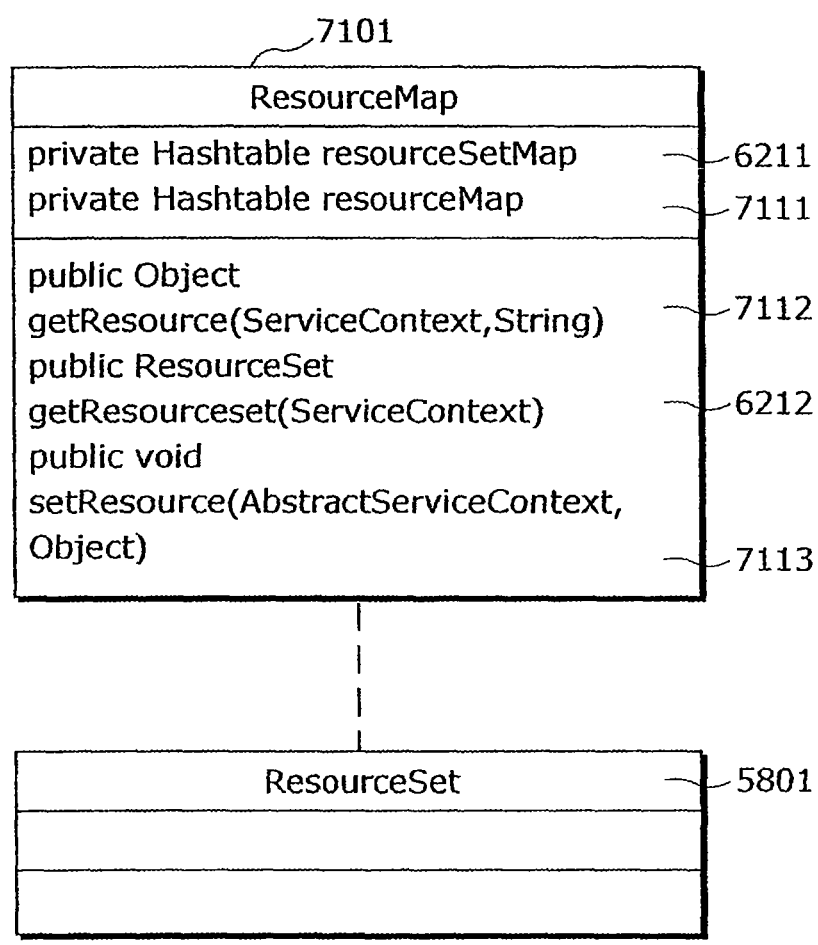
FIG. 71 is a diagram showing a Java class according to the present invention.

FIG. 71 shows an example method of associating the ServiceContext for Abstract service with a set of resources.

In FIG. 71, the resource set holding unit 6401 is represented as the resourceSetMap 6211. The resource holding unit 6901 is represented as the resourceMap 7111. As a method to implement the resource set obtainment unit 6402, getResourceSet (ServiceContext) 6212 is defined. Also, as the resource obtainment unit 6902, a getResource(ServiceContext, String) method 7112 is defined. Furthermore, as a method to implement the resource mapping achievement unit 6903, a void setResource (AbstractServiceContext, Object) method 7113 is defined. getResource (ServiceContext, String) 7112 obtains a resource that is indicated by String and that is included in the ResourceSet that is currently used by the ServiceContext specified as an argument, by use of resourceSetMap 6211 and resoruceMap 7111. String is specified by the name of a resource, e.g., a character string such as "Tuner", as a result of which an Object representing the Tuner A501a, for example, is returned as a return value. setResoruce (AbstractServiceContext, Object) 7113 associates the Abstract ServiceContext specified as an argument with the ResourceSet that includes the resource represented by the Object specified as an argument, and stores such relationship in the resourceSetMap 6211. Here, the ResourceSet 5801 is a class representing a set of resources.

Figure 72:
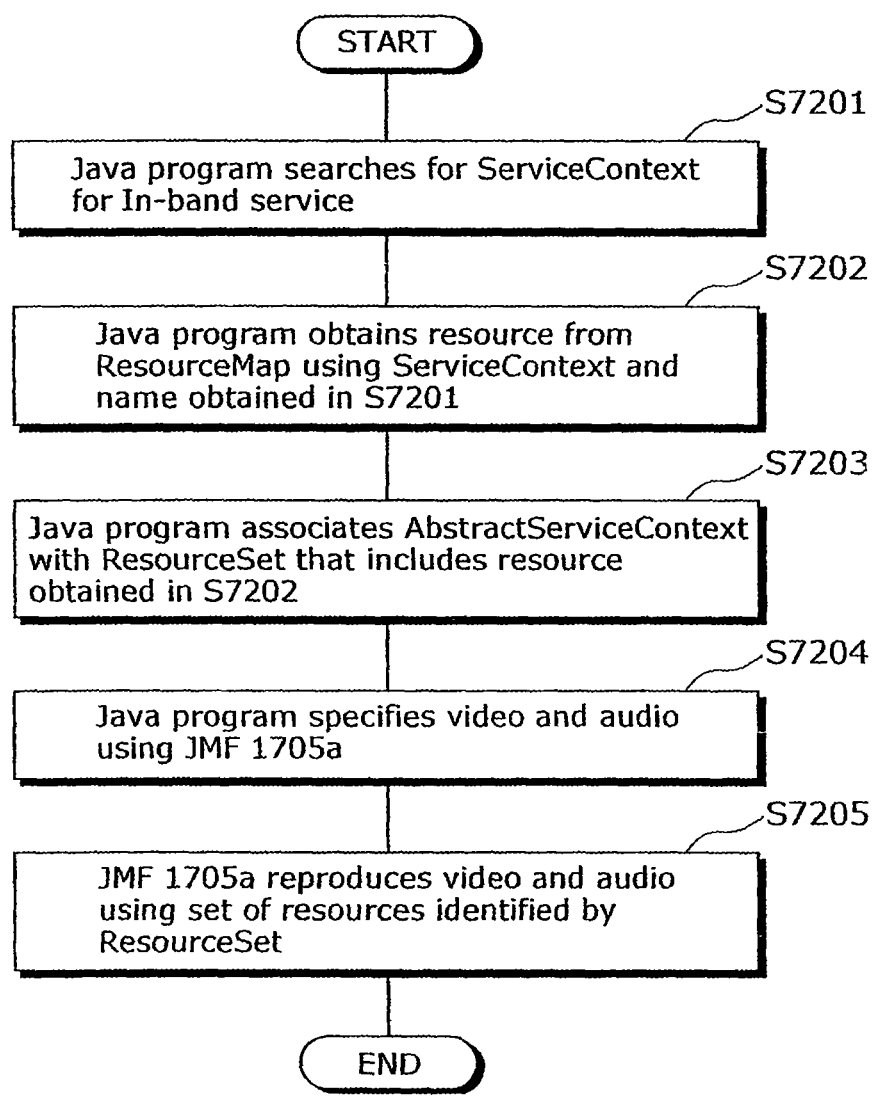
FIG. 72 is a flowchart for reproducing video and audio according to the present invention.

FIG. 72 shows a flowchart in the present embodiment.

A Java program included in an Abstract service obtains a ServiceContext for In-band service from the ServiceContext obtainment unit of the service manager 1704 (Step S7201). Next, the Java program obtains an Object representing a resource wished to be obtained (e.g. an Object representing a tuner) by the obtained ServiceContext for In-band service and the name of such resource, using getResource(ServiceContext, String) (Step S7202). Next, the Java program indicates the Object representing the resource to the AbstractServiceContext, using the sertResourceSet(AbstractServiceContext, Object) method in the ResourceMap, so as to identify a ResourceSet to be used (Step S7203). In other words, the Java program associates the AbstractServiceContext with the ResourceSet that includes the resource obtained in Step S7202. Then, the Java program requests the JMF 1705a to obtain an instance of a Java class representing the set of resources, and to reproduce video and audio by specifying such video and audio using such instance (Step S7204). The JMF 1705a reproduces the specified video and audio using the set of resources A2410 or the set of resources B2411 identified by the ResourceSet that is associated with the AbstractServiceContext in Step S7203 (Step S7205). Here, a detailed flowchart of Step S7204 is as shown in FIG. 59.

Eighth Embodiment

Figure 75:
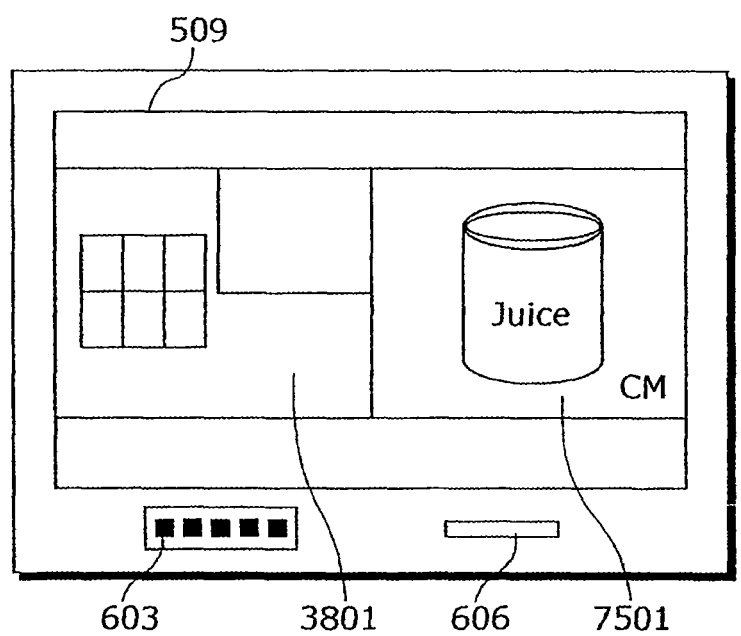
FIG. 75 is a diagram showing an example of a display window displayed by the display 509 according to the present invention.

In the present embodiment, in the first to seventh embodiments, a set of resources or an Object for identifying a resource is specified from a ServiceContext for In-band service, by associating the ServiceContext for Abstract service with the ServiceContext for In-band service or the set of resources. However, when the ServiceContext for Abstract service wishes to use two video decoders, for example, it is troublesome to associate the ServiceContext for Abstract service with a ServiceContext for In-band service or a set of resources, every time a video decoder is used. FIG. 75 shows an example of using two video decoders. 7501 is a picture of a television commercial. The other elements are omitted since they are shown in FIG. 38.

Figure 73:
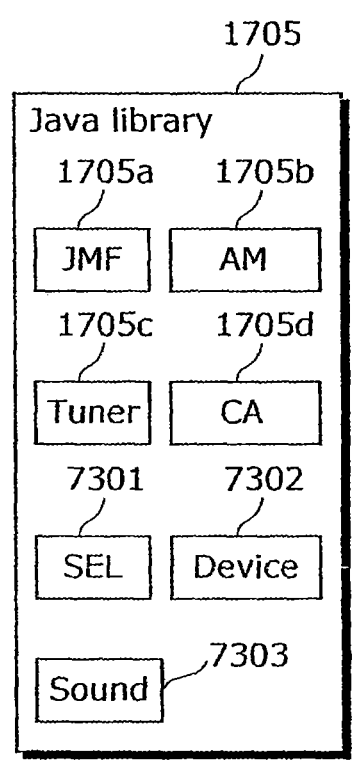
FIG. 73 is a diagram showing a configuration of a Java library 1705 according to the present invention.

Suppose that the Java library 1705 in FIG. 17 that is referred to in the first embodiment is configured as shown in FIG. 73. In FIG. 73, an SFL 7301 is a section filter. The SFL 7301 performs section filtering by use of the section filter A1102a and the section filter B1102b shown in FIG. 11A and FIG. 11B, and stores the resultant into the primary storage unit 511. A device 7302 controls the display device A520a and the display device B520b shown in FIG. 5. A sound 7303 reproduces audio by use of the audio decoder A0506a or the audio decoder B506b. The other elements are omitted since they are described in FIG. 17.

Figure 74:
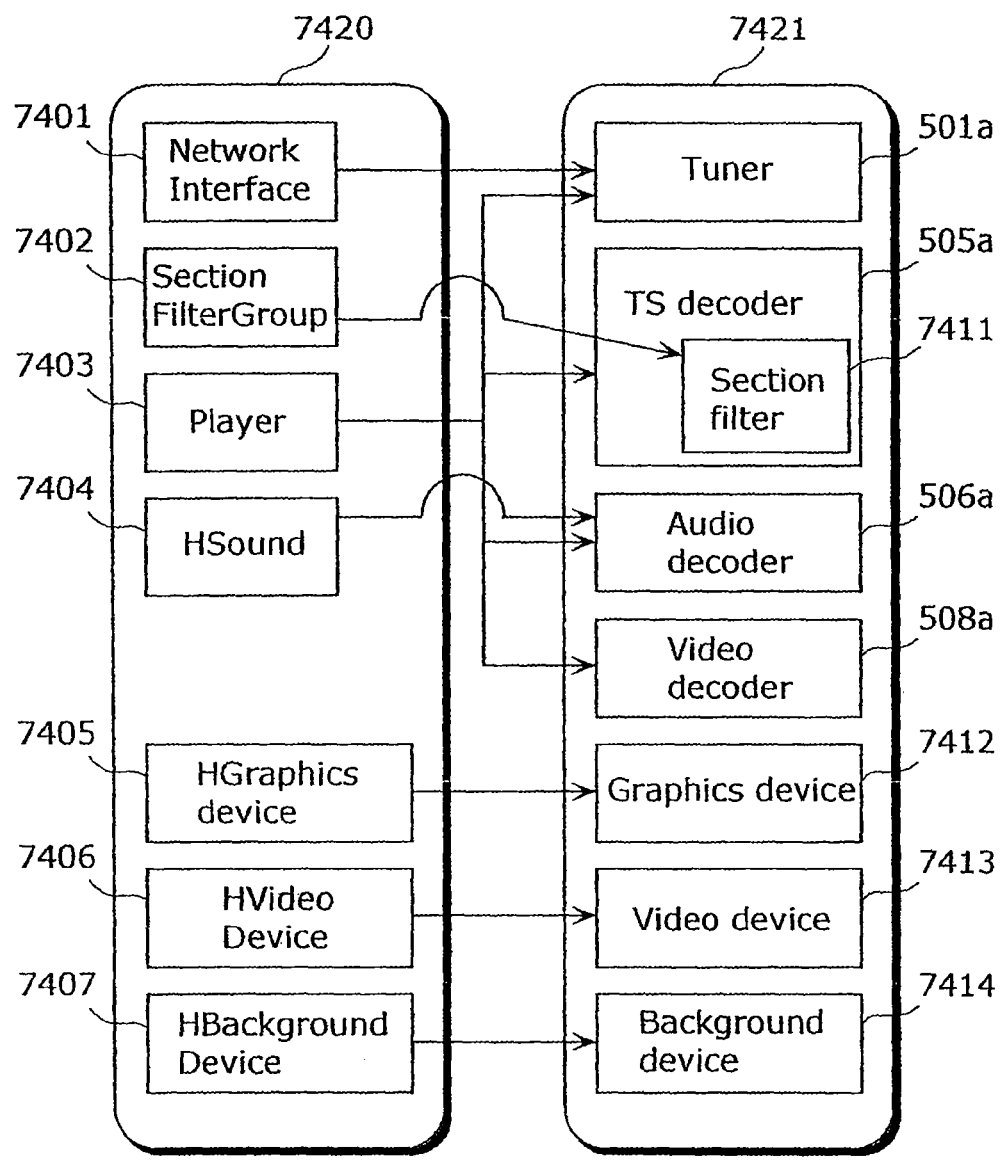
FIG. 74 is a diagram showing a relationship between Java classes and physical resources according to the present invention.

The above libraries define Java classes that represent physical resources, or that are capable of specifying resources and executing them. FIG. 74, which shows a relationship between the respective actual resources and the respective Java classes that represent physical resources, or that specify resources to execute them. In FIG. 74, Java class instances are shown in 7420 and actual resources are shown in 7421. A NetworkInterface class 7401 is defined in the DAVIC specification (DAVIC1.4.1 Specification Part9, Complete DAVIC Specifications: hereinafter referred to as DAVIC specification) and is obtained by the class NetworkInterfaceManager that manages instances of the NetworkInterface class, using a method public NetworkInterface[ ] getNetworkInterfaces( ) or a method public NetworkInterface getNetworkInterface (TransportStream). The NetworkInterface class is defined as the tuner 1705a, and the tuner A501a is internally identified. A SectionFilterGroup 7402 is defined in the DAVIC specification and is obtained using a constructor for the SectionFilterGroup. A SectionFilterGroup class, which is defined as the SFL 7301, uses the section filter A7411. A player 7403 is an interface, and its implementation class reproduces video. The player is defined in the Java Media Framework specification (Java Media Framework API Version 1.0 Constants). It is possible to obtain an instance of an implementation class of the player using the following methods of the class Manager that generates the player: createPlayer(DataSource); and createPlayer (MediaLocator) and createPlayer (URL). The player is defined as the JMF 1705a, and its implementation class is achieved by use of the TS decoder 505a, the audio decoder A506a, and the video decoder A508a internally. An HSound 7404 reproduces sound. The HSound class is defined in HAVi specification (HAVi v1.1 Java L2 APIs, 15 May 2001: hereinafter referred to as HAVi specification), and is obtained using a constructor for the Hsound class. The HSound class, which is defined as the sound 7303, uses the audio decoder A506a. An HGraphicsDevice 7405, an HVideoDevice 7406, and an HBackgroundDevice 7407 are defined in the HAVi specification. It is possible to obtain instances of the respective classes by the following methods of the HScreen class that manages the HGraphics device 7405, the HVideoDevice 7406, and the HBackgroundDevice 7407: public HGraphicsDevice[ ] getHVideoDevices( ) public HVideoDevice[ ] getHVideoDevices( ) and public HBackgroundDevice[ ] getHBackgroundDevice( ) or public HGraphicsDevice getDefaultHGraphicsDevice( ) public HVideoDevice getDefaultHVideoDevice( ) and public HBackgroundDevice getDefaultHBackgroundDevice( ) The HGraphicsDevice 7405, the HVideoDevice 7406, and the HBackgroundDevice 7407 are defined as the device 7302, and indicate a graphics device A7412, a video device A7413, and a background device A7414, respectively.

Note that in the present embodiment, Java class instances that represent or use resources are configured as shown in FIG. 74, but it is possible to carry out the present embodiment if a different configuration is employed.

Figure 76:
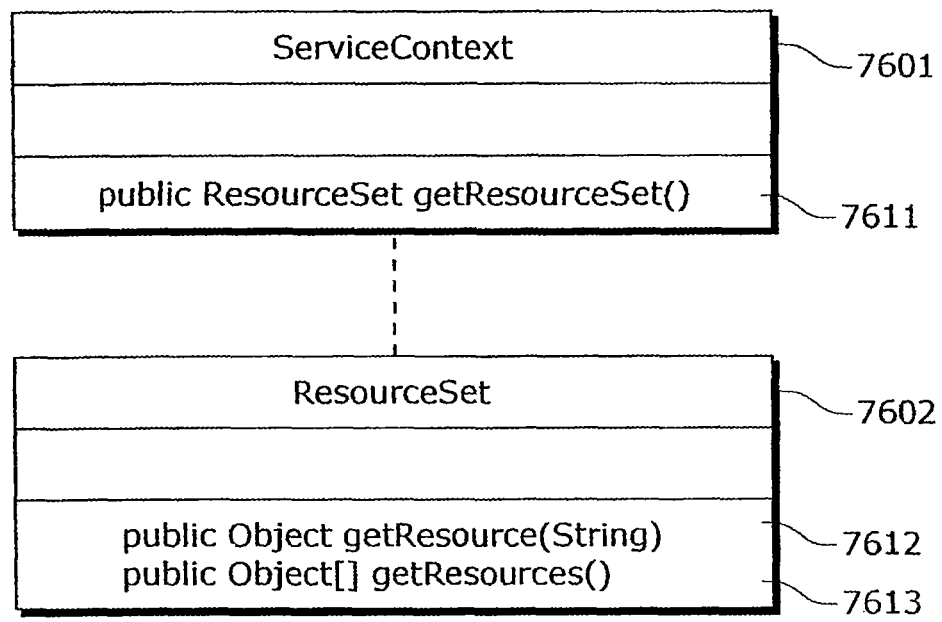
FIG. 76 is a diagram showing a Java class according to the present invention.

FIG. 76 shows an example of a ServiceContext for In-band service. The ServiceContext for In-band service defines a getResourceSet( ) method 7611, and returns a ResourceSet instance. A ResourceSet 7602 represents a set of resources and defines getResource (String) 7612. By specifying as String a Java class that uses resources, the getResource 7612 returns an instance that represents a resource included in such set of resources or that uses such resource. For example, it is possible to obtain an instance of the NetworkInterface class by specifying as, getResource ("NetworkInterface"). An argument here is specified as String (character string), but anything such as a resource identifier will do as long as it is possible to specify String. Moreover, a getResources( ) method 7613 returns all Java class instances that represent resources. For example, it returns an instance of the NetworkInterface class 7401, an instance of the SectionFileGroup class 7402, an instance of the player class 7403, an instance of the HSound class 7404, an instance of the HGraphicsDevice class 7405, an instance of the HVideoDevice class 7406, and an instance of the HBackgroundDevice class 7407. The ServiceContext for Abstract service 2180 can obtain Java instance(s) to which resource(s) is/are associated and to identify the resource(s) by calling getResource(String) or getResources( ) of the ServiceContext.

Note that even in the case where one ServiceContext holds plural ResourceSets, it is possible to implement this by defining public ResourceSet[ ] getResourceSet( ) in the ServiceContext 7601.

Note that it is also possible to obtain instances of classes representing resources by defining public Object[ ] getResources( ) and public Object getResource(String) in the ServiceContext.

Ninth Embodiment

In the eighth embodiment, it is possible to identify a resource by obtaining an instance of a Java class from a ServiceContext for In-band service. However, in the case where the ServiceContext for Abstract service directly obtains, from the Java library 1705, an instance representing a physical resource or an instance of a Java class that uses a resource, it is impossible to know that by which ServiceContext for In-band service such resource included in a set of resources has been identified. In the present embodiment, it is determined whether or not a resource is included in a set of resources identified by a ServiceContext for In-band service by asking the ServiceContext for In-band service about which instance has been obtained from the Java library. The other part is the same as the first embodiment, and therefore a description is given in the present embodiment, focusing on how a resource is identified.

Figure 77:
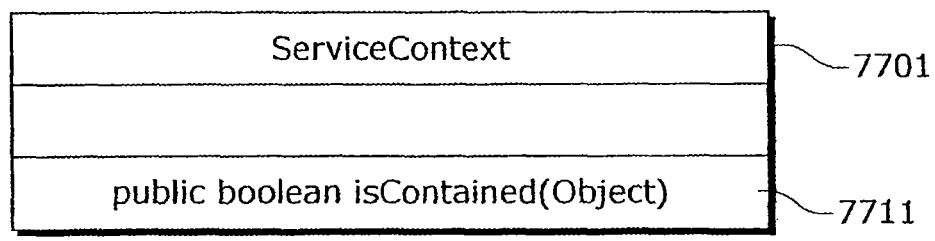
FIG. 77 is a diagram showing a Java class according to the present invention.

FIG. 77 shows an example of a ServiceContext for In-band service. 7701 is a ServiceContext for In-band service. An is Contained(Object) method 7711 takes an instance of a Java class that represents a physical resource specified as an argument or that uses such resource, and judges whether an instance specified as such argument uses a resource included in a set of resources identified by that ServiceContext. If it is judged that such instance uses a resource identified by the ServiceContext, true is returned, whereas if it is judged that such instance does not use a resource identified by the ServiceContext, false is returned. Accordingly, it becomes possible to know which set of resources includes a resource specified as an Object argument.

Tenth Embodiment

Figure 78:
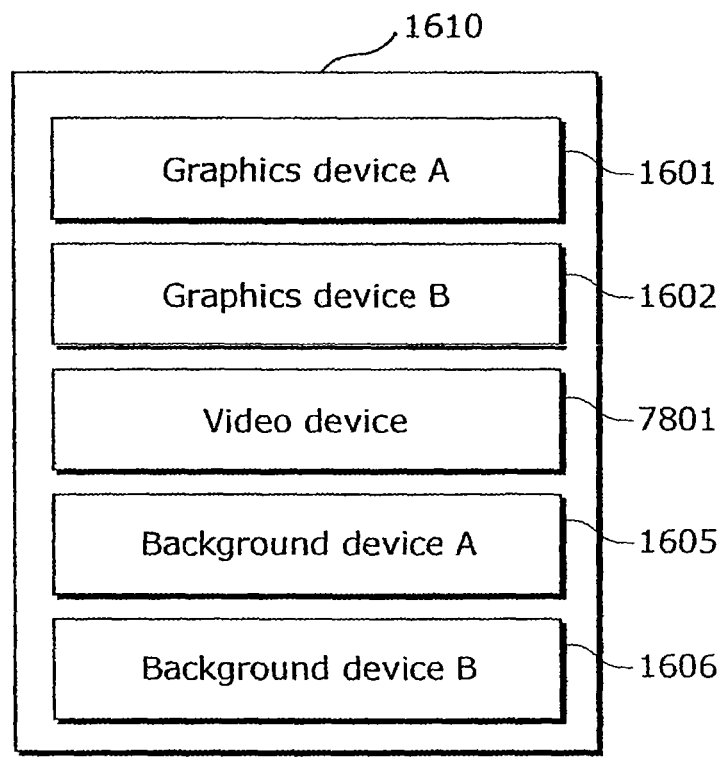
FIG. 78 is a diagram showing a configuration of a display device according to the present invention.
Figure 79:
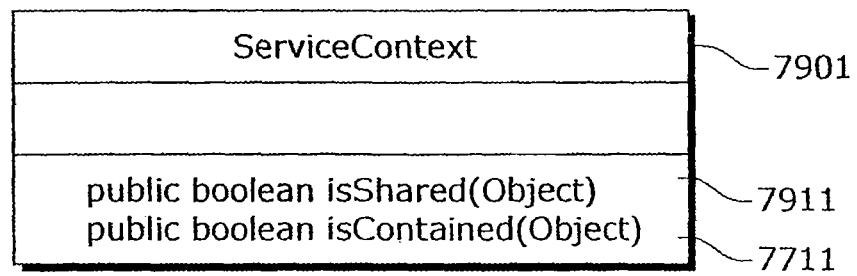
FIG. 79 is a diagram showing a Java class according to the present invention.

In the ninth embodiment, it is judged whether an instance of a Java class uses a resource included in a set of resources identified by a ServiceContext. However, in the case where display devices shown in FIG. 5 are represented in an integrated form, and where its constituent element is only a video device 7801 as shown in FIG. 78, there is a possibility that two ServiceContexts for In-band service have to share one video device. In such a case, it is necessary to judge whether a resource is shared or not, in addition to judging whether a resource is associated with a certain ServiceContext. FIG. 79 shows an example of a ServiceContext for In-band. In FIG. 79, is Shared (Object) 7911 is newly defined in a ServiceContext class 7901 that represents the ServiceContext for In-band service, in addition to the is Contained method 7711 shown in FIG. 77. In this method 7911, when two ServiceContexts for In-band service share a resource, e.g. the same video device 7801, true is returned, whereas false is returned when they do not share a resource.

Eleventh Embodiment

Figure 80:
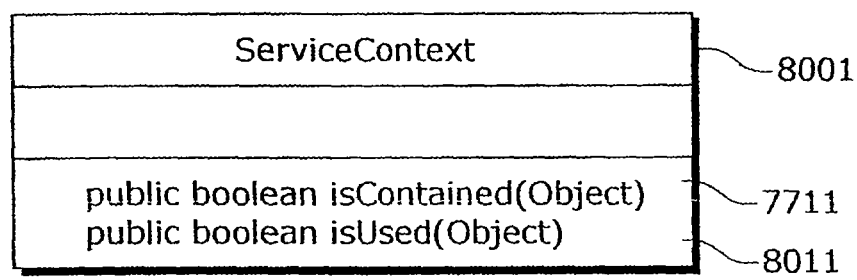
FIG. 80 is a diagram showing a Java class according to the present invention.

In addition to the ninth embodiment, a method for checking whether or not a physical resource is in use is added. This makes it possible to identify an available resource. FIG. 80 shows an example of a ServiceContext for In-band. In FIG. 80, a ServiceContext class 8001 is a ServiceContext for In-band service. In the ServiceContext class 8001, an is Used (Object) method 8011 returns true if a physical resource used by an instance of a Java class that is passed as an argument is currently in use, whereas it returns false if the physical resource is not in use. The is Contained(Object) 7711 is omitted since it is shown in FIG. 77.

Note that it is possible to define the combination of the eighth embodiment with any one of the ninth embodiment to the eleventh embodiment at the same time.

Twelfth Embodiment

In the ninth embodiment to the eleventh embodiment, there is a possibility that an instance to which a set of resources required to be used is associated cannot be obtained, when an instance representing a resource or an instance of a class that uses a resource is obtained from the Java library 1705. For example, when an instance is generated using a constructor, or when the Player is obtained, there may be a possibility that only instances that use a specified set of resources, such as instances of the SectionFilterGroup and HSound, can be obtained all the time. In such a case, it is made possible to change a set of resources to be associated to another one for their methods, by defining, for example, a public void connectResource(Object) method in a ServiceContext for In-band service. An instance that represents a resource or an instance of a class that uses a resource is specified as an Object argument.

In the present embodiment, a resource is identified by defining a public void connectResoruce (Object) method in the ServiceContext for In-band service, but it is possible to carry out the present embodiment by defining public void connectResoruce (ServiceContext, Object) in the ServiceContext for Abstract service. Here, a ServiceContext for In-band service is specified as ServiceContext as an argument.

Note that it is possible to carry out the present embodiment if an instance that represents a resource specified as an Object argument or an instance of a class that uses a resource, is restricted to a specified instance. For example, it is conceivable that, out of instances described in the eighth embodiment, an instance of the NetworkInterface class is defined not to be specified as an argument of a method in the present embodiment, since it is possible to obtain all instances that are associated with actual resources.

Thirteenth Embodiment

In the eighth embodiment, it is possible to identify a resource by obtaining an instance of a Java class from a ServiceContext for In-band service. However, in the case where the ServiceContext for Abstract service directly obtains, from the Java library 1705, an instance that represents a physical resource or an instance of a Java class that uses a resource, it is impossible to know which ServiceContext for In-band has specified a set of resources that includes the above resource.

The present embodiment makes it possible to identify a resource and a set of resources to be used by providing a ServiceContext as an argument at the time of obtaining an instance that represents a physical resource or an instance of a Java class that uses a resource. The other part is the same as the first embodiment, and therefore a description is given in the present embodiment, focusing on how a resource is identified. The following methods are defined using the Java library 1705.

When obtaining an instance of the NetworkInterface class, an instance of the NetworkInterface class for identifying a physical resource is obtained by adding a method public NetworkInterface[ ] getNetworkInterfaces(ServiceContext) to the class NetworkInterfaceManager that manages instances of the NetworkInterface class. An instance of the SectionFilterGroup class for identifying a physical resource is obtained by providing a ServiceContext as an argument in a constructor of the SectionFilterGroup. An instance of the Player class for identifying a physical resource is obtained by providing, as methods of the class Manager that creates the Player, one of or all of the following methods for providing a ServiceContext as an argument: createPlayer(DataSource, ServiceContext); createPlayer (MediaLocator, ServiceContext); and createPlayer(URL, ServiceContext). Here, DataSource, MediaLocator, and URL specify the location of AV sources to be reproduced.

Physical resources of HGraphicsDevice, HVideoDevice, and HBackgroundDevice are identified by adding the following methods of the HScreen class: public HGraphicsDevice[ ] getHVideoDevices(ServiceContext); public HVideoDevice[ ] getHVideoDevices(ServiceContext); and public HBackgroundDevice[ ] getHBackgroundDevice(ServiceContext), or public HGraphicsDevice getDefaultHGraphicsDevice (ServiceContext); public HVideoDevice getDefaultHVideoDevice(ServiceContext); and public HBackgroundDevice getDefaultHBackgroundDevice (ServiceContext).

Note that ServiceContext is specified as an argument in the present embodiment, but it is also possible to carry out the present embodiment by defining a class ResourceSet for identifying a set of resources and then by specifying an identifier indicating such set of resources, such as by specifying a ResourceSet as an argument.

Note that the present embodiment presents the above-described methods as means for obtaining instances that represent the respective resources or instances of classes that use the resources, but it is possible to carry out the present embodiment without using the above methods, by specifying, as an argument, a ServiceContext or an instance of the ResourceSet class.

As described above, according to the present invention, by being equipped with the following, it becomes possible to assign a set of resources to be required for executing video, audio, a program and the like included in said one or more services that run on the execution environment: a service execution unit operable to execute one or more services; an execution environment holding unit operable to hold an execution environment that identifies a set of resources used by each of said one or more services; and an execution environment selection unit operable to associate each of said one or more services with the set of resources identified by the execution environment by associating the execution environment held by the execution environment holding unit with each of said one or more services.

Furthermore, with the configuration in which the present invention further comprises an execution environment identifier obtainment unit operable to obtain, from the execution environment holding unit, an execution environment identifier indicating the execution environment, wherein the execution environment identifier includes a service identifier receiving unit operable to receive a service identifier, it becomes possible to execute said one or more services, with the set of resources being assigned.

Also, with the following configuration, it becomes possible to assign a set of resources identified by an arbitrary execution environment as a set of resources to be required for executing video, audio, and a program included in said one or more services that run on the execution environment: the execution environment holding unit holds a plurality of execution environments, the service executing apparatus comprises an execution environment identifier obtainment unit operable to obtain, from the execution environment holding unit, execution environment identifiers indicating the respective execution environments, each of the execution environment identifiers includes an execution environment identifier receiving unit operable to receive a second execution environment identifier, and the execution environment selection unit, when the execution environment identifier receiving unit receives the second execution environment identifier, associates a service that runs on each of the execution environments indicated by said each of the execution environment identifiers with a set of resources of an execution environment indicated by the second execution environment identifier.

Moreover, with the following configuration, said one or more services that run on the execution environment can cause the second service to run on an execution environment indicated by the second execution environment identifier: said one or more services that run on the execution environment indicated by the execution environment identifier obtains a second execution environment identifier by the execution environment identifier obtainment unit, passes a second service to a service identifier receiving unit in the second execution environment identifier, and causes the second service to run.

Furthermore, with the following configuration, only a limited service out of services that run on the execution environment, can cause the second service to run on an execution environment indicated by the second execution environment identifier: only a limited service, out of services that run on the execution environment indicated by the execution environment identifier, obtains a second execution environment identifier by the execution environment identifier obtainment unit, passes a second service to a service receiving unit in the second execution environment identifier, and causes the second service to run.

Also, with the following configuration, it becomes possible to assign a set of resources identified by another execution environment as a set of resources to be required for executing video, audio, and a program included in said one or more services that run on the execution environment, and therefore to control sets of resources in a flexible manner: the service identifier receiving unit also receives the execution environment identifier at the same time of receiving the service identifier, and the execution environment selection unit, when the service identifier receiving unit receives, together with the service identifier, a second execution environment identifier obtained by the execution environment identifier obtainment unit, associates said one or more services that run on the execution environment indicated by the execution environment identifier with a set of resources of an execution environment indicated by the second execution environment identifier.

Moreover, with the configuration in which the present invention further comprises an execution environment identifier obtainment unit operable to obtain, from the execution environment holding unit, an execution environment identifier indicating the execution environment, wherein said execution environment identifier has a resource set obtainment unit operable to obtain the set of resources identified by the execution environment indicated by the execution environment identifier, it becomes possible to obtain a set of resources and to identify a set of resources inside the apparatus.

Furthermore, with the following configuration, it becomes possible to explicitly assign said set of resources as a set of resources to be required for executing video, audio, and a program included in said one or more services that run on the execution environment, and therefore to control sets of resources in a flexible manner: the execution environment holding unit holds a plurality of execution environments, the execution environment identifier has a resource set receiving unit operable to receive a set of resources that is obtained from the resource set obtainment unit in a second execution environment identifier obtained from the execution environment identifier obtainment unit, and the execution environment selection unit, when the resource set receiving unit receives the set of resources, associates said one or more services that run on the execution environment indicated by the execution environment identifier with the set of resources identifier by said execution environment.

Also with the following configuration in which the set of resources has an individual resource obtainment unit operable to obtain an individual resource, it becomes possible to control individual resources, and to identify a set of resources so as to execute video, audio, and a program individually.

Moreover, with the configuration in which the individual resource obtainment unit obtains all resources included in the set of resources, it becomes possible to identify all resources included in said set of resources.

Furthermore, with the configuration in which the present invention further comprises an execution environment identifier obtainment unit operable to obtain, from the execution environment holding unit, an execution environment identifier indicating the execution environment, wherein the execution environment identifier has a resource obtainment unit operable to obtain an individual resource included in the set of resources identified by the execution environment indicated by the execution environment identifier, it becomes possible to obtain individual resources included in the set of resources, and to identify the set of resources so as to execute video, audio, and a program individually.

Also, with the configuration in which the resource obtainment unit obtains all resources included in the set of resources, it becomes possible to obtain all resources and therefore to identify all the resources included in said set of resources.

Moreover, with the configuration in which the present invention further comprises an individual resource obtainment unit operable to obtain an individual resource included in the set of resources identified by the execution environment held by the execution environment holding unit, it becomes possible to obtain individual resources included in sets of resources of all execution environments, and to identify a set of resources so as to execute video, audio, and a program individually.

Furthermore, with the configuration in which the present invention further comprises: an execution environment identifier obtainment unit operable to obtain, from the execution environment holding unit, an execution environment identifier indicating the execution environment; and a resource judgment unit operable to judge whether or not the set of resources identified by the execution environment indicated by the execution environment identifier includes the resource obtained by the individual resource obtainment unit, it becomes possible to identify a resource included in a specified set of resources by identifying the set of resources that includes individual resources, and therefore to identify the set of resources so as to execute video, audio, and a program individually.

Also, with the configuration in which the present invention further comprises a resource sharing judgment unit operable to judge whether the resource obtained by the individual resource obtainment unit is shared between (i) a set of resources identified by an execution environment indicated by a second execution environment identifier obtained by the execution environment identifier obtainment unit and (ii) the set of resources identified by the execution environment indicated by the execution environment identifier, by being able to judge whether or not an individual resource is shared by plural sets of resources, only a program that runs on the execution environment indicated by the execution environment identifier is allowed to use such resource, when such resource is not shared, which makes it possible to execute video, audio, and a program without having any influences on another service.

Moreover, with the following configuration, by being able to judge whether or not individual resources are currently in use, it becomes possible to execute video, audio, and a program individually by use of available resources: the execution environment indicated by the execution environment identifier has a resource use judgment unit operable to judge whether the resource obtained by the individual resource obtainment unit is being used by the execution environment indicated by the execution environment identifier obtained by the execution environment identifier obtainment unit.

Furthermore, with the configuration in which the present invention further comprises an execution environment identifier obtainment unit operable to obtain, from the execution environment holding unit, an execution environment identifier indicating the execution environment, wherein the execution environment identifier has a resource connection unit operable to associate the set of resources identified by the execution environment indicated by the execution environment identifier with the resource obtained by the individual resource obtainment unit, by including said resource to said set of resources, it becomes possible to include a resource to a set of resources that is wished to be controlled.

Also, with the configuration in which the present invention further comprises an execution environment identifier obtainment unit operable to obtain, from the execution environment holding unit, an execution environment identifier indicating the execution environment, wherein the individual resource obtainment unit obtains the resource that is included in the set of resources identified by the execution environment indicated by the execution environment identifier, by specifying the execution environment identifier obtained by the execution environment identifier obtainment unit, it becomes possible to execute video, audio, and a program individually, using a resource that is included in the set of resources identified by the execution environment.

Moreover, with the following configuration, it becomes possible to assign a set of resources identified by the execution environment indicated by the second execution environment identifier, as a set of resources to be required for executing video, audio, and a program included in said one or more services that run on the execution environment: the execution environment holding unit holds a plurality of execution environments, the service executing apparatus comprises: an execution environment identifier obtainment unit operable to obtain, from the execution environment holding unit, execution environment identifiers indicating the respective execution environments; and an execution environment association unit operable to associate each of the execution environment identifiers with a second execution environment identifier that is obtained by the execution environment identifier obtainment unit, and the execution environment selection unit, when the execution environment association unit associates said each of the execution environment identifiers with the second execution environment identifier, associates a service that runs on each of the execution environments indicated by said each of the execution environment identifiers with a set of resources of an execution environment indicated by the second execution environment identifier.

Furthermore, with the following configuration, it becomes possible to assign a set of resources identified by the execution environment indicated by the second execution environment identifier, as a set of resources to be required for executing video, audio, and a program included in said one or more services that run on the execution environment: the execution environment holding unit holds a plurality of execution environments, the service executing apparatus comprises an execution environment identifier obtainment unit operable to obtain, from the execution environment holding unit, execution environment identifiers indicating the respective execution environments, each of the execution environment identifiers includes a resource set obtainment unit operable to obtain a set of resources identified by each of the execution environments indicated by said each of the execution environment identifiers, the service executing apparatus comprises a resource set association unit operable to associate said each of the execution environment identifiers with a set of resources obtained from a resource set obtainment unit in a second execution environment identifier, and the execution environment selection unit, when the resource set association unit associates said each of the execution environment identifiers with the set of resources, associates a service that runs on said each of the execution environments indicated by said each of the execution environment identifiers with the set of resources.

Also, by being embodied as a computer-readable recording medium in which a program capable of functioning as the following units is stored, it becomes possible to improve portability: a service execution unit operable to execute one or more services; an execution environment holding unit operable to hold an execution environment that identifies a set of resources used by each of said one or more services; and an execution environment selection unit operable to associate each of said one or more services with the set of resources identified by the execution environment by associating the execution environment held by the execution environment holding unit with each of said one or more services.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

Being equipped with the following, the service executing apparatus according to the present invention is useful for a program included in a service when it controls a plurality of resource groups such as Picture in Picture and Double Window in a digital broadcasting receiver: a service execution unit operable to execute one or more services; an execution environment holding unit operable to hold an execution environment that identifies a set of resources used by each of said one or more services; and an execution environment selection unit operable to associate each of said one or more services with the set of resources identified by the execution environment by associating the execution environment held by the execution environment holding unit with each of said one or more services. Furthermore, the present invention is applicable not only to digital broadcasting receive, but also to uses such as controlling a plurality of resource groups in an information device, such as personal computer and mobile phone, that is controlled by software.

What is claimed is:

1. A broadcast receiving terminal including a plurality of resources, the broadcast receiving terminal comprising:
 a receiver that receives a service that uses a plurality of resources;
 a recording medium;
 a service executer that executes a service that uses said plurality of resources in a service execution environment intended for said service;
 an associater that associates the service execution environment with resource set information indicating said plurality of resources used by the service, when an application requests the service executor to execute the service;
 a storager that stores, into the recording medium, a plurality of service execution environments together with the associated resource set information that are associated by the associater; and
 a resource manager that provides, to a selected service, said plurality of resources indicated in the resource set information in the associated service execution environment, in the recording medium, stored by the storager.

2. A service executing method in a broadcast receiving terminal including a plurality of resources, the service executing method comprising:
 receiving a service that uses a plurality of resources;
 associating, with resource set information, a service execution environment for executing a service that uses said plurality of resources, when execution of said service is requested by an application, said resource set information indicating said plurality of resources used by the service;
 storing, into a recording medium included in the broadcast receiving terminal, a plurality of service execution environments together with the associated resource set information;
 providing, to a selected service, said plurality of resources indicated in resource set information in the associated service execution environment stored in the recording medium; and
 executing the selected service in the service execution environment by use of said plurality of resources indicated by the resource set information.

* * * * *